United States Patent
Park et al.

(10) Patent No.: US 11,071,125 B2
(45) Date of Patent: Jul. 20, 2021

(54) METHOD FOR TRANSMITTING OR RECEIVING CHANNEL STATE INFORMATION REFERENCE SIGNAL IN WIRELESS COMMUNICATION SYSTEM AND DEVICE THEREFOR

(71) Applicant: LG ELECTRONICS INC., Seoul (KR)

(72) Inventors: Haewook Park, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 16/324,657

(22) PCT Filed: Aug. 11, 2017

(86) PCT No.: PCT/KR2017/008780
§ 371 (c)(1),
(2) Date: Feb. 11, 2019

(87) PCT Pub. No.: WO2018/030855
PCT Pub. Date: Feb. 15, 2018

(65) Prior Publication Data
US 2019/0191444 A1 Jun. 20, 2019

Related U.S. Application Data

(60) Provisional application No. 62/373,952, filed on Aug. 11, 2016, provisional application No. 62/417,464, filed on Nov. 4, 2016.

(51) Int. Cl.
*H04W 72/12* (2009.01)
*H04B 7/06* (2006.01)
(Continued)

(52) U.S. Cl.
CPC ...... *H04W 72/1205* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS

2012/0243500 A1 9/2012 Chandrasekhar et al.
2015/0003271 A1 1/2015 Park et al.
(Continued)

FOREIGN PATENT DOCUMENTS

KR 1020140073552 A 6/2014

OTHER PUBLICATIONS

Nokia et al., "CSI-RS Design Supporting up to 32 Antenna Ports", R1-164335, 3GPP TSG-RAN WG1 Meeting #85, Nanjing, China, May 13, 2016.

*Primary Examiner* — Ruihua Zhang
(74) *Attorney, Agent, or Firm* — Dentons US LLP

(57) ABSTRACT

A method for receiving a CSI-RS by a terminal in a wireless communication system according to an aspect of the present invention may comprise the steps of: receiving, from a base station, CSI-RS configuration information about a CSI-RS configuration to which the CSI-RS is mapped, wherein the CSI-RS configuration corresponds to merging of a plurality of legacy CSI-RS configurations, and the plurality of legacy CSI-RS configurations are mapped to a plurality of antenna ports numbered by corresponding legacy CSI-RS port numbers; and receiving the CSI-RS from the base station through the plurality of antenna ports on the basis of the CSI-RS configuration information.

11 Claims, 46 Drawing Sheets

(51) Int. Cl.
  *H04L 5/00*  (2006.01)
  *H04J 4/00*  (2006.01)

(52) U.S. Cl.
  CPC ....... *H04L 5/0051* (2013.01); *H04W 72/1289* (2013.01); *H04B 7/0667* (2013.01); *H04J 4/00* (2013.01)

(56) References Cited

U.S. PATENT DOCUMENTS

| | | | |
|---|---|---|---|
| 2015/0063177 A1 | 3/2015 | Kim et al. | |
| 2016/0248562 A1* | 8/2016 | Nam | H04L 27/2601 |
| 2016/0337178 A1* | 11/2016 | Frenne | H04L 5/0048 |
| 2017/0264405 A1* | 9/2017 | Gao | H04B 7/0417 |
| 2020/0106504 A1* | 4/2020 | Noh | H04B 7/0626 |

* cited by examiner (a)

| CSI-RS port # for 20-port | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|
| k N | | | | | | | | | | | | | | | | | | | | |
| 0  4-port | 15 | 16 | | | | | | | | | | | | | | | | | | |
| 1  4-port | | | 15 | 16 | | | | | | | | | | | | | | | | |
| 2  4-port | | | | | 15 | 16 | | | | | | | | | | | | | | |
| 3  4-port | | | | | | | 15 | 16 | | | 17 | 18 | | | | | 17 | 18 | | |
| 4  4-port | | | | | | | | | 15 | 16 | | | 17 | 18 | 17 | 18 | | | 17 | 18 |

Fig. 29

| CSI-RS port # for 28-port | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|
| k N | | | | | | | | | | | | | | | | | | | | | | | | |
| 0 8-port | 15 | 16 | 17 | 18 | | | | | | | | | | | | | | | | | | | | |
| 1 8-port | | | | | 15 | 16 | 17 | 18 | | | | | | 19 | 20 | 21 | 22 | | | | | | | |
| 2 8-port | | | | | | | | | 15 | 16 | 17 | 18 | | | | | | 19 | 20 | 21 | 22 | 19 | 20 | 21 | 22 |

Fig. 31

| CSI-RS port # for 20-port | Nk | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|
| 0 | 8-port | 15 | 16 | 17 | 18 | | | | | | | 19 | 20 | 21 | 22 | | | | | | |
| 1 | 8-port | | | | | 15 | 16 | 17 | 18 | | | | | | | 19 | 20 | 21 | 22 | | |
| 2 | 4-port | | | | | | | | | 15 | 16 | | | | | | | | | 17 | 18 |

Fig. 32

| CSI-RS port # for 28-port | | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|---|
| k | Nk | | | | | | | | | | | | | | | | | | | | | | | | | | | | |
| 0 | 8-port | 15 | 16 | 17 | 18 | | | | | | | | | | | | | | | | | | | | | | | | |
| 1 | 8-port | | | | | 15 | 16 | 17 | 18 | | | | | | | | | | | | | | | | | | | | |
| 2 | 8-port | | | | | | | | | 15 | 16 | 17 | 18 | | | 19 | 20 | 21 | 22 | | | | | | | | | | |
| 3 | 4-port | | | | | | | | | | | | | 15 | 16 | | | | | 19 | 20 | 21 | 22 | 19 | 20 | 21 | 22 | 17 | 18 |

Fig. 33

| CSI-RS port # | Nk | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|---|
| 0 | 8-port | 15 | 16 | 17 | 18 | 19 | 20 | 21 | 22 | | | | | | | | | | | | | | | | |
| 1 | 8-port | | | | | | | | | 15 | 16 | 17 | 18 | 19 | 20 | 21 | 22 | | | | | | | | |
| 2 | 8-port | | | | | | | | | | | | | | | | | 15 | 16 | 17 | 18 | 19 | 20 | 21 | 22 |

Fig. 34

Shared CSI-RS 12-port

| | | | |
|---|---|---|---|
| 26 18 (k=1) | 28 16 (k=2) | 30 18 (k=2) | |
| 16 16 (k=0) | 18 18 (k=0) | 20 16 (k=1) | |

| | | | |
|---|---|---|---|
| 25 17 (k=1) | 27 15 (k=2) | 29 17 (k=2) | |
| 15 15 (k=0) | 17 17 (k=0) | 19 15 (k=1) | |

Non Shared CSI-RS 8-port (=4+4)

| 32 18 (k=3) | 34 18 (k=4) |
| 22 16 (k=3) | 24 16 (k=4) |

| 31 17 (k=3) | 33 17 (k=4) |
| 21 15 (k=3) | 23 15 (k=4) |

Numbering/mapping for 20-port UE:
Numbering/mapping for 12-port UE:

Numbering/mapping for 20-port UE:
Numbering/mapping for 12-port UE:

Fig. 35

| 20-port | | | | | | | | | | | | | | | | | | | | | |
|---|---|---|---|---|---|---|---|---|---|---|---|---|---|---|---|---|---|---|---|---|---|
| Case 1 | S1 >= S2 | | | | | | | | | | | | | | | | | | | | |
| CSI-RS port # for 20-port | 15 | 16 | 17 | 18 | 19 | 20 | 21 | 22 | 23 | 24 | 25 | 26 | 27 | 28 | 29 | 30 | 31 | 32 | 33 | 34 |
| k \ Nk | | | | | | | | | | | | | | | | | | | | |
| 0 | 4-port | 15 | 16 | 17 | 18 | | | | | | | | | | | | | | | |
| 1 | 4-port | | | | | 15 | 16 | | | | 17 | 18 | | | | | | | | |
| 2 | 4-port | | | | | | | | | | | | 15 | 16 | 17 | 18 | | | | |
| 3 | 4-port | | | | | | | 15 | 16 | | | | | | | | | 17 | 18 | |
| 4 | 4-port | | | | | | | | | 15 | 16 | | | | | | | | | 17 | 18 |

| 20-port | | | | | | | | | | | | | | | | | | | | | |
|---|---|---|---|---|---|---|---|---|---|---|---|---|---|---|---|---|---|---|---|---|---|
| Case 2 | S1 < S2 | | | | | | | | | | | | | | | | | | | | |
| CSI-RS port # for 20-port | 15 | 16 | 17 | 18 | 19 | 20 | 21 | 22 | 23 | 24 | 25 | 26 | 27 | 28 | 29 | 30 | 31 | 32 | 33 | 34 |
| k \ Nk | | | | | | | | | | | | | | | | | | | | |
| 0 | 4-port | 15 | 16 | 17 | | | 18 | | | | | | | | | | | | | |
| 1 | 4-port | | | | | | | 15 | 16 | | | 17 | 18 | | | | | | | |
| 2 | 4-port | | | | | | | | | | | | | 15 | | | | 16 | 17 | 18 | |
| 3 | 4-port | | | | 15 | 16 | | | | | | | | | 17 | 18 | | | | | |
| 4 | 4-port | | | | | | | | | 15 | 16 | | | | | | | | | 17 | 18 |

Fig. 36

24-port — Case 1    S1 = 1 or 2 or 4

| CSI-RS port # for 24-port | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|
| k  Nk |  |  |  |  |  |  |  |  |  |  |  |  |  |  |  |  |  |  |  |  |  |  |  |  |
| 0  8-port | 15 | 16 | 17 | 18 | 19 | 20 | 21 | 22 |  |  |  |  |  |  |  |  |  |  |  |  |  |  |  |  |
| 1  8-port |  |  |  |  |  |  |  |  |  |  |  |  | 15 | 16 | 17 | 18 | 19 | 20 | 21 | 22 |  |  |  |  |
| 2  8-port |  |  |  |  |  |  |  |  | 15 | 16 | 17 | 18 |  |  |  |  |  |  |  |  | 19 | 20 | 21 | 22 |

24-port — Case 2    S2 = 3

| CSI-RS port # for 24-port | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|
| k  Nk |  |  |  |  |  |  |  |  |  |  |  |  |  |  |  |  |  |  |  |  |  |  |  |  |
| 0  4-port | 15 | 16 | 17 | 18 |  |  |  |  |  |  |  |  |  |  |  |  |  |  |  |  |  |  |  |  |
| 1  4-port |  |  |  |  | 15 | 16 |  |  |  |  |  |  | 17 | 18 |  |  |  |  |  |  |  |  |  |  |
| 2  4-port |  |  |  |  |  |  | 15 | 16 |  |  |  |  |  |  | 15 | 16 | 17 | 18 |  |  |  |  |  |  |
| 3  4-port |  |  |  |  |  |  |  |  | 15 | 16 |  |  |  |  |  |  |  |  | 17 | 18 |  |  |  |  |
| 4  4-port |  |  |  |  |  |  |  |  |  |  | 15 | 16 |  |  |  |  |  |  |  |  | 17 | 18 |  |  |
| 5  4-port |  |  |  |  |  |  |  |  |  |  |  |  |  |  |  |  |  |  |  |  |  |  | 17 | 18 |

Fig. 37

Case 3    S2 = 6

| 24-port CSI-RS port # for 24-port | | | | | | | | | | | | | | | | | | | | | | | | |
|---|---|---|---|---|---|---|---|---|---|---|---|---|---|---|---|---|---|---|---|---|---|---|---|---|
| k | Nk | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
| 0 | 8-port | 15 | 16 | 17 | 18 | | | | | | | | | | | | | | 19 | 20 | 21 | 22 | | | |
| 1 | 8-port | | | | | 15 | 16 | 17 | 18 | | | | | | | 19 | 20 | | | | | | | 21 | 22 |
| 2 | 8-port | | | | | | | 15 | 16 | | | 17 | 18 | | | | | | | | | | | | |

Case 4    S2 = 6

| 24-port CSI-RS port # for 24-port | | | | | | | | | | | | | | | | | | | | | | | | |
|---|---|---|---|---|---|---|---|---|---|---|---|---|---|---|---|---|---|---|---|---|---|---|---|---|
| k | Nk | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
| 0 | 4-port | 15 | 16 | 17 | | | | | | | | | | | | | | | | | | | | | |
| 1 | 4-port | | | | | | | 15 | 16 | | | | | 17 | 18 | | | | | | | | | | |
| 2 | 4-port | | | | 18 | | | | | | | | | | | | | 15 | | | | | | | |
| 3 | 4-port | | | 15 | 16 | | | | | | | | | | | | | | | | | | | | | |
| 4 | 4-port | | | | | | 15 | | | | | 16 | | | | | | | | 17 | | | | 18 | |
| 5 | 4-port | | | | | | | | | | | 15 | 16 | | | | | | | | | | | | |

Case 5    S2 = 3

| 24-port CSI-RS port # for 24-port | | | | | | | | | | | | | | | | | | | | | | | | |
|---|---|---|---|---|---|---|---|---|---|---|---|---|---|---|---|---|---|---|---|---|---|---|---|---|
| k | Nk | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
| 0 | 8-port | 15 | 16 | 17 | 18 | | | 21 | 22 | | | | | | | | | | 19 | 20 | | | | | |
| 1 | 8-port | | | | | | 16 | | | 17 | | | 18 | | 19 | | | | | | 20 | 21 | 22 | | |
| 2 | 8-port | | 15 | | | | | | | 17 | | | 18 | | | | | | | | | 21 | | | 22 |

Fig. 39

| 28-port | Case 1 | S1 >= S2 | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| CSI-RS port # | | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
| k | Nk | | | | | | | | | | | | | | | | | | | | | | | | | | | | |
| 0 | 4-port | 15 | 16 | 17 | 18 | | | | | | | | | | | | | | | | | | | | | | | | | |
| 1 | 4-port | | | | | 15 | 16 | | | | | | | | | 17 | 18 | | | | | | | | | | | | | |
| 2 | 4-port | | | | | | | | | | | | | | | | | 15 | 16 | 17 | 18 | | | | | | | | | |
| 3 | 4-port | | | | | | | 15 | 16 | | | | | | | | | | | | | | | 17 | 18 | | | | | |
| 4 | 4-port | | | | | | | | | 15 | 16 | | | | | | | | | | | | | | | 17 | 18 | | | |
| 5 | 4-port | | | | | | | | | | | 15 | 16 | | | | | | | | | | | | | | | 17 | 18 | |
| 6 | 4-port | | | | | | | | | | | | | 15 | 16 | | | | | | | | | | | | | | | 17 | 18 |

| 28-port | Case 2 | S1 < S2 | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| CSI-RS port # | | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
| k | Nk | | | | | | | | | | | | | | | | | | | | | | | | | | | | |
| 0 | 4-port | 15 | 16 | 17 | | | | | 18 | | | | | | | | | | | | | | | | | | | | | |
| 1 | 4-port | | | | | 15 | 16 | | | | | 18 | | | | 17 | 18 | | | | | | | | | | | | | |
| 2 | 4-port | | | | | | | 15 | 16 | | | | | | | | | 15 | | | | | | | 16 | 17 | 18 | | | |
| 3 | 4-port | | | | | | | | | 15 | 16 | | | | | | | | 17 | 18 | | | | | | | | | | |
| 4 | 4-port | | | | | | | | | | | 15 | 16 | | | | | | | | 17 | 18 | | | | | | | | |
| 5 | 4-port | | | | | | | | | | | | | 15 | 16 | | | | | | | | 17 | 18 | | | | | | |
| 6 | 4-port | | | | | | | | | | | | | | | | | | | | | | | | | | 17 | 18 | | |

Fig. 40

Case 1    S1 >= S2

| 32-port CSI-RS port # for 32-port | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|---|---|---|---|---|---|---|---|---|
| k / Nk | | | | | | | | | | | | | | | | | | | | | | | | | | | | | | | | |
| 0 / 8-port | 15 | 16 | 17 | 18 | 19 | 20 | 21 | 22 | | | | | | | | | | | | | | | | | | | | | | | | |
| 1 / 8-port | | | 17 | 18 | 19 | 20 | 21 | 22 | | | | | | | | | | | | | | | | | | | | | | | | |
| 2 / 8-port | | | | | | | | | 15 | 16 | 17 | 18 | | | | | 15 | 16 | 17 | 18 | 19 | 20 | 21 | 22 | | | | | | | | |
| 3 / 8-port | | | | | | | | | | | | | 15 | 16 | 17 | 18 | | | | | 19 | 20 | 21 | 22 | 19 | 20 | 21 | 22 | 19 | 20 | 21 | 22 |

Case 2    S2 = 8

| 32-port CSI-RS port # for 32-port | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|---|---|---|---|---|---|---|---|---|
| k / Nk | | | | | | | | | | | | | | | | | | | | | | | | | | | | | | | | |
| 0 / 8-port | 15 | 16 | 17 | 18 | | | | | 19 | 20 | 21 | 22 | | | | | | | | | | | | | | | | | | | | |
| 1 / 8-port | | | 17 | 18 | 19 | 20 | 21 | 22 | | | | | | | | | 15 | 16 | 17 | 18 | | | | | 19 | 20 | 21 | 22 | | | | |
| 2 / 8-port | | | | | | | | | 15 | 16 | 17 | 18 | 19 | 20 | 21 | 22 | | | | | 19 | 20 | 21 | 22 | | | | | | | | |
| 3 / 8-port | | | | | | | | | | | | | 15 | 16 | 17 | 18 | | | | | | | | | | | | | 19 | 20 | 21 | 22 |

Case 3

| 32-port CSI-RS port # for 32-port | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|---|---|---|---|---|---|---|---|---|
| k / Nk | | | | | | | | | | | | | | | | | | | | | | | | | | | | | | | | |
| 0 / 8-port | 15 | 16 | 17 | 18 | | | | | | | | | 19 | 20 | 21 | 22 | | | | | | | | | | | | | | | | |
| 1 / 8-port | | | 17 | 18 | 19 | 20 | | | 15 | 16 | 17 | 18 | 19 | 20 | 21 | 22 | 15 | 16 | 17 | 18 | | | | | 19 | 20 | 21 | 22 | | | | |
| 2 / 8-port | | | | | | | | | | | | | | | | | | | | | 19 | 20 | 21 | 22 | | | | | | | | |
| 3 / 8-port | | | | | | | | | | | | | | | | | | | | | | | | | | | | | 19 | 20 | 21 | 22 |

Fig. 41

| Total # of Antenna port | S1 | S2 | N | K | Reusable CSI-RS ports for Rel-13 UE (S1, S2) | Port numbering |
|---|---|---|---|---|---|---|
| 20-port | 10 | 1 | 4 | 5 | — | — |
|  | 5 | 2 | 4 | 5 | 12(3, 2) | FIG. 35 Case 1 |
|  | 2 | 5 | 4 | 5 | 12(2, 3) | FIG. 35 Case 2 |
|  | 1 | 10 | 4 | 5 | — | — |
| 24-port | 12 | 1 | 8 | 3 | 16(8, 1) | FIG. 36 Case 1 |
|  | 6 | 2 | 8 | 3 | 16(4, 2) | FIG. 36 Case 1 |
|  | 4 | 3 | 8 | 3 | 16(4, 2) | FIG. 37 Case 5 |
|  |  |  | 4 | 6 | 12(3, 2) | FIG. 36 Case 2 |
|  | 3 | 4 | 8 | 3 | 16(2, 4) | FIG. 36 Case 1 |
|  |  |  | 4 | 6 | 12(2, 3) | FIG. 37 Case 4 |
|  | 2 | 6 | 8 | 3 | 16(2, 4) | FIG. 37 Case 3 |
|  | 1 | 12 | 8 | 3 | — | — |
| 28-port | 14 | 1 | 4 | 7 | — | — |
|  | 7 | 2 | 4 | 7 | 12(3, 2) | FIG. 39 Case 1 |
|  | 2 | 7 | 4 | 7 | 12(2, 3) | FIG. 39 Case 2 |
|  | 1 | 14 | 4 | 7 | — | — |
| 32-port | 16 | 1 | 8 | 4 | 16(8, 1) | FIG. 40 Case 1 |
|  | 8 | 2 | 8 | 4 | 16(4, 2) | FIG. 40 Case 1 |
|  | 4 | 4 | 8 | 4 | 16 (4, 2) or (2, 4) | FIG. 40 Case 1 or 2 |
|  | 2 | 8 | 8 | 4 | 16(2, 4) | FIG. 40 Case 2 |
|  | 1 | 16 | 8 | 4 | — | — |

Fig. 42

20-port    J=3

| CSI-RS port # for 20-port | | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|
| k | Nk | | | | | | | | | | | | | | | | | | | | |
| 0 | 4-port | 15 | 16 | 17 | 18 | | | | | | | | | | | | | | | | |
| 1 | 4-port | | | | | 15 | 16 | | | | | 17 | 18 | | | | | | | | |
| 2 | 4-port | | | | | | | | | 15 | 16 | | | 17 | 18 | | | | | | |
| 3 | 4-port | | | | | | | | | | | | | 15 | 16 | | | 17 | 18 | | |
| 4 | 4-port | | | | | | | | | | | | | | | | | | | 17 | 18 |

24-port    J=2

| CSI-RS port # for 24-port | | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|---|
| k | Nk | | | | | | | | | | | | | | | | | | | | | | | | |
| 0 | 8-port | 15 | 16 | 17 | 18 | 19 | 20 | 21 | 22 | | | | | | | | | | | | | | | | |
| 1 | 8-port | | | | | | | | | | | 15 | 16 | 17 | 18 | 19 | 20 | 21 | 22 | | | | | | |
| 2 | 8-port | | | | | | | | | | | | | | | | | 15 | 16 | 17 | 18 | 19 | 20 | 21 | 22 |

Fig. 43

20-port    Case 1    S1 >= S2

| CSI-RS port # for 20-port | | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|
| k | $N_k$ | | | | | | | | | | | | | | | | | | | | |
| 0 | 8-port | 15 | 16 | 17 | 18 | 19 | 20 | 21 | 22 | | | | | | | | | | | | |
| 1 | 8-port | | | | | | | | | | | 15 | 16 | 17 | 18 | 19 | 20 | 21 | 22 | | |
| 2 | 4-port | | | | | | | | | 15 | 16 | | | | | | | | | 17 | 18 |

20-port    Case 2    S1 < S2

| CSI-RS port # for 20-port | | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|
| k | $N_k$ | | | | | | | | | | | | | | | | | | | | |
| 0 | 8-port | 15 | 16 | 17 | 18 | | | | | | | | | | | 19 | 20 | 21 | 22 | | |
| 1 | 8-port | | | | | | | | | | | 15 | 16 | 17 | 18 | | | | | 21 | 22 |
| 2 | 4-port | | | | | 15 | 16 | | | | | | | | | 17 | 18 | | | | |

Fig. 44

28-port | Case 1 | S1 >= S2

| CSI-RS port # | Nk | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|---|
| k |  |  |  |  |  |  |  |  |  |  |  |  |  |  |  |  |  |  |  |  |  |  |  |  |  |  |  |  |  |
| 0 | 8-port | 15 | 16 | 17 | 18 | 19 | 20 | 21 | 22 |  |  |  |  |  |  |  |  |  |  |  |  |  |  |  |  |  |  |  |  |
| 1 | 8-port |  |  |  |  |  |  |  |  |  |  |  |  |  |  | 15 | 16 | 17 | 18 | 19 | 20 | 21 | 22 |  |  |  |  |  |  |
| 2 | 8-port |  |  |  |  |  |  |  |  | 15 | 16 | 17 | 18 |  |  |  |  |  |  |  |  |  |  | 19 | 20 | 21 | 22 |  |  |
| 3 | 4-port |  |  |  |  |  |  |  |  |  |  |  |  | 15 | 16 |  |  |  |  |  |  |  |  |  |  |  |  | 17 | 18 |

28-port | Case 1 | S1 < S2

| CSI-RS port # | Nk | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|---|
| k |  |  |  |  |  |  |  |  |  |  |  |  |  |  |  |  |  |  |  |  |  |  |  |  |  |  |  |  |  |
| 0 | 8-port | 15 | 16 | 17 | 18 |  |  |  |  | 19 | 20 | 21 | 22 |  |  |  |  |  |  |  |  |  |  |  |  |  |  |  |  |
| 1 | 8-port |  |  |  |  |  |  |  |  |  |  |  |  |  |  | 15 | 16 | 17 | 18 |  |  |  |  | 19 | 20 | 21 | 22 |  |  |
| 2 | 8-port |  |  | 15 | 16 | 17 |  |  |  |  |  |  | 18 |  |  |  |  |  |  | 19 | 20 | 21 |  |  |  |  | 22 |  |  |
| 3 | 4-port |  |  |  |  |  |  |  |  |  |  |  |  | 15 | 16 |  |  |  |  |  |  |  |  |  |  |  |  | 17 | 18 |

METHOD FOR TRANSMITTING OR RECEIVING CHANNEL STATE INFORMATION REFERENCE SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/008780, filed on Aug. 11, 2017, which claims the benefit of U.S. Provisional Application No. 62/373,952, filed on Aug. 11, 2016, and No. 62/417,464, filed on Nov. 4, 2016, the contents of which are all hereby incorporated by reference herein in their entirety.

TECHNICAL FIELD

The present invention relates to a wireless communication system and, more particularly, to a method for transmitting or receiving a channel state information-reference signal and an apparatus performing/supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for transmitting or receiving channel state information (CSI).

Furthermore, an object of the present invention is to propose an efficient method for aggregating a smaller number of ports of CSI-RS resources in order to design a larger number of ports of CSI-RS resources.

Furthermore, an object of the present invention is to propose a method for minimizing overhead which may occur when multiple CSI-RS resources are aggregated and used.

Furthermore, an object of the present invention is to propose a CDM application method for achieving the full power transmission of a CSI-RS.

Furthermore, an object of the present invention is to propose an efficient port numbering method for an antenna port to which a CSI-RS resource configured by aggregating legacy CSI-RS resources is mapped in order to share a CSI-RS with a legacy UE.

Technical objects to be achieved in the present invention are not limited to the aforementioned object, and those skilled in the art to which the present invention pertains may evidently understand other technological objects from the following description.

Technical Solution

In an aspect of the present invention, a method of receiving a channel state information-reference signal (CSI-RS) by a user equipment (UE) in a wireless communication system includes receiving, from a base station, CSI-RS configuration information regarding a CSI-RS configuration to which the CSI-RS is mapped, wherein the CSI-RS configuration corresponds to an aggregation of a plurality of legacy CSI-RS configurations and the plurality of legacy CSI-RS configurations is mapped to a plurality of antenna ports numbered with corresponding legacy CSI-RS port numbers, and receiving, from the base station, the CSI-RS through the plurality of antenna ports based on the CSI-RS configuration information. When a code division multiplexing (CDM) type of the CSI-RS configuration may be configured as CDM-4, some of the plurality of legacy CSI-RS configurations is shared with a legacy UE. A port numbering method of first antenna ports to which the legacy CSI-RS configuration shared with the legacy UE is mapped may be configured differently from a port numbering method of second antenna ports to which a legacy CSI-RS configuration not shared with the legacy UE is mapped.

Furthermore, the plurality of aggregated legacy CSI-RS configurations may correspond to CSI-RS configurations of the same port number.

Furthermore, the identical port number may correspond to a 4-port or an 8-port.

Furthermore, the port numbering method of the first antenna ports may be a method of sequentially assigning legacy CSI-RS port numbers, corresponding to the shared legacy CSI-RS configuration, to the first antenna ports in ascending powers of configuration numbers assigned for each shared legacy CSI-RS configuration.

Furthermore, the sequentially assigning may mean that the legacy CSI-RS port numbers are sequentially assigned to the first antenna ports in a port group unit having the same polarization among the first antenna ports and in a pre-configured direction within the layout of the first antenna ports.

Furthermore, the pre-configured direction may correspond to a vertical direction.

Furthermore, the port numbering method of the second antenna ports may be a method of mapping the second antenna ports to an antenna port group grouped in the same port number unit in a one-to-one manner for each not-shared legacy CSI-RS configuration/resource, but sequentially assigning the second antenna ports in unit of second antenna port units having the same polarization within an antenna port group in which legacy CSI-RS port numbers corresponding to the respective not-shared legacy CSI-RS configurations/resources are mapped in a one-to-one manner.

Furthermore, the sequentially assigning may mean that the legacy CSI-RS port numbers are assigned to second antenna ports having a first polarization within the one-to-one mapped antenna port group in ascending powers in a pre-configured direction within a layout of the antenna port group and that the remaining legacy CSI-RS port numbers not assigned to second antenna ports having a second polarization different from the first polarization are assigned in ascending powers in a pre-configured direction within the layout of the antenna port group.

Furthermore, the pre-configured direction may correspond to a vertical direction.

Furthermore, a one-to-one mapping relation may be established between the final number of CSI-RS ports sequentially assigned to the plurality of antenna ports in a port group unit having the same polarization for a UE configured with the CSI-RS configuration and the legacy CSI-RS port numbers assigned to the plurality of antenna ports according to the port numbering method for a legacy UE configured with the shared legacy CSI-RS configuration.

Furthermore, the mapping relation between the final number of CSI-RS ports and the legacy CSI-RS port numbers may be represented like Equation 1.

$$n = \begin{cases} Nk + u\left(p' + \frac{N}{2}(2k-J) - 2\left(8 - \frac{8}{N}\right)\right) * \left(\frac{N(K-J)}{2}\right) + p', & p' = 15, 16, \ldots, +14+N, k = 0, \ldots, J-1 \\ \frac{NJ}{2} + \frac{N}{2}(k-J) + p', & p' = 15, 16, \ldots, +14 + \frac{N}{2}, k = J, \ldots, K-1 \\ \frac{NJ}{2} + \frac{N}{2}(k-J+K-1) + p', & p' = 15 + \frac{N}{2}, \ldots, +14+N, k = J, \ldots, K-1 \end{cases}$$ [Equation 1]

where u(x)=1 if x>0, otherwise u(x)=0.

In Equation 1, n may indicate the final number of CSI-RS ports, k may indicate an assigned configuration number per the plurality of legacy CSI-RS configurations, K may indicate a total number of the plurality of legacy CSI-RS configurations, N may indicate the number of ports per the plurality of legacy CSI-RS configuration, p' may indicate the number of legacy CSI-RS ports mapped to the final number of CSI-RS ports in a one-to-one manner, and J may indicate the number of legacy CSI-RS configurations shared with the legacy UE.

Furthermore, Equation 1 may be limitedly applied if the layout of the plurality of antenna ports to which the CSI-RS configuration is mapped is a 20-port, 28-port and/or 32-port antenna layout in which a size of a column is equal to or greater than a size of a row and/or a 24-port antenna layout in which a size of a row of the layout is 1, 2, 4 or 3.

Furthermore, the method may further include receiving information on the layout of the plurality of antenna ports to which the CSI-RS configuration is mapped, information on the layout of the first antenna ports to which the shared CSI-RS configuration is mapped and/or information on the port numbering method through radio resource control (RRC) signaling.

Furthermore, in another aspect of the present invention, a user equipment (UE) receiving a channel state information-reference signal (CSI-RS) in a wireless communication system includes a radio frequency (RF) unit for transmitting and receiving radio signals and a processor controlling the RF unit. The processor may be configured to receive, from a base station, CSI-RS configuration information regarding a CSI-RS configuration to which the CSI-RS is mapped and receive, from the base station, the CSI-RS through the plurality of antenna ports based on the CSI-RS configuration information. The CSI-RS configuration may correspond to an aggregation of a plurality of legacy CSI-RS configurations and the plurality of legacy CSI-RS configurations is mapped to a plurality of antenna ports numbered with corresponding legacy CSI-RS port numbers. When a code division multiplexing (CDM) type of the CSI-RS configuration is configured as CDM-4, some of the plurality of legacy CSI-RS configurations may be shared with a legacy UE. A port numbering method of first antenna ports to which the legacy CSI-RS configuration shared with the legacy UE is mapped may be configured differently from a port numbering method of second antenna ports to which a legacy CSI-RS configuration not shared with the legacy UE is mapped.

Furthermore, the plurality of aggregated legacy CSI-RS configurations may correspond to the CSI-RS configurations having the same number of ports.

Advantageous Effects

In accordance with an embodiment of the present invention, a UE can smoothly derive CSI and feed the CSI back to a base station.

Furthermore, if a CSI-RS pattern according to an embodiment of the present invention is used, there is an effect in that a new and efficient CSI-RS pattern can be derived/used even without greatly using a legacy system because a CSI-RS pattern of a legacy system is reused. Furthermore, there is an effect in that compatibility with a new system and a legacy system can be maintained.

Furthermore, if a CSI-RS pattern according to an embodiment of the present invention is used, there is an effect in that full power transmission is possible in CSI-RS transmission.

Furthermore, if a port numbering method according to an embodiment of the present invention is used, there is an effect in that the re-usage of a CSI-RS resource can be improved because CSI-RS sharing with a legacy UE is made possible.

Effects which may be obtained in the present invention are not limited to the aforementioned effects, and various other effects may be evidently understood by those skilled in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 9 illustrates resources to which reference signals are mapped in a wireless communication system to which the present invention is applicable.

FIG. 21 illustrates 5 legacy CSI-RS configurations which can be used by 8 CSI-RS antenna ports for CSI-RS transmission.

FIG. 28 illustrates the port numbering/indexing of 20-port configured with (N,K)=(4,5) according to an embodiment of the present invention.

FIG. 29 illustrates the port numbering/indexing of 24-port configured with (N,K)=(8,3) according to an embodiment of the present invention.

FIG. 31 illustrates the port numbering/indexing of 20-port configured with (N0,N1,N2)=(8,8,4) when CDM-2 according to an embodiment of the present invention is applied.

FIG. 32 illustrates the port numbering/indexing of 28-port configured with (N0,N1,N2,N3)=(8,8,8,4) when CDM-2 according to an embodiment of the present invention is applied.

FIG. 33 illustrates a port numbering/indexing method of 24-port configured with (N,K)=(8,3) when CDM-4 is applied according to an embodiment of the present invention.

FIG. 34 illustrates a port numbering method of 20-port configured with (N,K)=(4,5) when CDM-4 is applied according to an embodiment of the present invention.

FIG. 35 is a diagram illustrating a port numbering method of 20-port configured with (N,K)=(4,5) when CDM-4 is applied according to an embodiment of the present invention.

FIGS. 36 and 37 illustrate the port numbering of 24-port configured with (N,K)=(8,3) or (N,K)=(4,6) when CDM-4 is applied according to an embodiment of the present invention.

FIG. 39 illustrates the numbering of 28-port configured with (N,K)=(4,7) when CDM-4 is applied according to an embodiment of the present invention.

FIG. 40 illustrates the port numbering of 32-port configured with (N,K)=(8,4) when CDM-4 is applied according to an embodiment of the present invention.

FIG. 41 is a table in which Q-port numbering rules having an aggregation of the same number of ports taken into consideration have been arranged when CDM-4 is applied according to an embodiment of the present invention.

FIG. 42 illustrates the results of the numbering of 20-port and 24-port by applying Equation 28 according to an embodiment of the present invention.

FIG. 43 illustrates the port numbering of 20-port configured with (N0,N1,N2)=(8,8,4) when CDM-4 is applied according to an embodiment of the present invention.

FIG. 44 illustrates the port numbering of 28-port configured with (N0,N1,N2,N3)=(8,8,8,4) when CDM-4 of the present invention is applied.

BEST MODE

Figure 1:
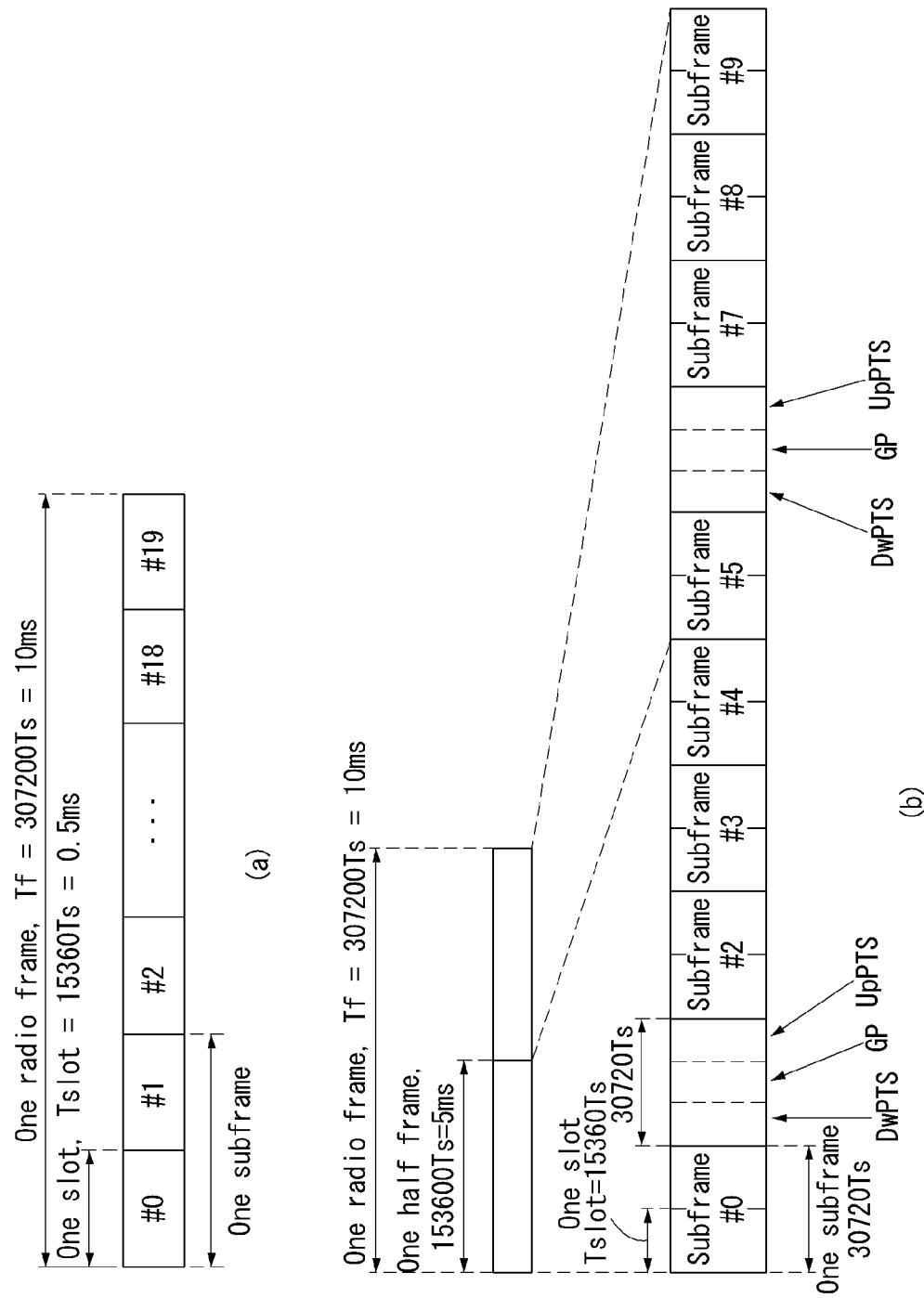
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention.

However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

The structure of an uplink slot may be the same as that of a downlink slot.

Figure 3:
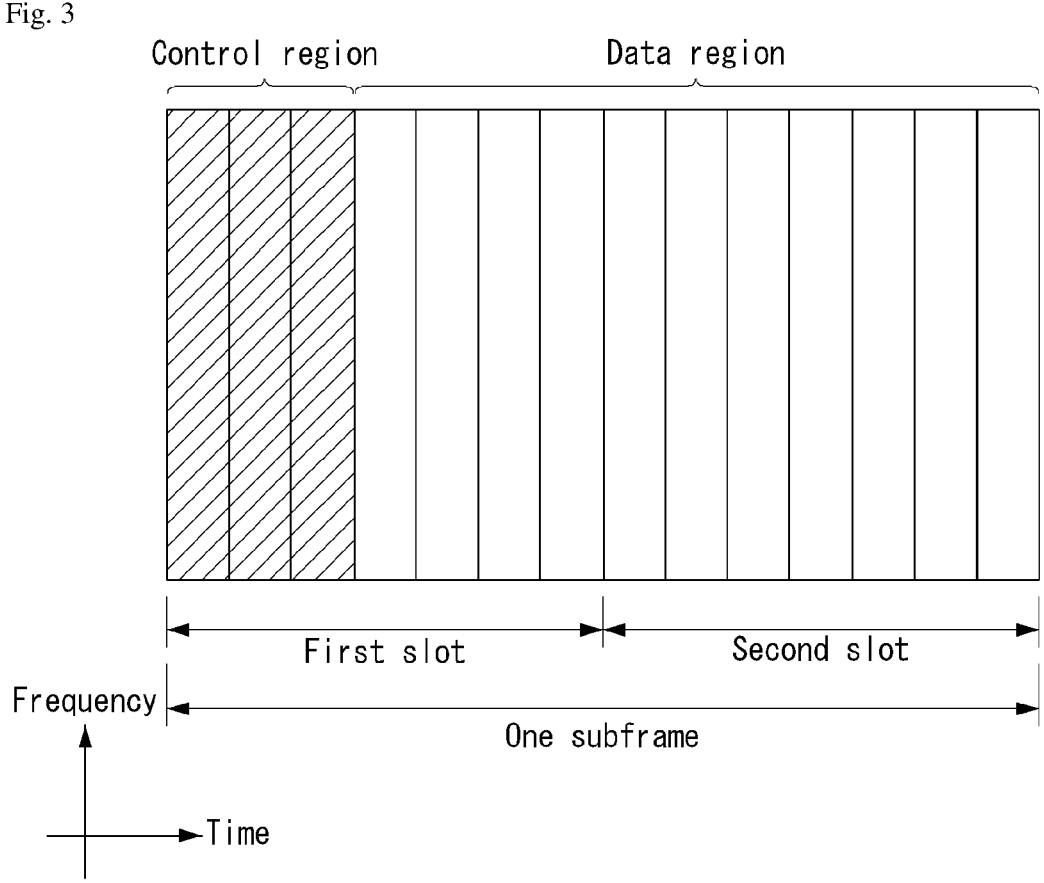
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
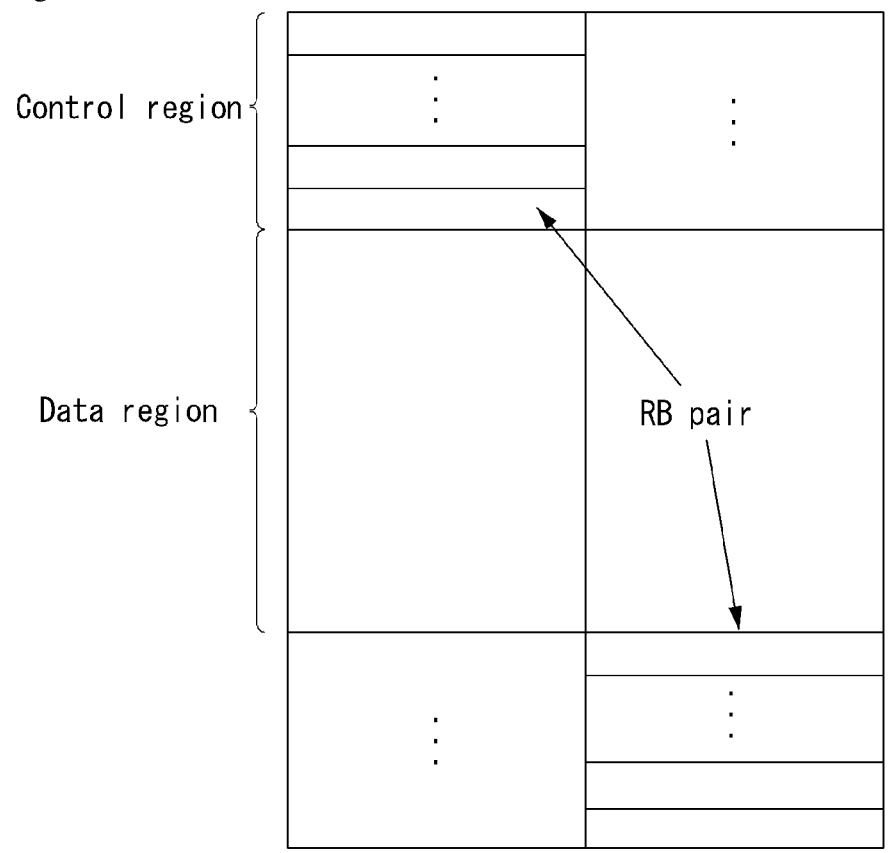
FIG. 4 illustrates a structure of uplink subframe in a wireless communication system to which the present invention may be applied.
Figure 4:
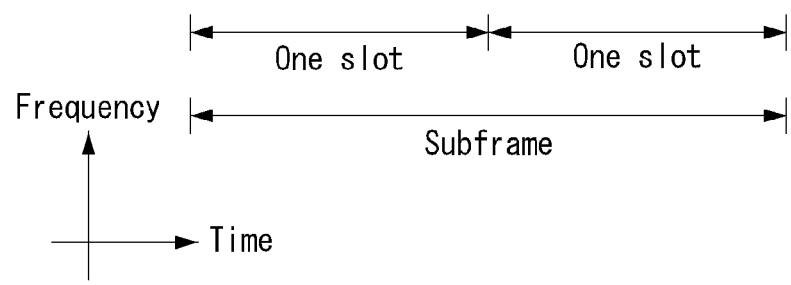

FIG. 4 shows the structure of an uplink subframe in a wireless communication system to which an embodiment of the present invention may be applied.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
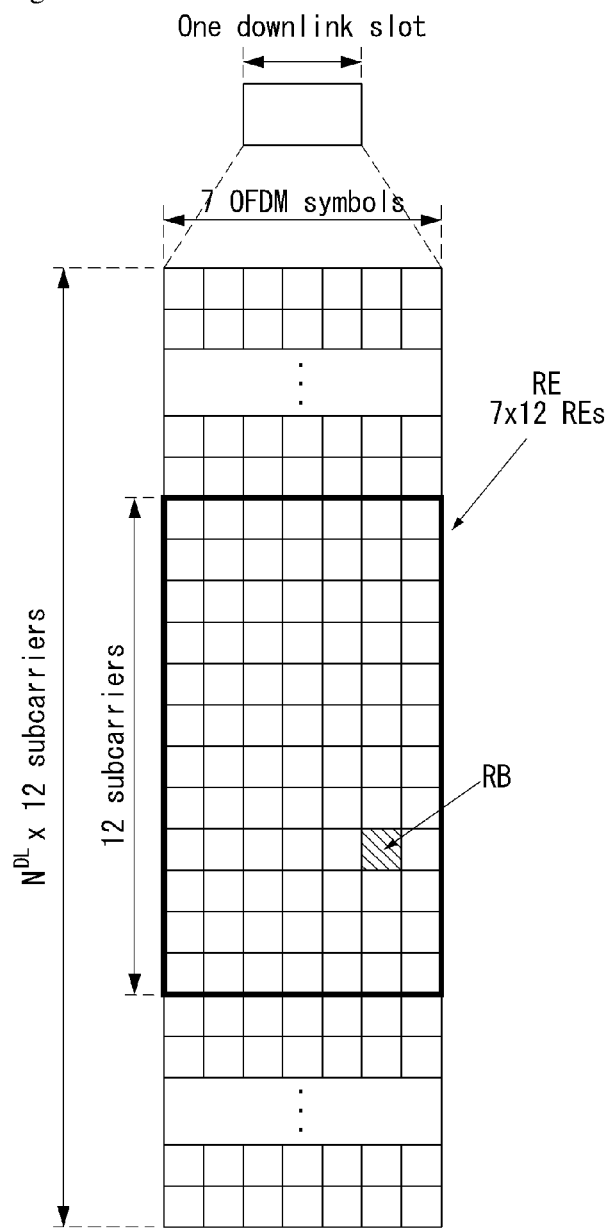
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
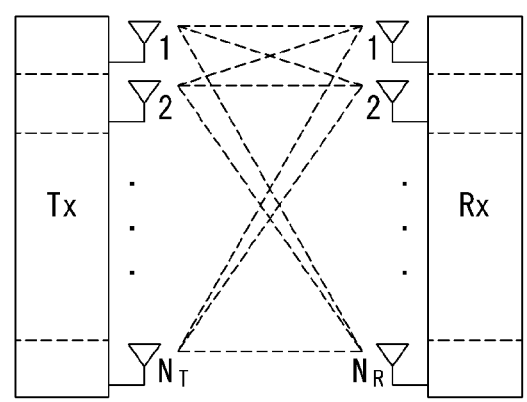
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T$$ [Equation 2]

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$  [Equation 5]

$$W\hat{s} = WPs$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T$$  [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
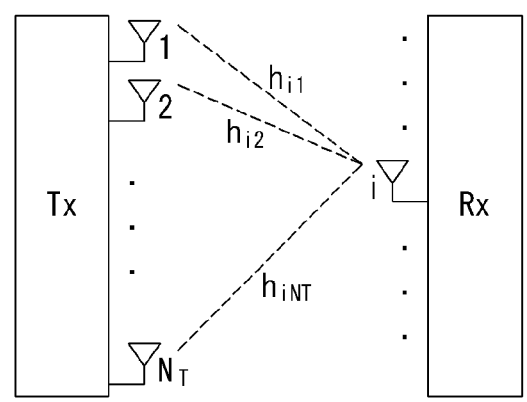
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}]$$  [Equation 7]

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$  [Equation 8]

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_N^R]^T$$  [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$  [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \le \min(N_T, N_R)$$  [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7:
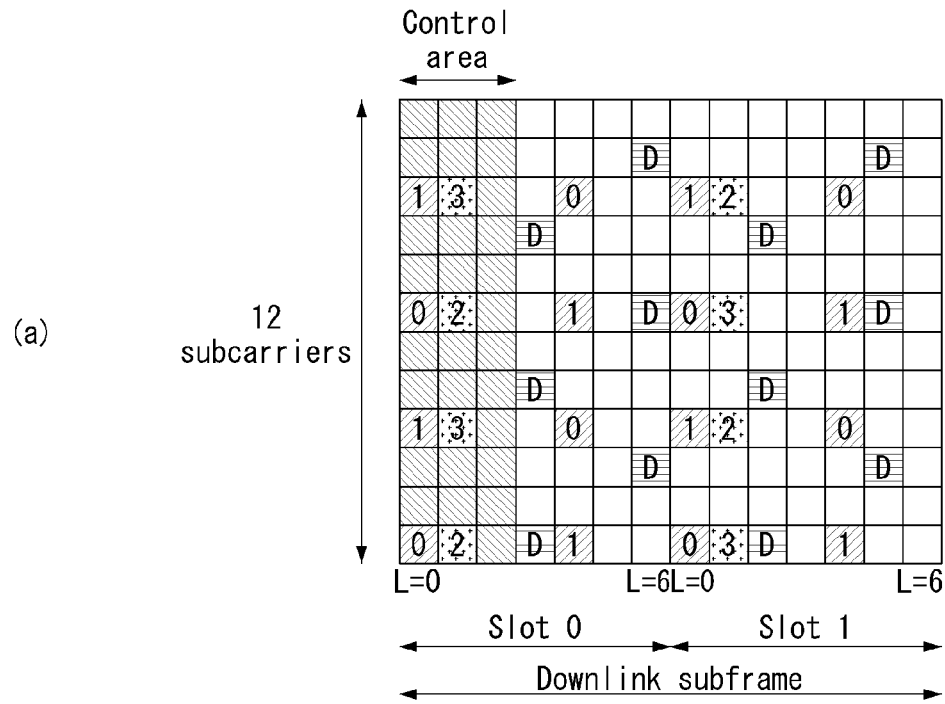
FIG. 7 illustrates reference signal patterns mapped to downlink resource block pairs in a wireless communication system to which the present invention may be applied.
Figure 7:
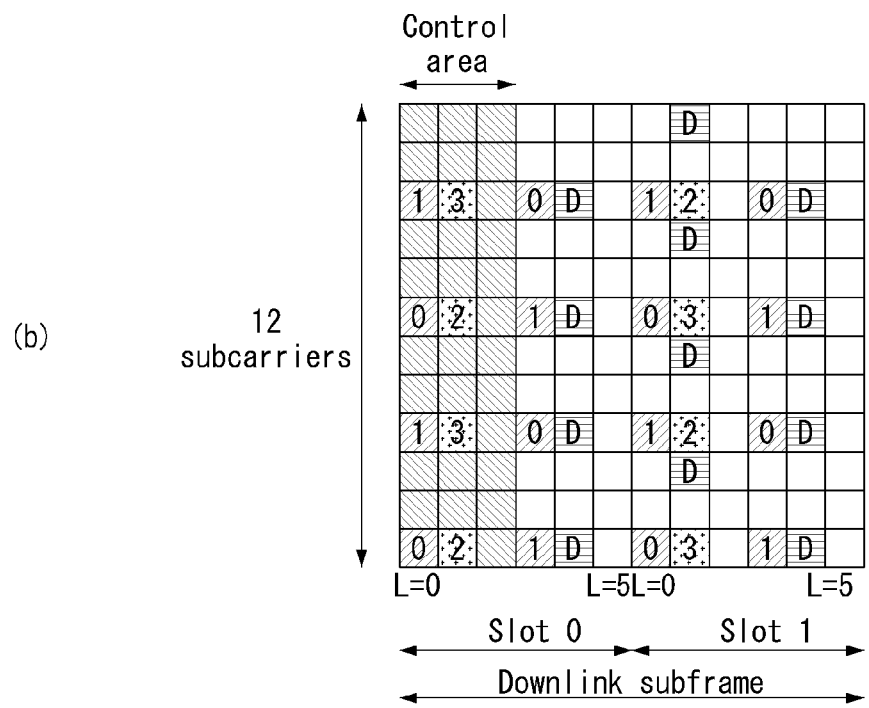

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f$=15 kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m') \quad \text{[Equation 12]}$$

$$k = k' + 12m +$$

$$\begin{cases} -0 & \text{for } p \in \{15, 16\}, \text{ normal cycle prefix} \\ -6 & \text{for } p \in \{17, 18\}, \text{ normal cycle prefix} \\ -1 & \text{for } p \in \{19, 20\}, \text{ normal cycle prefix} \\ -7 & \text{for } p \in \{21, 22\}, \text{ normal cycle prefix} \\ -0 & \text{for } p \in \{15, 16\}, \text{ extended cycle prefix} \\ -3 & \text{for } p \in \{17, 18\}, \text{ extended cycle prefix} \\ -6 & \text{for } p \in \{19, 20\}, \text{ extended cycle prefix} \\ -9 & \text{for } p \in \{21, 22\}, \text{ extended cycle prefix} \end{cases}$$

$$l = l' + \begin{cases} l'' & \text{CSI reference signal configuration } 0-19, \\ & \text{normal cyclic prefix} \\ 2l'' & \text{CSI reference signal configuration } 20-31, \\ & \text{normal cyclic prefix} \\ l'' & \text{CSI reference signal configuration } 0-27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configu- ration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |

TABLE 3-continued

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| Frame structure type 1 and 2  0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8:
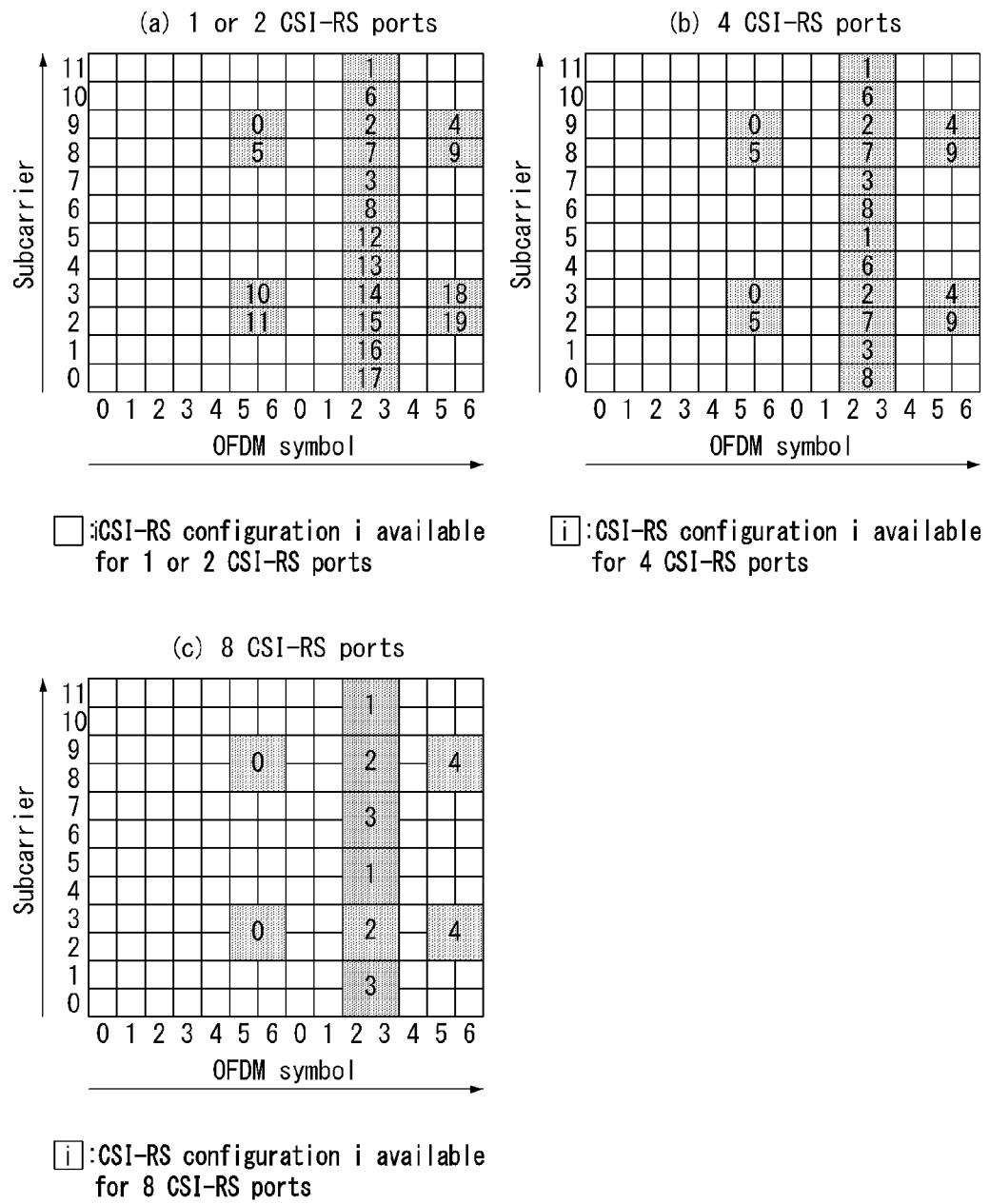
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied. Particularly, FIG. 8 illustrates CSI-RS patterns for cases in which the number of CSI-RS antenna ports is 1 or 2, 4 and 8 in a subframe to which a normal CP is applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM (Code Division Multiplexing) for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by and the complex symbol of the CSI-RS for the antenna port 16 is multiplied by 1-11 and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code 11 multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

Figure 9:
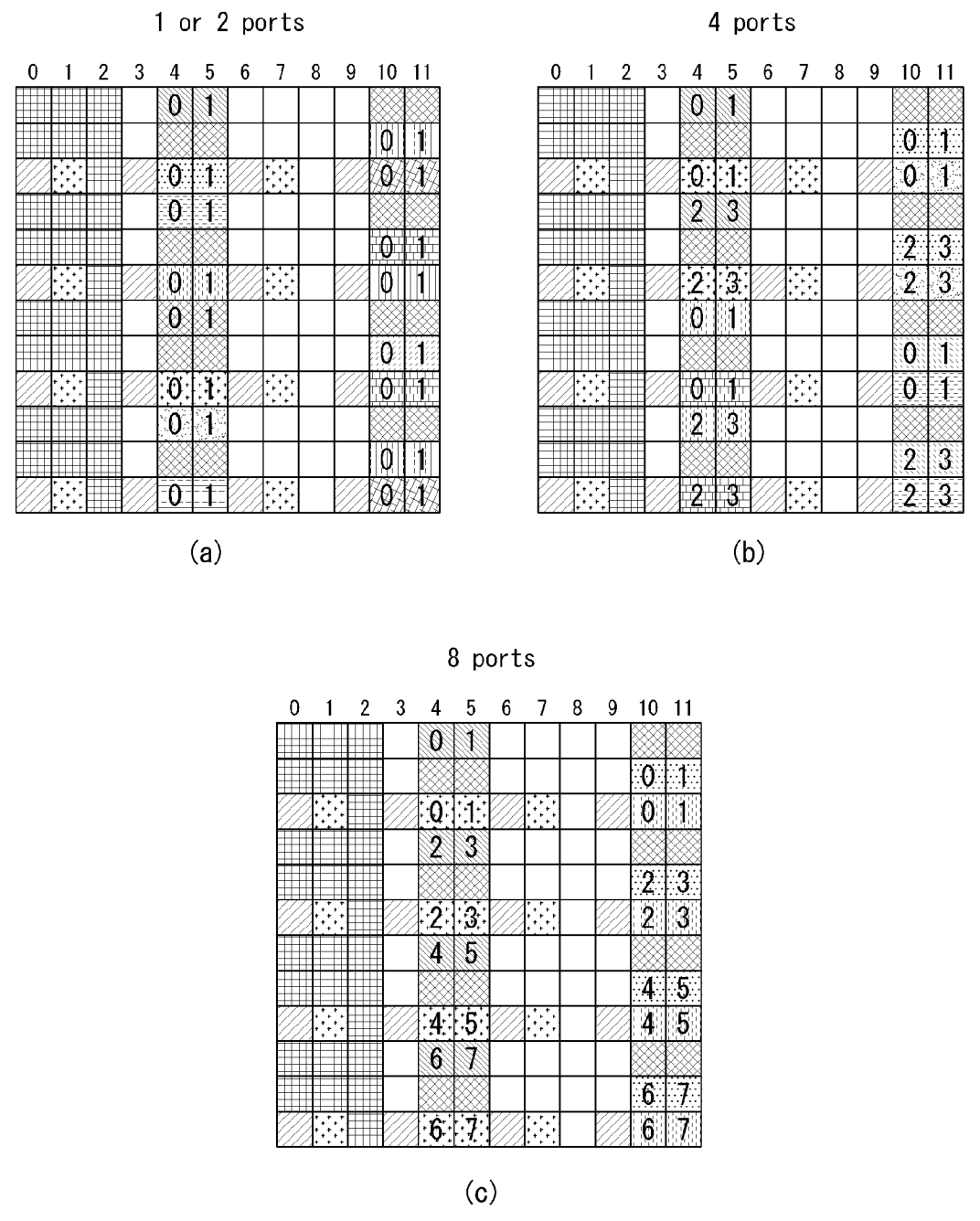

FIG. 9 illustrates resources to which reference signals are mapped in a wireless communication system to which the present invention is applicable.

Particularly, FIG. 9 shows CSI-RS patterns for cases in which the number of CSI-RS antenna ports is 1 or 2, 4 and 8 in a subframe to which an extended CP is applied.

FIG. 9(a) shows 16 CSI-RS configurations which can be used for CSI-RS transmission through 1 or 2 CSI-RS antenna ports, FIG. 9(b) shows 8 CSI-RS configurations which can be used for CSI-RS transmission through 4 CSI-RS antenna ports, and FIG. 9(c) shows 4 CSI-RS configurations which can be used for CSI-RS transmission through 8 CSI-RS antenna ports.

In this manner, radio resources (i.e., RE pairs) for CSI-RS transmission are determined depending on each CSI-RS configuration.

When one or two antenna ports are set for CSI-RS transmission for a specific cell, CSI-RSs are transmitted on radio resources according to a set CSI-RS configuration among the 16 CSI-RS configurations shown in FIG. 9(a).

Similarly, when 4 antenna ports are set for CSI-RS transmission for a specific cell, CSI-RSs are transmitted on radio resources according to a set CSI-RS configuration among the 8 CSI-RS configurations shown in FIG. 9(b). Further, when 8 antenna ports are set for CSI-RS transmission for a specific cell, CSI-RSs are transmitted on radio resources according to a set CSI-RS configuration among the 4 CSI-RS configurations shown in FIG. 9(c). A plurality of CSI-RS configurations may be used in a single cell. Only zero or one CSI-RS configuration may be used for a non-zero power (NZP) CSI-RS and zero or multiple CSI-RS configurations may be used for a zero power (ZP) CSI-RS.

For each bit set to 1 in a zero-power (ZP) CSI-RS ('ZeroPowerCSI-RS) that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, CSI-RS periodicity TCSI-RS and a subframe offset ΔCSI-RS are determined depending on CSI-RS subframe configuration ICSI-RS.

The CSI-RS subframe configuration in Table 5 may be set to one of the aforementioned 'SubframeConfig' field and 'zeroTxPowerSubframeConfig' field. The CSI-RS subframe configuration may be separately set for an NZP CSI-RS and a ZP CSI-RS.

A subframe including a CSI-RS satisfies Equation 13.

$$(10n_f + \lfloor n_s/2 \rfloor - \Delta_{CSI-RS}) \bmod T_{CSI-RS} = 0 \quad \text{[Equation 13]}$$

In Equation 13, TCSI-RS indicates CSI-RS periodicity, ΔCSI-RS indicates a subframe offset value, of denotes a system frame number, and ns denotes a slot number.

In the case of a UE for which transmission mode 9 is set with respect to a serving cell, a single CSI-RS resource configuration may be set for the UE. In the case of a UE for which transmission mode 10 is set with respect to the serving cell, one or more CSI-RS resource configurations may be set for the UE.

CSI-RS Configuration

The current LTE standard includes antennaPortsCount, subframeConfig, resourceConfig, etc. as parameters regarding a CSI-RS configuration. Such parameters indicate that a CSI-RS is transmitted in how many antenna ports, the cycle and offset of a subframe in which a CSI-RS is to be transmitted, and that a CSI-RS is transmitted at which RE location (e.g., frequency and OFDM symbol index) of a corresponding subframe. Specifically, an eNB transmits the following contents of parameters/information when it indicates/delivers a specific CSI-RS configuration to a UE.

antennaPortsCount: Parameter to represent the number of antenna ports used for transmission of CSI reference signals) (e.g., 1 CSI-RS port, 2 CSI-RS ports, 4 CSI-RS ports, or 8 CSI-RS ports)

resourceConfig: Parameter regarding a CSI-RS assignment resource location subframeConfig: Parameter regarding a subframe cycle and offset in which a CSI-RS is to be transmitted p-C: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size zeroTxPowerResourceConfigList: Parameter regarding a zero-power CSI-RS configuration zeroTxPowerSubframeConfig: Parameter regarding a subframe cycle and offset in which a zero-power CSI-RS is to be transmitted Massive MIMO A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 10:
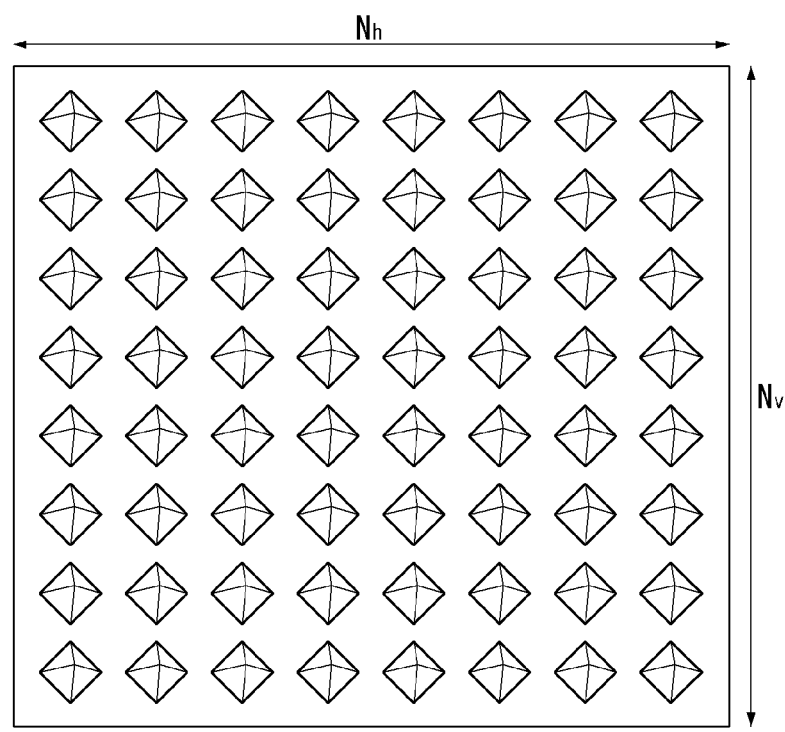
FIG. 10 illustrates a two-dimensional (2D) active antenna system having 64 antenna elements in a wireless communication system to which the present invention is applicable.

FIG. 10 illustrates a 2D AAS having 64 antenna elements in a wireless communication system to which the present invention is applicable.

FIG. 10 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 11:
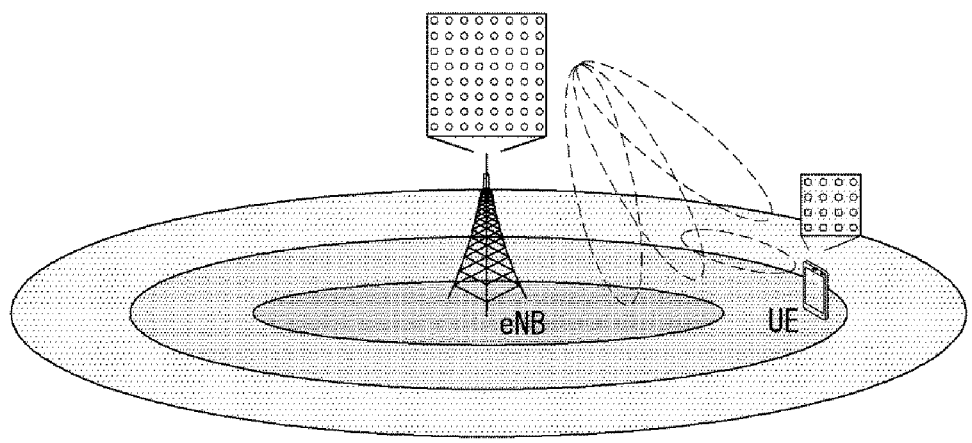
FIG. 11 illustrates a system in which a base station or a UE has a plurality of transmission/reception antennas capable of forming AAS based three-dimensional (3D) beams in a wireless communication system to which the present invention is applicable.

FIG. 11 illustrates a system in which an eNB or a UE has a plurality of transmission/reception antennas capable of forming AAS based 3D beams in a wireless communication system to which the present invention is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
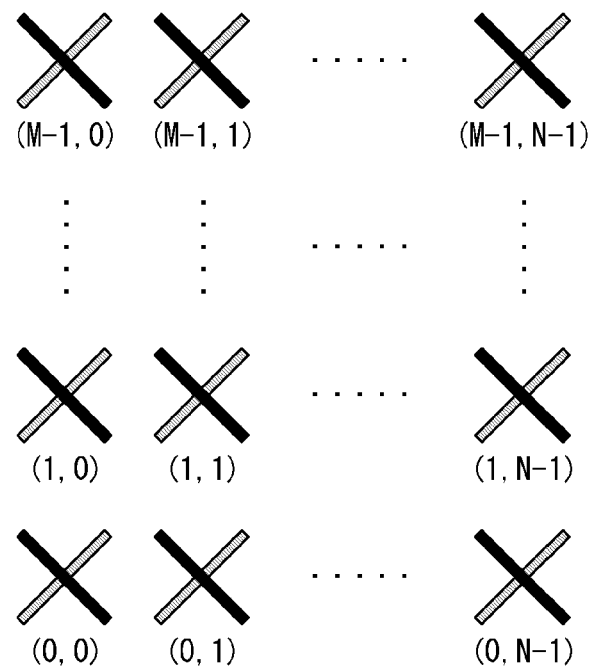
FIG. 12 illustrates a 2D antenna system having cross polarization in a wireless communication system to which the present invention is applicable.

FIG. 12 illustrates a 2D antenna system having cross polarization in a wireless communication system to which the present invention is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 11, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 13:
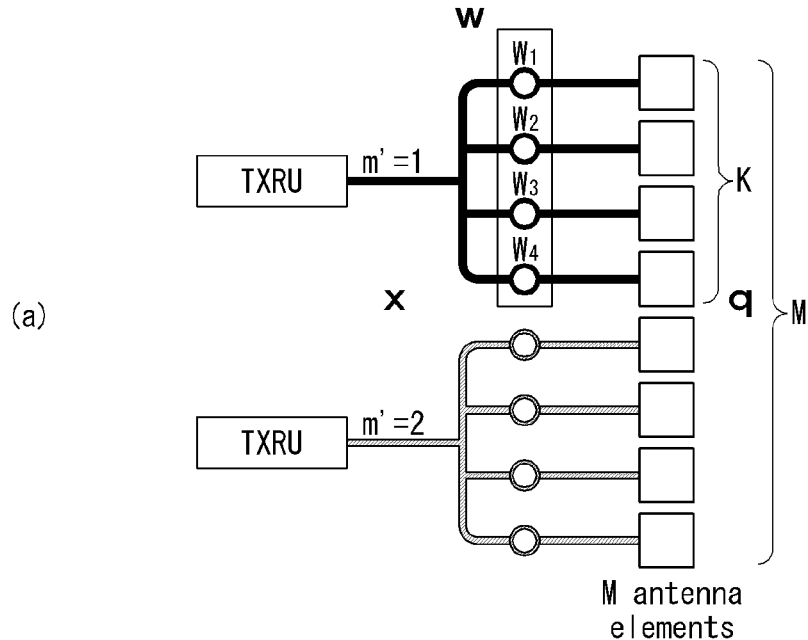
FIG. 13 illustrates transceiver unit models in a wireless communication system to which the present invention is applicable.
Figure 13:
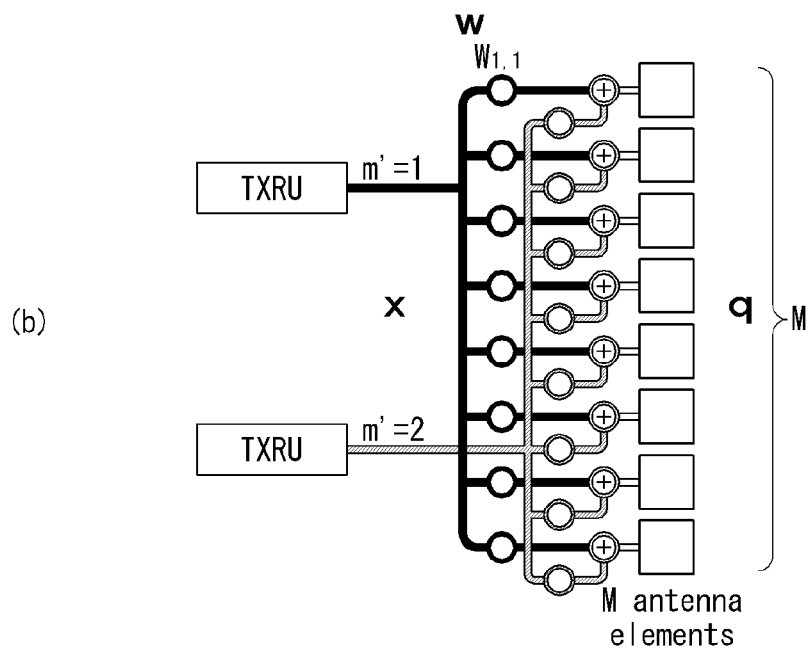

FIG. 13 illustrates transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 12(a) and TXRU virtualization model option-2: full-connection model as shown in FIG. 12(b) according to correlation between antenna elements and TXRU.

Referring to FIG. 13(a), antenna elements are partitioned into multiple antenna element groups and each TXRU is connected to one of the groups in the case of the sub-array partition model.

Referring to FIG. 13(b), multiple TXRU signals are combined and delivered to a single antenna element (or antenna element array) in the case of the full-connection model.

In FIG. 13, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 13 shows an example of TXRU-to-antenna element mapping and the present invention is not limited thereto. The present invention may be equally applied to mapping between TXRUs and antenna elements realized in various manners in terms of hardware.

Channel-State Information (CSI)-Reference Signal (CSI-RS) Definition

A UE may be configured with a single CSI-RS resource configuration with respect to a serving cell and UE in which the transmission mode 9 has been configured. A UE may be configured with one or more CSI-RS resource configuration (s) with respect to a serving cell and UE in which the transmission mode 10 has been configured. The following parameters for a UE that needs to assume non-zero transmit power for a CSI-RS are configured through higher layer signaling for each CSI-RS resource configuration:

CSI-RS resource configuration identifier (if the transmission mode 10 has been configured in a UE)

Number of CSI-RS ports

CSI-RS configuration

CSI-RS subframe configuration I_(CSI-RS)

The assumption of a UE for reference PDSCH transmit power for CSI feedback (P_c) (if the transmission mode 9 has been configured in the UE)

UE assumption for reference PDSCH transmit power for CSI feedback (P_c) for each CSI process when the transmission mode 10 is configured in a UE. When CSI subframe sets C_(CSI,0) and C_(CSI,1) are configured by a higher layer for a CSI process, P_c for each CSI subframe set of a CSI process is configured.

Pseudo-random sequence generator parameter (n_ID).

A CDM type parameter when a UE is configured with a higher layer parameter CSI-Reporting-Type and a CSI report type is configured as "CLASS A" for a CSI process.

If the transmission mode 10 has been configured in a UE, a higher layer parameter qcl-CRS-Info-r11 for the UE assumption of a QCL type B of CRS antenna ports and CSI-RS antenna ports having the following parameter:

qcl-ScramblingIdentity-r11.

crs-PortsCount-r11.

mbsfn-SubframeConfigList-r11.

P_c is an estimated ratio of PDSCH EPRE to CSI-RS energy per resource element (EPRE) when a UE derives CSI feedback and takes a value within a [−8, 15]dB range as 1 dB step size. In this case, the PDSCH EPRE corresponds to the number of symbols to the ratio of a PDSCH EPRE for a cell-related RS EPRE.

A UE does not expect a configuration of a CSI-RS and PMCH within the same subframe of a serving cell.

In the case of a frame structure type 2 serving cell and 4 CRS ports, a UE does not expect to receive a CSI-RS configuration index belonging to a [20-31] set in the case of a normal CP or a CSI-RS configuration index belonging to a [16-27] set in the case of an extended CP.

A UE may assume that the CSI-RS antenna ports of a CSI-RS resource configuration are QCLed with respect to delay spread, Doppler spread, Doppler shift, an average gain and average delay.

A UE in which the transmission mode 10 and QCL Type B have been configured may assume antenna ports 0-3 associated with qcl-CRS-Info-r11 corresponding to a CSI-RS resource configuration, and may assume that antenna ports 15-22 corresponding to a CSI-RS resource configuration has been QCLed with respect to Doppler shift and Doppler spread.

If the transmission mode 10 and a higher layer parameter CSI-Reporting-Type are configured in a UE, CSI-Reporting-Type is configured as "CLASS B", and the number of CSI-RS resources configured for a CSI process is one or more, and QCL type B has been configured, a UE does not expect to receive a CSI-RS resource configuration for a CSI process having a value different from a higher layer parameter qcl-CRS-Info-r11.

In a subframe constructed/configured for CSI-RS transmission, a reference signal sequence $r_{l,n_s}(m)$ may be mapped to complex-valued modulation symbols $a_{k,l}^{(p)}$ used as the reference symbols of an antenna port p. Such mapping depends on a higher layer parameter CDMType.

If CDMType does not correspond to CDM4, mapping according to Equation 14 may be performed.

$$a_{k,l}^{(p')} = w_{l''} \cdot r_{l,n_s}(m') \quad \text{[Equation 14]}$$

$$k = k' + 12m +
\begin{cases}
-0 & \text{for } p' \in \{15, 16\}, \text{normal cycle prefix} \\
-6 & \text{for } p' \in \{17, 18\}, \text{normal cycle prefix} \\
-1 & \text{for } p' \in \{19, 20\}, \text{normal cycle prefix} \\
-7 & \text{for } p' \in \{21, 22\}, \text{normal cycle prefix} \\
-0 & \text{for } p' \in \{15, 16\}, \text{extended cycle prefix} \\
-3 & \text{for } p' \in \{17, 18\}, \text{extended cycle prefix} \\
-6 & \text{for } p' \in \{19, 20\}, \text{extended cycle prefix} \\
-9 & \text{for } p' \in \{21, 22\}, \text{extended cycle prefix}
\end{cases}$$

$$l = l' + \begin{cases} l'' & \text{CSI reference signal configuration } 0 - 19, \\ & \text{normal cyclic prefix} \\ 2l'' & \text{CSI reference signal configuration } 20 - 31, \\ & \text{normal cyclic prefix} \\ l'' & \text{CSI reference signal configuration } 0 - 27, \\ & \text{extended cyclic prefix} \end{cases}$$

$$w_{l''} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

If CDMType corresponds to CDM4, mapping according to Equation 15 may be performed.

$$a_{k,l}^{(p')} = w_{p'}(i) \cdot r_{l,n_s}(m') \quad \text{[Equation 15]}$$

$$k = k' + 12m - \begin{cases} k'' & \text{for } p' \in \{15, 16, 19, 20\}, \\ & \text{normal cycle prefix, } N_{ports}^{CSI} = 8 \\ k'' + 6 & \text{for } p' \in \{17, 18, 21, 22\}, \\ & \text{normal cycle prefix, } N_{ports}^{CSI} = 8 \\ 6k'' & \text{for } p' \in \{15, 16, 17, 18\}, \\ & \text{normal cycle prefix, } N_{ports}^{CSI} = 4 \end{cases}$$

$$l = l' + \begin{cases} l'' & \text{CSI reference signal configuration } 0 - 19, \\ & \text{normal cyclic prefix} \\ 2l'' & \text{CSI reference signal configuration } 20 - 31, \\ & \text{normal cyclic prefix} \end{cases}$$

-continued $$l'' = 0, 1$$

$$k'' = 0, 1$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$w_{p'}^{(i)}$ in Equation 15 is determined by Table 6. Table 6 shows a sequence $w_{p'}^{(i)}$ for CDM 4.

TABLE 6

| p' | | |
|---|---|---|
| $N_{ports}^{CSI} = 4$ | $N_{ports}^{CSI} = 8$ | [$w_{p'}(0)$ $w_{p'}(1)$ $w_{p'}(2)$ $w_{p'}(3)$] |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

Channel State Information Transmission/Reception Method

In a massive MIMO system using a 2D-AAS, CSI-RS patterns for a large number of RS ports need to be supported/designed in order for a UE to acquire CSI and report the same to an eNB. Typically, the legacy system supports 1-port, 2-port, 4-port and 8-port CSI-RS patterns and Rel. 13 supports 12-port and 16-port patterns realized by aggregating conventional 4-port and/or 8-port CSI-RS patterns. To achieve higher spectral efficiency in the future, it is necessary to consider new CSI-RS patterns for a larger number of ports (e.g., 20 ports, 24 ports, 28 ports, 32 ports, 64 ports and the like) and method of configuring the same.

This is because, when a Q-port CSI-RS pattern (e.g., Q≤MNP) is configured for a UE in order to support effective (closed-loop) MIMO transmission from a transmitter including a large number of (e.g., M×N×P) transmission antenna elements like a massive MIMO system, the UE needs to be able to measure the Q-port CSI-RS to derive/calculate CSI. Such a Q-port CSI-RS is a non-precoded CSI-RS, and beamforming is not applied to the Q-port CSI-RS when it is transmitted from the transmitter. The Q-port CSI-RS may be transmitted in such a manner that each CSI-RS port having a wide beam width is transmitted.

In the present description, options that can be considered for new CSI-RS pattern designs mapped to X or more antenna ports (e.g., X=18) are as follows.

First embodiment: a method of aggregating and legacy patterns (2-port, 4-port and 8-port patterns) and 12-port and 16-port patterns defined in Rel. 13 and using aggregated patterns Second embodiment: a method of defining new patterns The second embodiment is a method of defining a plurality of CSI-RS patterns by selecting/using at least one of CSI-RS designs defined/represented by the first embodiment.

As a more specific embodiment with respect to the first embodiment, a 20-port CSI-RS resource/pattern may be considered. To generate the 20-port CSI-RS resource/pattern, 10 2-port CSI-RS resources/patterns or 5 4-port CSI-RS resources/patterns may be aggregated. A total of $_{20}C_{10}$=184756 20-port CSI-RS resources/patterns can be derived when 10 2-port CSI-RS resources/patterns are aggregated and a total of $_{10}C_5$=252 20-port CSI-RS resources/patterns can be derived when 5 4-port CSI-RS resources/patterns are aggregated.

However, increasing the number of aggregated CSI-RS resources causes a problem of system complexity increase. Accordingly, to prevent such complexity increase, the present description proposes a method of designing X-port or more (X corresponding to a natural number, e.g., X=18) CSI-RS resources/patterns based on aggregation of 2 CSI-RS resources. In this specification, the CSI-RS resource may be referred to as a CSI-RS configuration or a CSI-RS pattern.

The CSI-RS resource/pattern design method proposed in the present description configures new 20-port or more CSI-RS resources/patterns by aggregating a plurality of (e.g., 2) CSI-RS resources/patterns. Here, the unit of aggregated ports may be newly defined as ports more than the legacy 2-, 4- and 8-port and 12-, 16- and 20-port defined in Rel. 13. More specifically, each aggregated CSI-RS resource/pattern may correspond to a "composite CSI-RS resource/pattern". Here, a composite CSI-RS resource/pattern may refer to a single CSI-RS resource/pattern defined by aggregating a plurality of legacy CSI-RS resources/patterns defined in Rel. 13. For example, a composite CSI-RS resource/pattern may refer to a single 16-port CSI-RS resource/pattern composed of two legacy 8-port CSI-RS resources/patterns defined in Rel. 13 or a single 12-port CSI-RS resource/pattern composed of three legacy 4-port CSI-RS resources.

However, the "composite CSI-RS resource/pattern" defined by aggregating legacy CSI-RS resources in the present description does not refer to a CSI-RS resource obtained by arbitrarily aggregating legacy CSI-RS resources/pattern but refers to only a CSI-RS resource/pattern aggregated under limited conditions. Only a composite CSI-RS resource/pattern defined in this manner corresponds to at least one (i.e., an aggregation unit) of a plurality of (e.g., 2) CSI-RS resources/patterns aggregated in order to configure new 20-port or more CSI-RS resources/patterns proposed in the present description.

As representative specific restrictions/conditions, the number of ports of CSI-RS resources/patterns aggregated into a composite CSI-RS resource may be limited to a predefined value. For example, a 16-port CSI-RS resource/pattern as a permitted composite CSI-RS resource/pattern can be limited to only resources/patterns realized by aggregating 8-port+8-port resources/patterns (i.e., two legacy 8-port CSI-RS resources/patterns), and a 12-port CSI-RS resource/pattern may refer to only resources/patterns realized by aggregating 4-port+4-port+4-port resources/patterns. That is, when the number of ports of CSI-RS resources/patterns aggregated into a specific CSI-RS resource/pattern corresponds to preset n ports, the corresponding specific CSI-RS resources/patterns correspond to composite CSI-RS resources/patterns and thus can be used as a CSI-RS resource aggregation unit proposed in the present description.

In addition, restrictive application of CDM-2 and/or CDM-4, limitation of RE positions to which CDM is applied to specific positions and/or restrictive application of CDM-x (x>4) may be set as specific restrictions/conditions.

In the present description, "CDM-x" may be interpreted as CDM in which the length of an orthogonal sequence included in a weight vector is x or CDM in which the number of weight vectors is x.

In addition, when new 20-port or more CSI-RS resources/patterns are designed by aggregating a plurality of (e.g., 2) CSI-RS resources/patterns in the present description, the following restrictive conditions may be applied.

For example, when a new 20-port or more CSI-RS resource/pattern is designed, only aggregation of preset resources/patterns may be permitted. In other words, aggregation in other manners (e.g., aggregation of three or more CSI-RS resources/patterns, aggregation of a plurality of CSI-RS resources/patterns having other numbers of ports, etc.) other than preset/specified/specific aggregation are not permitted. Accordingly, UE implementation complexity lower than a specific level can be ensured.

Here, when a new 20-port or more CSI-RS resource/pattern is designed by aggregating two CSI-RS resources/patterns, the following embodiments may be provided as exemplary CSI-RS resources/patterns of allowable preset/specified/specific aggregation.

(1) 20-port CSI-RS resource/pattern:
16-port CSI-RS resource/pattern+4-port CSI-RS resource/pattern
12-port CSI-RS resource/pattern+8-port CSI-RS resource/pattern (2) 24-port CSI-RS resource/pattern:
12-port CSI-RS resource/pattern+12-port CSI-RS resource/pattern
20-port CSI-RS resource/pattern+4-port CSI-RS resource/pattern
16-port CSI-RS resource/pattern+8-port CSI-RS resource/pattern (3) 28-port CSI-RS resource/pattern:
12-port CSI-RS resource/pattern+16-port CSI-RS resource/pattern
20-port CSI-RS resource/pattern+8-port CSI-RS resource/pattern (4) 32-port CSI-RS resource/pattern:
16-port CSI-RS resource/pattern+16-port CSI-RS resource/pattern
20-port CSI-RS resource/pattern+12-port CSI-RS resource/pattern
24-port CSI-RS resource/pattern+8-port CSI-RS resource/pattern (5) 64-port CSI-RS resource/pattern:
32-port CSI-RS resource/pattern+32-port CSI-RS resource/pattern The above-described embodiments show examples of in which two CSI-RS resource/patterns have been combined. In the above-described embodiments, the combination sequence of CSI-RS resource patterns of different sizes may be changed.

As described above, according to the above-described embodiment, two divided CSI-RS resources/patterns may be aggregated to configure a new CSI-RS resource/pattern or 20-port or more. However, the present invention is not limited thereto. The above-described embodiment may be generalized or extended to an embodiment in which a plurality of divided CSI-RS resource/patterns is aggregated to configure a new CSI-RS resource/pattern or 20-port or more.

CSI-RS resources/patterns aggregated according to the above-described embodiment may be located within the same RB, may be located in different subframes spaced apart on a time axis, or may be located in different RBs (or PRB pairs) spaced apart on a frequency axis. If an embodiment in which CSI-RS resources/patterns are aggregated within one RB is excluded, that is, an embodiment in which CSI-RS resources/patterns are aggregated between different RBs (or PRB pairs) on the time axis or different RBs (or PRB pairs) on the frequency axis may include a case where a CSI-RS resource/pattern to increase a cell reuse factor or to exceed 40 REs defined in the standard is configured.

When CSI-RS resources/patterns are aggregated in one RB, a UE expects that the aggregated CSI-RS resources/patterns do not overlap. That is, if the aggregated CSI-RS resources/patterns partially overlap, the UE can ignore the corresponding configuration by regarding the same as an error case. Here, "aggregated CSI-RS resources/patterns do not overlap" may be interpreted as "the aggregated CSI-RS resources/patterns are not transmitted through the same subframe on the time axis or through the same RB on the frequency axis".

Accordingly, specific restrictions may be applied to an eNB/network such that the eNB/network provides only CSI-RS resource/pattern configurations in which aggregated CSI-RS resources/patterns do not overlap to the UE.

Hereinafter, embodiments in which aggregated CSI-RS resources/patterns are positioned in different subframes separated on the time axis or positioned in different RBs separated on the frequency axis when two CSI-RS resources/patterns are aggregated to configure a new 20-port or more CSI-RS resource/pattern will be described in more detail. Although description focuses on cases in which two CSI-RS resources/patterns are aggregated to configure a new 20-port or more CSI-RS resource/pattern in the following embodiments for convenience of description, the present invention is not limited thereto and can be generalized as or extended and applied to embodiments in which a plurality of separate CSI-RS resources/patterns are aggregated to configure new 20-port or more CSI-RS resources/patterns.

Figure 14:
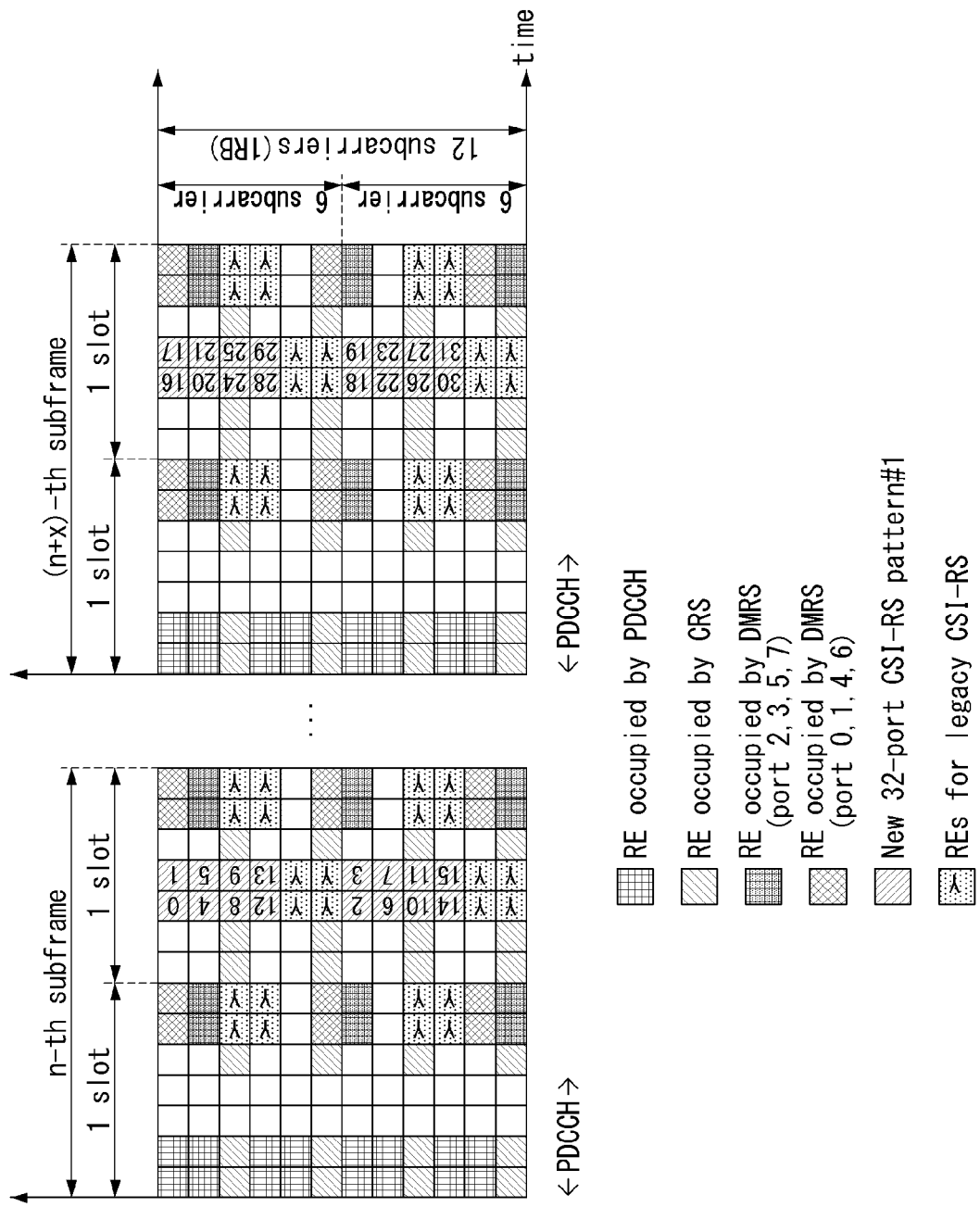
FIG. 14 illustrates a 32-port CSI-RS resource/pattern configured by aggregating two 16-port CSI-RS resources/patterns according to an embodiment of the present invention.

FIG. 14 illustrates a 32-port CSI-RS resource/pattern configured by aggregating two 16-port CSI-RS resources/patterns according to an embodiment of the present invention. In this figure, port numbers 0, 1, 2, 3, . . . are exemplary for convenience of description and may be sequentially mapped to port numbers 15, 16, 17, 18, . . . .

Referring to FIG. 14, the aggregated 16-port CSI-RS resources/patterns are respectively positioned in different subframes. More specifically, the aggregated two CSI-RS resources/patterns are respectively positioned in (or mapped to) a subframe n (or n-th subframe) and a second subframe n+x (or (n+x)-th subframe) separated from the subframe n by x (x=0, 1, 2, , , , ) to configure a new 20-port or more CSI-RS resource/pattern. If the number of configured ports is 40 or less, the CSI-RS resources/patterns can be aggregated in the same subframe (i.e., x=0).

Table 5 shows CSI-RS subframe configurations in the LTE system. CSI-RS subframe configurations are defined on the basis of CSI-RS periodicity and a subframe offset. The CSI-RS periodicity can be set in units of 5, 10, 20, 40 or 80 subframes. CSI-RS resources (here, the CSI-RS resources may correspond to composite CSI-RS resources) transmitted according to time division multiplexing (TDM) may have different offset values in the present description. That is, when the 32-port CSI-RS resource is configured in the example of FIG. 14, different CSI-RS offset values may be set for the 16-port CSI-RS resource in the subframe n and the 16-port CSI-RS resource in the subframe n+x. That is, when specific composite CSI-RS resources are aggregated to configure a new CSI-RS resource/pattern, restrictions may be applied such that resources/patterns within a corresponding composite CSI-RS resource cannot be time-division-multiplexed and need to be transmitted in the same subframe.

Figure 15:
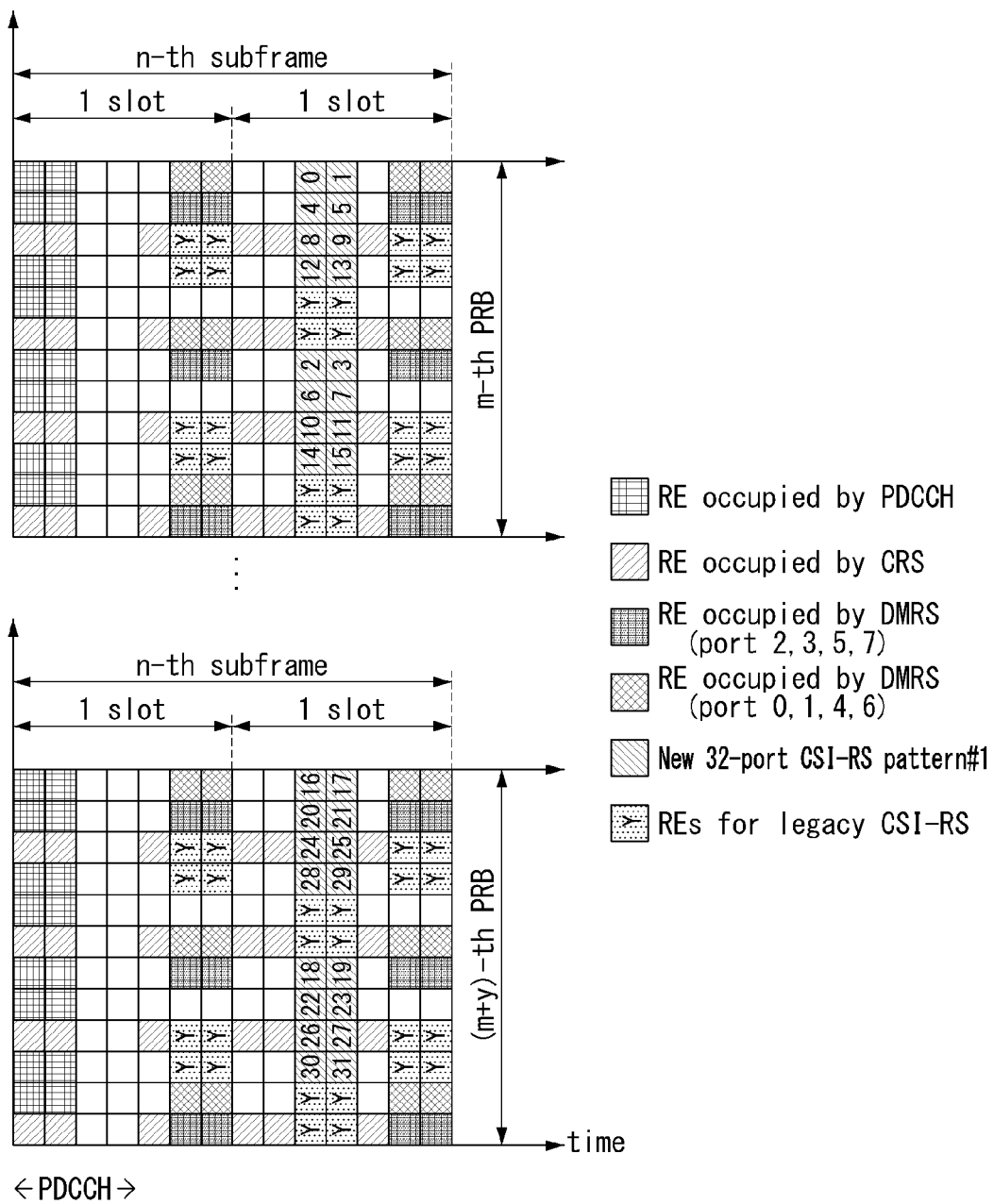
FIG. 15 illustrates a 32-port CSI-RS resource/pattern configured by aggregating two 16-port CSI-RS resources/patterns according to an embodiment of the present invention.

FIG. 15 illustrates a 32-port CSI-RS resource/pattern configured by aggregating two 16-port CSI-RS resources/patterns according to an embodiment of the present invention. In this figure, port numbers 0, 1, 2, 3, . . . are exemplary for convenience of description and may be sequentially mapped to port numbers 15, 16, 17, 18, . . . .

Referring to FIG. 15, the aggregated 16-port CSI-RS resources/patterns are positioned in different RBs in the same subframe. More specifically, the aggregated two CSI-RS resources/patterns are respectively positioned in (or mapped to) an m-th PRB in a subframe n and an (m+y)-th RB separated from the m-th PRB by y (y=0, 1, 2, , , , ) to configure a new 20-port or more CSI-RS resource/pattern. If the number of configured ports is 40 or less, the CSI-RS resources/patterns can be aggregated in the same RB (i.e., y=0).

Figure 16:
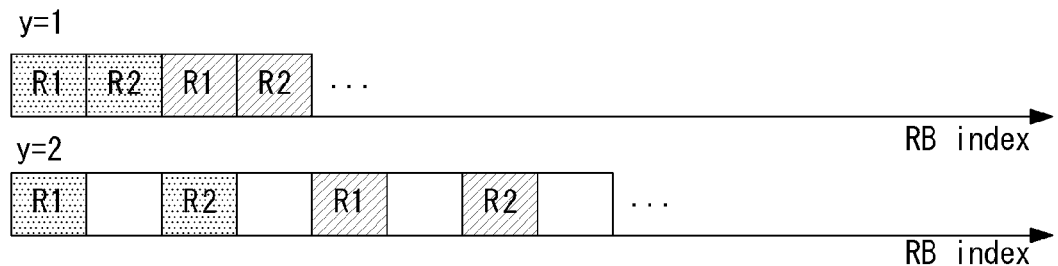
FIG. 16 illustrates an embodiment of a CSI-RS resource/pattern design using FDM according to an embodiment of the present invention.

FIG. 16 illustrates an embodiment of a CSI-RS resource/pattern design using FDM according to an embodiment of the present invention. In FIG. 16, R1 and R2 refer to different composite CSI-RS resources/patterns 1 and 2. R1 and R2 having the same pattern are aggregated to configure a new CSI-RS resource/pattern.

Referring to FIG. 16, when two aggregated CSI-RS resources/patterns are respectively positioned/mapped in/to neighboring/consecutive RBs in the same subframe (i.e., y is 1 (y=1)), two consecutive RBs are frequency-division-multiplexed (FDM) and thus consecutive 24 subcarriers can configure a new X-port (e.g., X=18) or more CSI-RS resource/pattern. Furthermore, when two aggregated CSI-RS resources/patterns are respectively positioned/mapped in/to RBs separated from each other having one RB therebetween in the same subframe (i.e., y is 2 (y=2)), two consecutive odd-numbered RBs or two consecutive even-numbered RBs may be frequency-division-multiplexed to configure a new X-port or more (e.g., X=18) CSI-RS resource/pattern.

When a composite CSI-RS resource/pattern becomes a component of a new 20-port or more CSI-RS resource/pattern in the present embodiment, restrictions may be applied such that CSI-RS resources/patterns aggregated in the composite CSI-RS resource/pattern cannot be frequency-division-multiplexed and need to be transmitted in the same RB pair.

Although not shown, aggregation of CSI-RS resources/patterns corresponding to the m-th RB in the subframe n and the (m+y)-th RB in the subframe (n+x) may also be derived/applied/considered according to a combination of the embodiments of FIGS. 14 and 15 as another embodiment.

Figure 17:
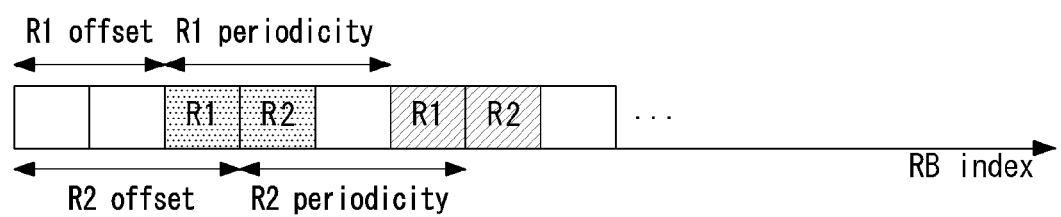
FIG. 17 illustrates an embodiment of a CSI-RS resource/pattern design using FDM according to an embodiment of the present invention.

FIG. 17 illustrates an embodiment of a CSI-RS resource/pattern design using FDM according to an embodiment of the present invention. In FIG. 16, R1 and R2 refer to different composite CSI-RS resources/patterns 1 and 2. R1 and R2 having the same pattern are aggregated to configure a new CSI-RS resource/pattern.

To configure a CSI-RS resource/pattern using 1-DM according to the above-described embodiment, information such as CSI-RS transmission (RB) periodicity and an RB offset for CSI-RS transmission/mapping needs to be additionally signaled to UEs through radio resource control (RRC) signaling as in TDM. To this end, when a new CSI-RS resource/pattern configured by aggregating a plurality of CSI-RS resources through FDM on the frequency axis is transmitted, each aggregated CSI-RS resource may be transmitted at a frequency spacing of 12c and may have a frequency offset set to 12d, as shown in FIG. 17, in the present description. Here, c and/or d may be set differently for aggregated CSI_RS resources. That is, c and/or d may be set differently for the aggregated CSI_RS resources, and C and/or d may not be set differently for ports in each CSI-RS resource/pattern.

In addition, when two CSI-RS resources/patterns are aggregated to configure a new CSI-RS resource/pattern, the value c associated with periodicity of RBs in/to which CSI-RSs are transmitted/mapped (referred to as "CRS-RS RB periodicity" hereinafter) may be set to a single value c to be commonly applied to the two aggregated (composite) CSI-RS resources/patterns. In this case, the value d associated with offset of RBs in/to which CSI-RSs are transmitted/mapped (referred to as "CRS-RS RB offset" hereinafter) may be individually set for respective aggregated CSI-RS resources/patterns. In other words, the periodicity of the aggregated CSI-RS resources R1 and R2 conforms to a commonly set RB periodicity, and different RB offsets (R1 offset and R2 offset) may be set for the respective aggregated resources R1 and R2. That is, only a manner in which the aggregated CSI-RS resources are frequency-division-multiplexed and transmitted at the same RB periodicity, as shown in FIG. 17, is permitted. Accordingly, respective CSI-RS resources have the same RS density.

The value c associated with CSI-RS RB periodicity and the value d associated with CSI-RS RB offset may be defined/set such that they are joint-encoded. For example, like subframeConfig which is set according to joint encoding of periodicity/offset as a time axis related configuration in the current standards, RB periodicity and/or offset may be set according to joint encoding as frequency axis related configurations to be set as a single parameter (per CSI-RS resource) such as specific RBconfig. If the value c is commonly applied to aggregated CSI-RS resources as described above, a single value of c and values of d for the respective CSI-RS resources (e.g., a single value of c and two values of d (d1 and d2)) may be defined and set to a single RBconfig parameter according to joint encoding. That is, the RBconfig parameter can be regarded as being set/defined by joint-encoding parameters of a plurality of values of d (e.g., d1 and d2).

When the above-described embodiment in which the two CSI-RS resources/patterns are aggregated to configure a new CSI-RS resource/pattern is considered, information about x and/or y may be transmitted to UEs through RRC signaling. Here, cases in which x=y=0 and x=y=1 can be implicitly recognized by UEs and thus additional RRC signaling therefor may not be required. A RE position (e.g., a RE position at which each CSI-RS resource/pattern starts) of each of aggregated CSI-RS resources/patterns may be signaled to UEs through RRC signaling per CSI-RS resource/pattern.

To reduce signaling overhead, specific configurations (e.g., the number of ports) with respect to aggregated CSI-RS resources/patterns may be limited to the same configuration. In an embodiment, the number of aggregated CSI-RS resources/patterns may be limited to a preset number such that two 16-port CSI-RS resources/patterns are aggregated/combined to generate a 32-port CSI-RS resource/pattern and two 12-port CSI-RS resources/patterns are aggregated to generate a 24-port CSI-RS resource/pattern. In addition, if aggregated CSI-RS resources/patterns are positioned in (or mapped to) different PRBs, CSI-RSs may be limited such that they are mapped to the same RE position per RB pair.

In Rel. 13, CDM-2 and CDM-4 are supported for 12-port and 16-port CSI-RS resources/patterns. When a 20-port or more CSI-RS resource/pattern proposed in the present description is configured using only 12-port or 16-port CSI-RS resources/patterns for which CDM-4 is supported, CDM-2 and CDM-4 may be extended and supported, and information about which CDM is applied may be transmitted to UEs through RRC signaling. Here, CDM-4 applied to CSI-RS resources/patterns aggregated in the present invention may differ from CDM-4 applied to 12-port and 16-port CSI-RS resources/patterns defined in Rel. 13.

In other words, CDM-4 is applied in units/form of legacy 4-port pattern in the case of the 12-port CSI-RS resources/patterns (i.e., CDM is applied in units of two RE sets (or two RE pairs) separated from each other by six subcarriers), and CDM-4 is applied to neighboring 2-by-2 REs (REs in two columns and two rows) in the case of 16-port CSI-RS resources/patterns. Accordingly, different CDM-4s may be applied to respective resources/patterns aggregated to generate an X-port (e.g., X=18) or more CSI-RS resource/pattern in embodiments proposed in the present description.

When a 28-port CSI-RS resource/pattern is configured by aggregating a 16-port CSI-RS resource/pattern and a 12-port CSI-RS resource/pattern in an embodiment, CDM-4 is applied to neighboring 2-by-2 REs in the aggregated 16-port CSI-RS resource/pattern and CDM-4 is applied in the form of legacy 4 ports in the aggregated 12-port CSI-RS resource/pattern. A UE performs operation for realizing the same.

If CDM-4 in units/form of legacy 4 ports is applied to at least one of aggregated CSI_RS resources/patterns, CDM-4 in units/form of legacy 4 ports needs to be applied to X-port (e.g., X=18) or more CSI-RS resources/patterns generated by aggregating the corresponding CSI-RS resources/patterns. That is, restrictions may be applied to the eNB/network such that the same CDM-4 pattern is applied to aggregated CSI-RS resources/patterns when the eNB/network provides CDM related configurations to be applied to CSI-RS resources/patterns to UEs.

If the CDM-4 application method is taken into consideration, as in a 28-, 32-port CSI-RS resource/pattern, when a CSI-RS resource/pattern having the number of ports greater than 24 REs for a CSI-RS resource/pattern present in OFDM symbol Nos. 9, 0 is transmitted, full power transmission may be inevitable. The reason for this is that if CDM-4 is applied to a CSI-RS resource/pattern mapped to Nos. 5, 6 or Nos. 12, 13 OFDM symbols other than Nos. 9, 10 OFDM symbols, 6 dB boosting is difficult. Accordingly, this specification proposes an embodiment in which an FDM or TDM scheme for reducing CSI-RS density is applied/configured in order to achieve the full power transmission of a 28-, 32-port CSI-RS resource/pattern. In other words, if CDM-4 is configured with respect to a CSI-RS resource/pattern having the number of ports equal or greater than 24-port, the corresponding CSI-RS resource/pattern may be restricted/configured to be transmitted according to an FDM or TDM scheme. Such a restriction/configuration may be indicated through RRC signaling of an eNB.

When the above-described embodiment is applied, only CSI-RS resources/patterns having a number of ports corresponding to a multiple of 4, for example, 20-port, 24-port, 28-port, 32-port and 64-port CSI-RS resources/patterns, can be restrictively configured. Accordingly, a method of configuring 6-port and 10-port CSI-RS resources/patterns is also proposed in order to configure CSI-RS resources/patterns having more various numbers of ports.

Figure 18:
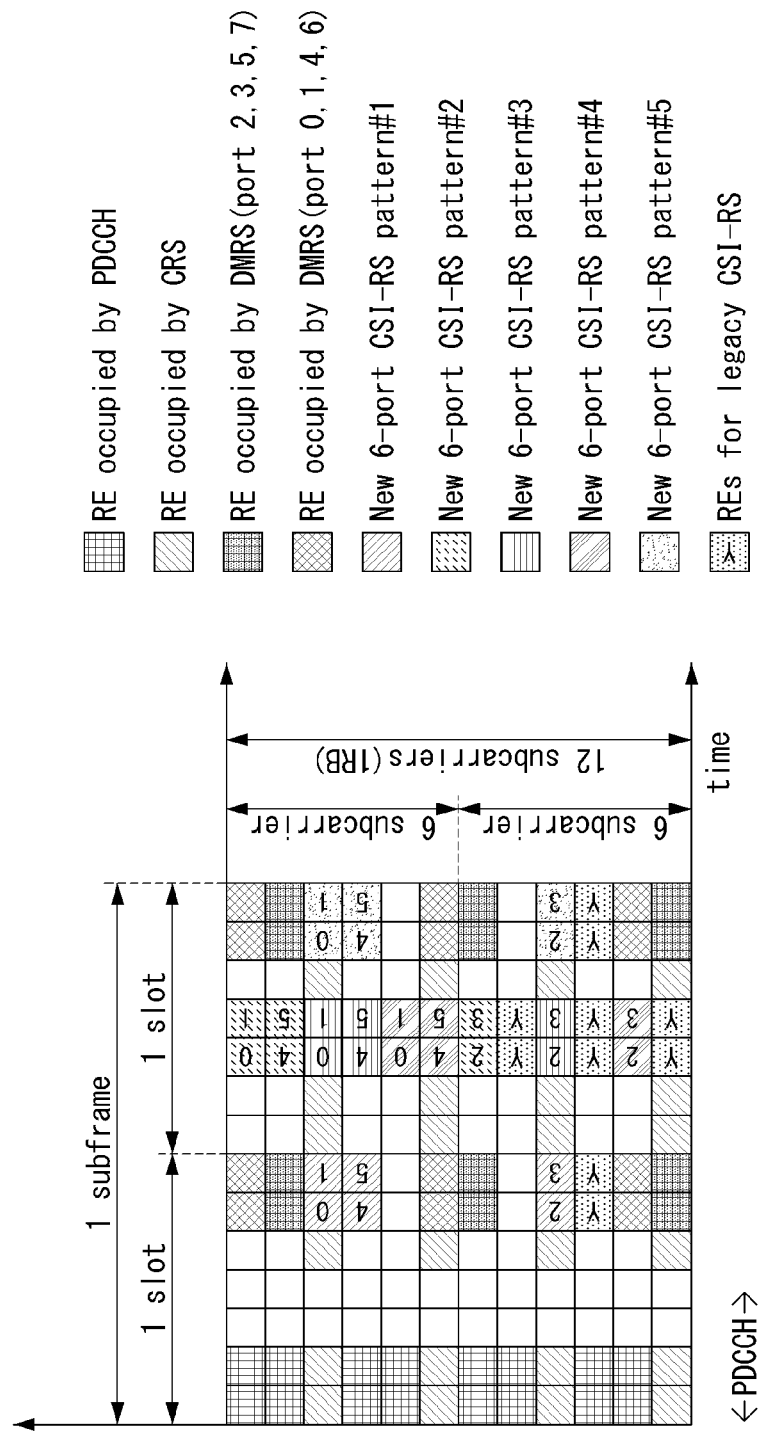
FIGS. 18 and 19 illustrate methods of configuring 6-port CSI-RS resources/patterns according to embodiments of the present invention.
Figure 19:
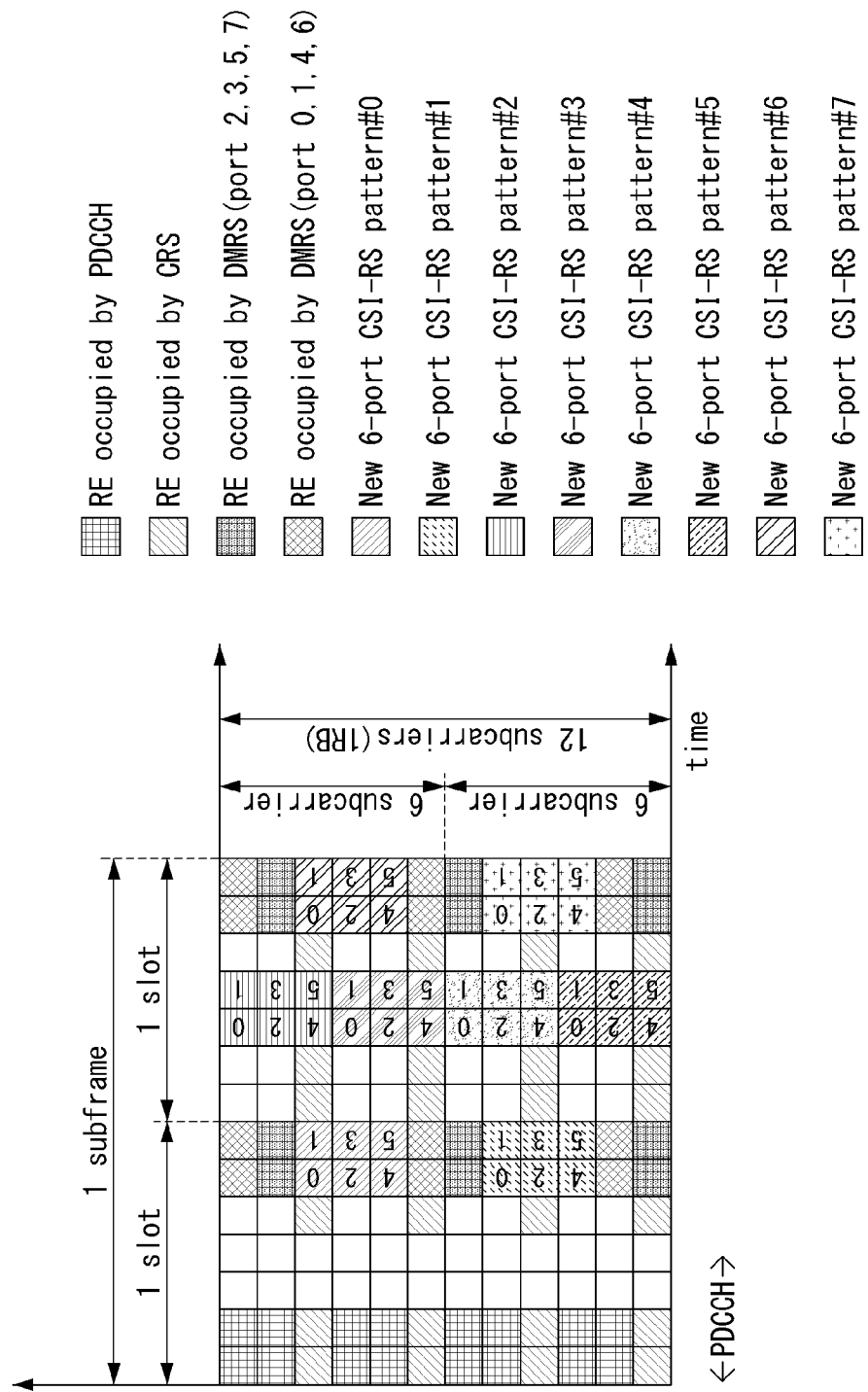

FIGS. 18 and 19 illustrate methods of configuring 6-port CSI-RS resources/patterns according to embodiments of the present invention.

Referring to FIG. 18, a 6-port CSI-RS resource/pattern may be configured as a subset of a legacy 8-port CSI-RS resource/pattern in an embodiment. That is, the embodiment illustrated in the figure is characterized in that six ports, for example, {0, 1, 2, 3, 4, 5}, {2, 3, 4, 5, 6, 7}, {0, 1, 4, 5, 6, 7} or {0, 1, 2, 3, 6, 7} are selected from legacy 8-port {0, 1, 2, 3, 4, 5, 6, 7} to configure a 6-port CSI-RS resource/pattern. Here, 6-port CSI-RS resources/patterns may be composed of the same subset or different subsets of the legacy 8-port 6-port CSI-RS resource/pattern. In the present embodiment, a 6-port CSI-RS resource/pattern is composed of a subset of the legacy 8-port CSI-RS resource/pattern and thus the cell reuse factor of the proposed 6-port CSI-RS resource/pattern design is 5.

Since the number of ports is not a multiple of 4 in the 6-port CSI-RS resource/pattern design according to the present embodiment, CDM-4 cannot be applied. Accordingly, only CDM-2 can be restrictively applied to new CSI-RS resources/patterns generated using 6-port CSI-RS resources/patterns.

Referring to FIG. 19, CSI-RS resources which have been composed of 40 REs in the past may be newly defined as CSI-RS resources composed of 48 REs. More specifically, 8 REs corresponding to port numbers {4, 5} of pattern #0, port numbers {0, 1} of pattern #1, port numbers {4, 5} of pattern #6 and port numbers {0, 1} of pattern #7 may be set as additional CSI-RS resources in addition to 40 REs defined as CSI-RS resources in the past in the present embodiment. Accordingly, a total of 48 REs can be used/set as CSI-RS resources. The 6-port CSI-RS resource design according to the present embodiment has the advantage of cell reuse factor increase to 8 compared to the embodiment shown in FIG. 18.

Application of CDM-2 to 6-port CSI-RS resource/patterns according to the present embodiment is assumed, and Embodiments of aggregating two CSI-RS resources/patterns when X-port (e.g., X=18) or more CSI-RS resources/patterns are designed have been described. However, the present invention is not limited thereto and the above-described embodiments may be extended to embodiments of designing X-port (e.g., X=18) or more CSI-RS resources/patterns by aggregating a plurality of CSI-RS resources/patterns (i.e., aggregating y CSI-RS resources/patterns (y≥2)).

When X-port (e.g., X=18) or more CSI-RS resources/patterns are configured according to the above-described embodiments, problems of unsupported full-power transmission and power imbalance between CSI-RS transport ports may still occur even when CDM-4 introduced in Rel. 13 is used. Accordingly, to solve such problems, the present description proposes CDM having a length greater than 4 to be applied to X-port (e.g., X=18) or more CSI-RS resources/patterns.

First, CDM-6 to be applied to the 6-port CSI-RS resource/pattern design illustrated in FIG. 19 is proposed. CDM-6 can be applied to the new 6-port CSI-RS resource/pattern illustrated in FIG. 19 by multiplying CSI-RSs transmitted through the new 6-port CSI-RS resource/pattern by weight vectors of Equation 16 for the respective ports. That is, CDM-6 can be applied/set by multiplying CSI-RSs mapped to six frequency-division-multiplexed CSI-RS ports {0, 1, 2, 3, 4, 5} in the CSI-RS resource/pattern illustrated in FIG. 19 by the weight vectors of Equation 16. Here, the CSI-RSs mapped to the ports {0, 1, 2, 3, 4, 5} may be sequentially multiplied by different weight vectors W0 to W5.

$$W_0 = [\begin{array}{cccccc} 1 & 1 & 1 & 1 & 1 & 1 \end{array}],$$

$$W_1 = \left[\begin{array}{cccccc} 1 & \exp\left(\frac{2\pi j}{6}\right) & \exp\left(\frac{2\pi j2}{6}\right) & \exp\left(\frac{2\pi j3}{6}\right) & \exp\left(\frac{2\pi j4}{6}\right) & \exp\left(\frac{2\pi j5}{6}\right) \end{array}\right],$$

$$W_2 = \left[\begin{array}{cccccc} 1 & \exp\left(\frac{2\pi j2}{6}\right) & \exp\left(\frac{2\pi j4}{6}\right) & \exp\left(\frac{2\pi j6}{6}\right) & \exp\left(\frac{2\pi j8}{6}\right) & \exp\left(\frac{2\pi j10}{6}\right) \end{array}\right],$$

$$W_3 = \left[\begin{array}{cccccc} 1 & \exp\left(\frac{2\pi j3}{6}\right) & \exp\left(\frac{2\pi j6}{6}\right) & \exp\left(\frac{2\pi j9}{6}\right) & \exp\left(\frac{2\pi j12}{6}\right) & \exp\left(\frac{2\pi j15}{6}\right) \end{array}\right],$$

$$W_4 = \left[\begin{array}{cccccc} 1 & \exp\left(\frac{2\pi j4}{6}\right) & \exp\left(\frac{2\pi j8}{6}\right) & \exp\left(\frac{2\pi j12}{6}\right) & \exp\left(\frac{2\pi j16}{6}\right) & \exp\left(\frac{2\pi j20}{6}\right) \end{array}\right],$$

$$W_5 = \left[\begin{array}{cccccc} 1 & \exp\left(\frac{2\pi j5}{6}\right) & \exp\left(\frac{2\pi j10}{6}\right) & \exp\left(\frac{2\pi j15}{6}\right) & \exp\left(\frac{2\pi j20}{6}\right) & \exp\left(\frac{2\pi j25}{6}\right) \end{array}\right]$$

[Equation 16]

CDM-2 may be applied to REs corresponding to port numbers {1, 2}, {2, 3} and {4, 5} of each resource/pattern.

When a 6-port CSI-RS resource/pattern according to the present embodiment is configured for a UE through RRC signaling, a CSI-RS resource/pattern according to the CSI-RS resource/design pattern illustrated in FIG. 19 can be configured.

A 10-port CSI-RS resource/pattern may be configured by aggregating 4-port and 6-port CSI-RS resources/patterns or aggregating 2-port and 8-port CSI-RS resources/patterns. The number of ports of a 10-port CSI-RS resource/pattern is not a multiple of 4 and thus CDM-4 cannot be applied thereto. Accordingly, only CDM-2 can be restrictively applied to a new CSI-RS resource/pattern generated using a 10-port CSI-RS resource/pattern.

Equation 16 is derived from a 6×6 DFT matrix and codes are orthogonal.

When the above-described embodiment is applied, 7.8 dB can be guaranteed for CDM and power imbalance between CSI-RS transport ports can be mitigated.

Figure 20:
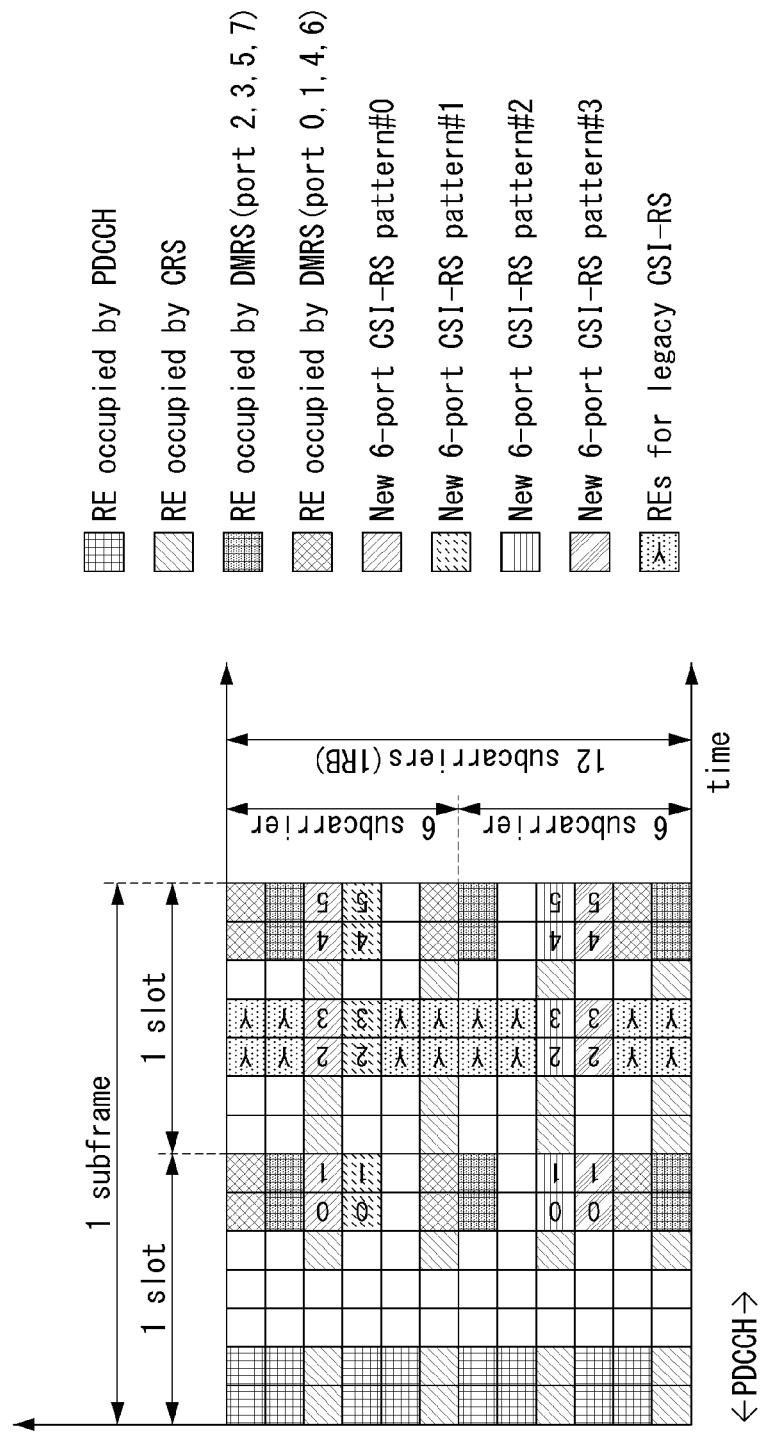
FIG. 20 illustrates an embodiment when CDM-6 is applied on the time axis according to an embodiment of the present invention.

FIG. 20 illustrates an embodiment when CDM-6 is applied on the time axis according to an embodiment of the present invention.

In a 6-port CSI-RS resource/pattern design illustrated in FIG. 20, CDM-6 can be set/applied by multiplying CI-RSs mapped to six time-division-multiplexed CSI-RS ports {0, 1, 2, 3, 4, 5} by the weight vectors of Equation 16.

In the present embodiment, when CDM is applied on the time axis, CDM is applied to a set of the same REs on the frequency axis. However, the present invention is not limited thereto. Three of legacy 2-ports located in OFDM symbols {5,6}, {9,10} and {12,13}, respectively, may be selected and subjected to CDM-6 (i.e., CDM-6 may be applied to a set of REs located in the same frequency axis or different frequency axes). However, in this case, system flexibility may be improved, but performance degradation is expected in a frequency selective environment. Accordingly, the present embodiment (i.e., embodiment in which the time axis CDM-6 is applied) may be limitedly applied to REs in which a subcarrier difference is 2 or less in the frequency axis.

Hereinafter, CDM-8 is proposed.

In the case of CDM-8, a configuration of a codeword may be derived from a DFT matrix or Walsh matrix. More specifically, a codeword for CDM-8 may be derived from a DFT matrix, and may be configured by extending Equation 16 to an 8×8 DFT matrix. Furthermore, a codeword for CDM-8 may be derived from a Walsh matrix표, and a weight vector of CDM-8 is configured as in Equation 17.

$$W_0 = [1\ 1\ 1\ 1\ 1\ 1\ 1\ 1],$$
$$W_1 = [1\ 1\ 1\ 1\ -1\ -1\ -1\ -1],$$
$$W_2 = [1\ 1\ -1\ -1\ 1\ 1\ -1\ -1],$$
$$W_3 = [1\ 1\ -1\ -1\ -1\ -1\ 1\ 1],$$
$$W_4 = [1\ -1\ 1\ -1\ 1\ -1\ 1\ -1],$$
$$W_5 = [1\ -1\ 1\ -1\ -1\ 1\ -1\ 1],$$
$$W_6 = [1\ -1\ -1\ 1\ 1\ -1\ -1\ 1],$$
$$W_7 = [1\ -1\ -1\ 1\ -1\ 1\ 1\ -1],$$

or $$W_0 = [1\ 1\ 1\ 1\ 1\ 1\ 1\ 1],$$
$$W_1 = [1\ -1\ 1\ -1\ 1\ 1\ -1\ 1\ -1],$$
$$W_2 = [1\ 1\ -1\ -1\ 1\ 1\ -1\ -1],$$
$$W_3 = [1\ -1\ -1\ 1\ 1\ -1\ -1\ 1],$$
$$W_4 = [1\ 1\ 1\ 1\ -1\ -1\ -1\ -1],$$
$$W_5 = [1\ -1\ 1\ -1\ -1\ 1\ -1\ 1],$$
$$W_6 = [1\ 1\ -1\ -1\ -1\ -1\ 1\ 1],$$
$$W_7 = [1\ -1\ -1\ 1\ -1\ 1\ 1\ -1], \quad \text{[Equation 17]}$$

Multiple Walsh matrices having a difference attributable to the permutation function of each row or column may be derived based on Equation 16. Equation 17 illustrates an example of such multiple Walsh matrices.

Figure 21:
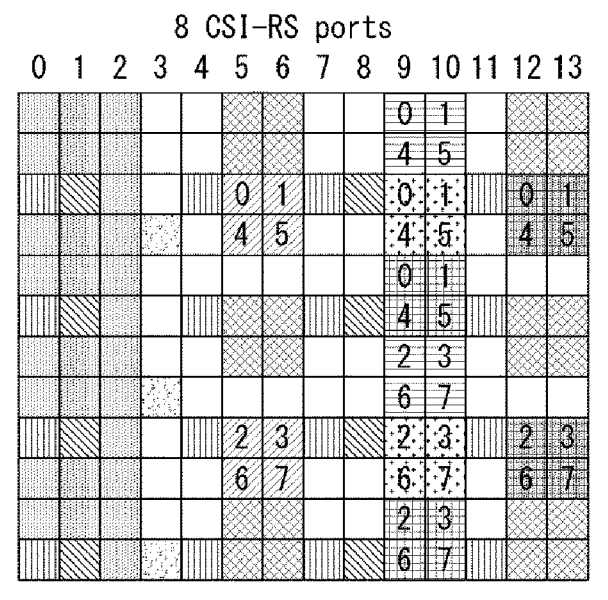

FIG. 21 is a diagram illustrating five legacy CSI-RS configurations available for CSI-RS transmission through eight CSI-RS antenna ports. The description of FIG. 8(c) may be identically applied to description regarding this figure.

In the 8-port CSI-RS resource/pattern of this figure, CDM-8 may be applied/configured by sequentially multiplying CSI-RSs, mapped to CSI-RS ports indicated as {0,1,2,3,4,5,6,7}, by the weight vectors according to Equation 17. That is, CDM-8 is applied as a legacy 8-port CSI-RS resource/pattern unit.

As another example in which CDM-8 is applied/implemented, in the 8-port CSI-RS resource/pattern of this figure, CDM-8 may be applied/configured by sequentially multiplying CSI-RSs, mapped to respective ports, by the weight vectors according to Equation 17 in order of {0,1,4,5,2,3,6,7} (or in order pre-defined/configured in specific 8 REs aggregated in order of {0,1,2,3,4,5,6,7}).

Figure 22:
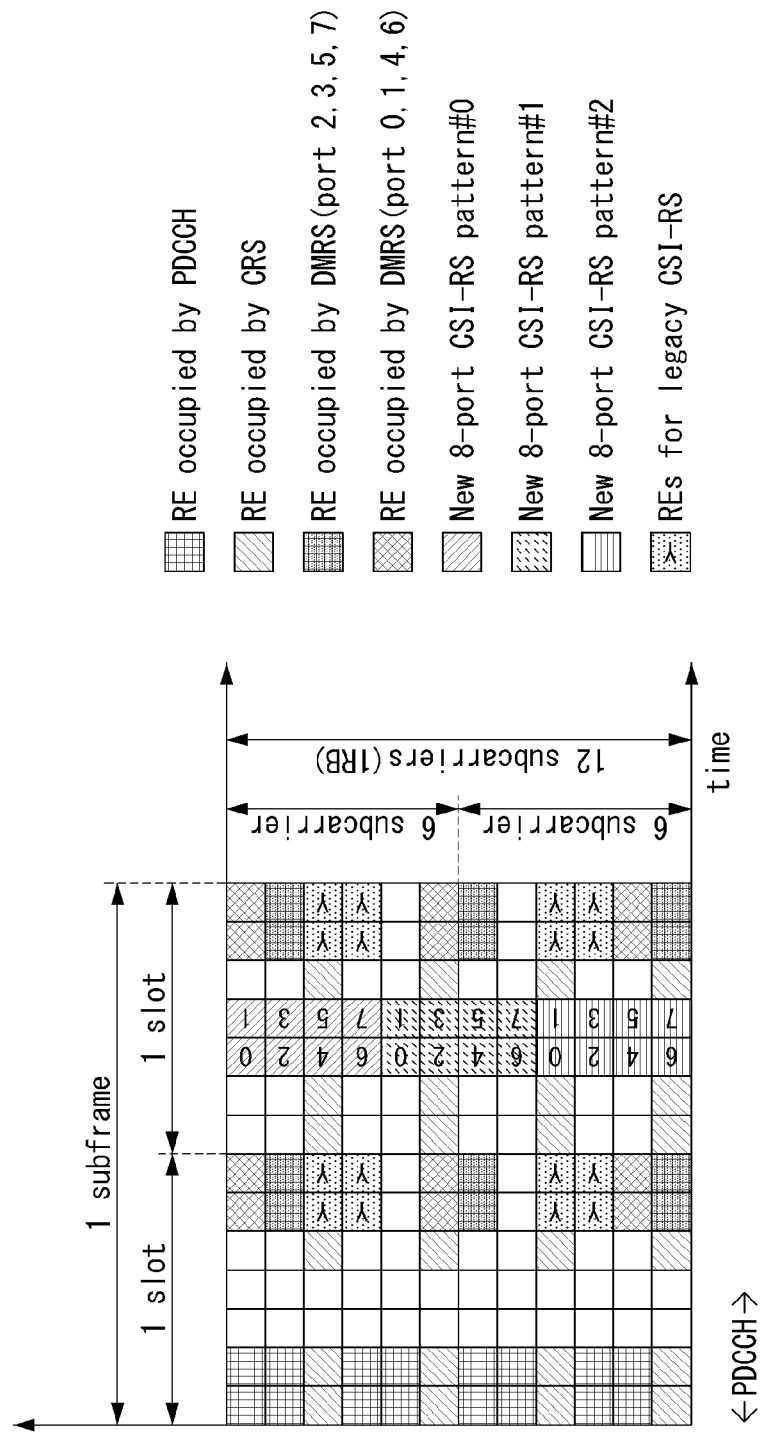
FIGS. 22 to 24 illustrate 8-port CSI-RS resource/pattern designs to which CDM-8 is applied according to embodiments of the present invention.
Figure 23:
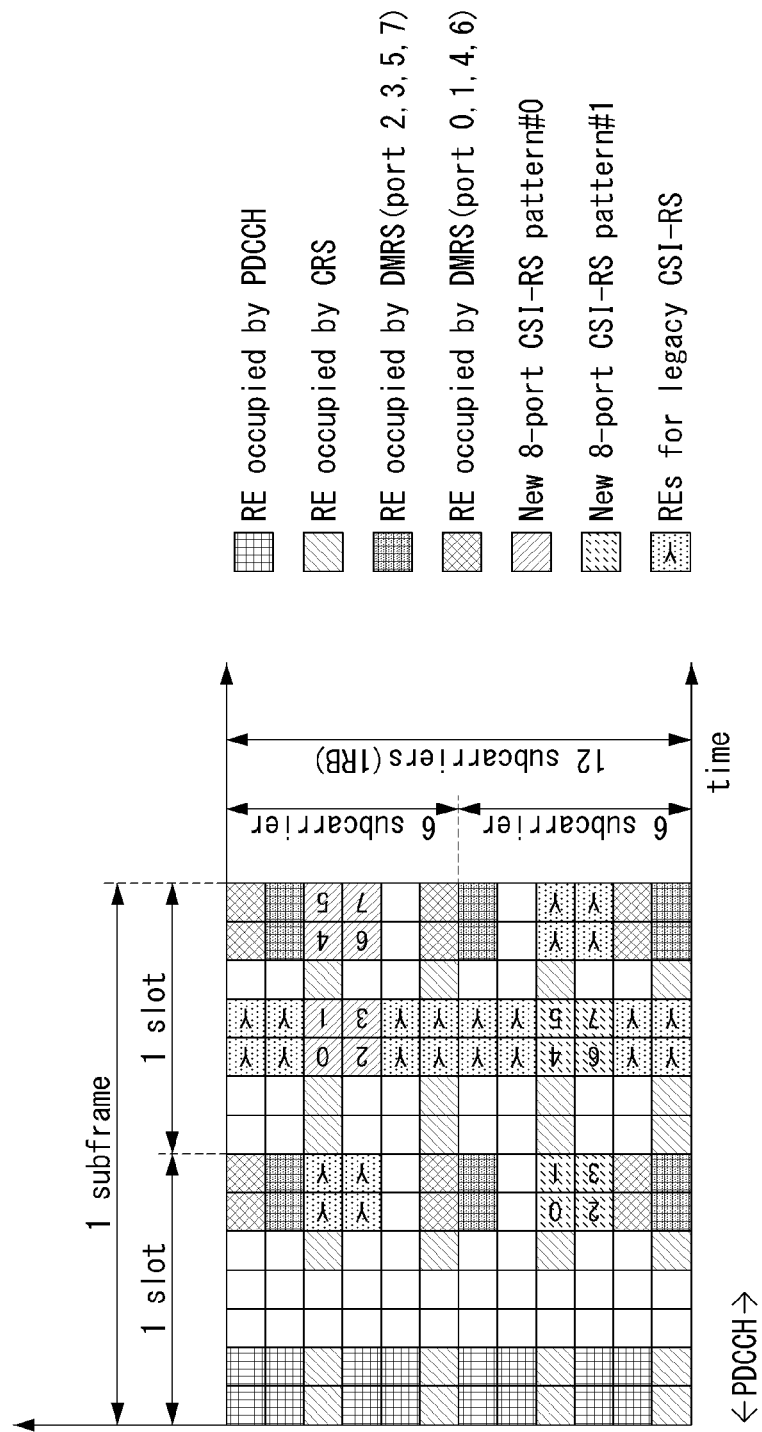
Figure 24:
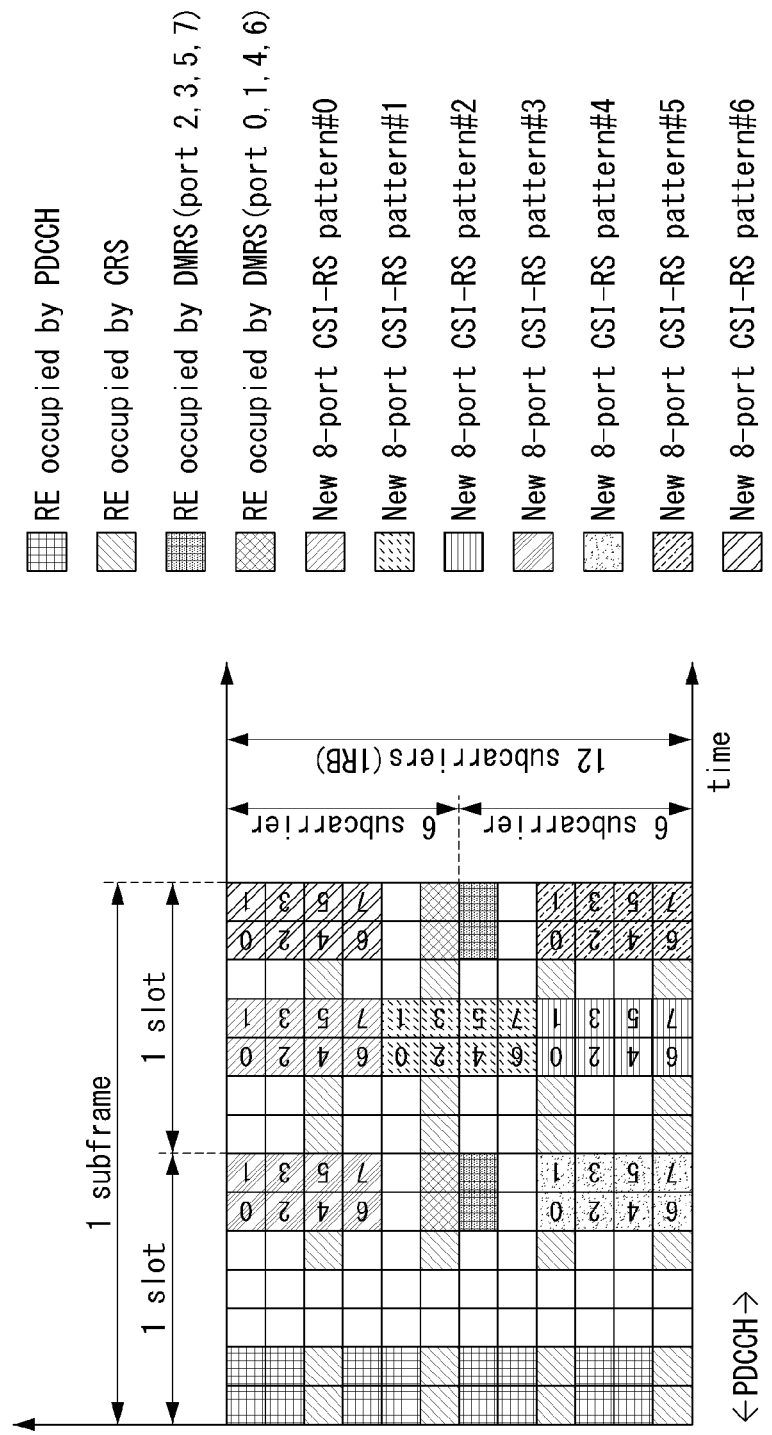

FIGS. 22 to 24 illustrate 8-port CSI-RS resource/pattern designs to which CDM-8 is applied according to embodiments of the present invention.

In the case of an 8-port CSI-RS resource/pattern according to the embodiment of FIG. 22, higher performance in a frequency selective channel is expected because REs to which CDM-8 is applied are arranged more densely on the frequency axis than in the legacy 8-port CSI-RS resource/pattern shown in FIG. 21.

FIG. 23 illustrates an embodiment in which CDM-8 is applied to CSI-RSs mapped to eight REs present over two subcarriers and four OFDM symbols. In the embodiment of FIG. 23, REs are arranged on the time axis more densely in 8-port CSI-RS resource/pattern #0 than in pattern #1, and thus performance more robust to phase drift is expected.

The embodiments illustrated in FIGS. 22 and 23 are characterized in that two port groups {0,1,2,3} and {4,5,6,7} are respectively mapped to two RE groups each of which is composed of four REs disposed in a 2×2 form on the time and frequency axes. These embodiments may be understood as embodiments in which CSI-RS resources/patterns are designed in higher density on the time axis and/or frequency axis in order to obtain higher performance in environments in which channels severely change. That is, a CSI-RS resource/pattern may be designed such that an OFDM symbol spacing between two port groups is a maximum of two symbols and a subcarrier spacing is not set (e.g., two port groups are positioned/mapped on/to four consecutive subcarriers or positioned/mapped on/to the same subcarrier) in each embodiment.

FIG. 24 illustrates a method of designing an 8-port CSI-RS pattern/resource using a maximum of 56 REs by allocating REs which can be allocated for DM-RS transmission (or REs which can be allocated for data transmission) for CSI-RS transmission.

The 8-port CSI-RS pattern/resource shown in FIG. 24 has the advantage of a large cell reuse factor of 7 compared to the 8-port CSI-RS pattern/resource shown in FIG. 22.

Meanwhile, three 8-port CSI-RS resources/patterns shown in FIG. 22 may be aggregated to configure a single 24-port CSI-RS resource/pattern. More specifically, a 24-port CSI-RS resource/pattern may be configured by aggregating three 8-port CSI-RS resources/patterns which are positioned at OFDM symbols #9 (or #10) and #10 (or #11) on the time axis in a single subframe and are neighbor/contiguous on the frequency axis, as shown in FIG. 22.

For example, the 24-port CSI-RS resource pattern may be configured using first to third 8-port CSI-RS resources/patterns. The first to third 8-port CSI-RS resources/patterns may be positioned at two OFDM symbols (OFDM symbols #9/#10 and #10/#11) and four consecutive subcarriers in a single subframe.

Here, the first 8-port CSI-RS resource/pattern may be positioned at OFDM symbols #9/#10 and #10/#11 and subcarrier regions #11/#1 to #8/#4 in a single subframe. Specific coordinates of the first 8-port CSI-RS resource/pattern may be represented as (11, 2), (11, 3), (10, 2), (10, 3), (9, 2), (9, 3), (8, 2) and (8, 3) of the second slot in the subframe using (k', l') (k' denoting a subcarrier index in a resource block and l' denoting an OFDM symbol index in a slot) described above with respect to FIG. 8.

Similarly, the second 8-port CSI-RS resource/pattern may be positioned at OFDM symbols #9/#10 and #10/#11 and subcarrier regions #7/#5 to #4/#8 in a single subframe. Specific coordinates of the second 8-port CSI-RS resource/pattern may be represented as (7, 2), (7, 3), (6, 2), (6, 3), (5, 2), (5, 3), (4, 2) and (4, 3) of the second slot in the subframe using (k', l') described above with respect to FIG. 8.

Similarly, the third 8-port CSI-RS resource/pattern may be positioned at OFDM symbols #9/#10 and #10/#11 and subcarrier regions #3/#9 to #0/#12 in a single subframe. Specific coordinates of the third 8-port CSI-RS resource/pattern may be represented as (3, 2), (3, 3), (2, 2), (2, 3), (1, 2), (1, 3), (0, 2) and (0, 3) of the second slot in the subframe using (k', l') described above with respect to FIG. 8.

Here, CDM-8 can be applied to CSI-RSs mapped to the first to third 8-port CSI-RS resources/pattern, as described above.

Hereinafter, CDM-16 is proposed.

Weight vectors of CDM-16 may also be derived from a Walsh matrix similarly to CDM-8. That is, the weight vectors may be derived from a 16×16 Walsh matrix as represented by Equation 18.

$W_0$=[1 1 1 1 1 1 1 1 1 1 1 1 1 1 1 1], $W_1$=[1 −1 1 −1 1 −1 1 −1 1 −1 1 −1 1 −1 1 −1], $W_2$=[1 1 −1 −1 1 1 −1 −1 1 1 −1 −1 1 1 −1 −1], $W_3$=[1 −1 −1 1 1 −1 −1 1 1 −1 −1 1 1 −1 −1 1], $W_4$=[1 1 1 1 −1 −1 −1 −1 1 1 1 1 −1 −1 −1 −1], $W_5$=[1 −1 1 −1 1 −1 1 −1 −1 1 −1 1 −1 1 −1 1 −1 1], $W_6$=[1 1 −1 −1 −1 −1 1 1 1 1 −1 −1 −1 −1 1 1], $W_7$=[1 −1 −1 1 −1 1 1 −1 1 −1 −1 1 −1 1 1 −1], $W_8$=[1 1 1 1 1 1 1 1 1 1 1 1 1 1 1 1 1], $W_9$=[1 −1 1 −1 1 −1 1 −1 −1 1 −1 1 −1 1 −1 1], $W_{10}$=[1 1 −1 −1 1 1 −1 −1 −1 −1 1 1 −1 −1 1 1], $W_{11}$=[1 −1 −1 1 1 −1 −1 1 −1 1 1 −1 −1 1 1 −1], $W_{12}$=[1 1 1 1 1 1 1 1 1 1 1 1 1 1 1 1 1], $W_{13}$=[1 −1 1 −1 −1 1 −1 1 −1 1 −1 1 1 −1 1 −1], $W_{14}$=[1 1 −1 −1 −1 −1 1 1 −1 −1 1 1 1 1 −1 −1]

$W_{15}$=[1 −1 −1 1 −1 1 1 −1 −1 1 1 −1 1 −1 −1 1] [Equation 18]

CDM-16 proposed in the present description can be applied to a 16-port CSI-RS resource/pattern configured by aggregating two 8-port CSI-RS resources/patterns to which CDM-8 described above is applied.

For example, a single 16-port CSI-RS resource/pattern can be configured by aggregating two of the legacy 8-port CSI-RS resources/patterns as shown in FIG. 21, and CDM-16 can be applied to the configured resource/pattern. Here, two aggregated CSI-RS resources/patterns may be sequentially numbered as {0, 1, 2, 3, 4, 5, 6, 7} and {8, 9, 10, 11, 12, 13, 14, 15} and CDM-16 may be applied thereto or may be numbered as {0, 1, 4, 5, 2, 3, 6, 7} and {0, 1, 4, 5, 2, 3, 6, 7}+8 and CDM-16 may be applied thereto.

That is, when CDM-16 is applied, the former refers to a method of performing sequential port numbering in units of legacy 8 ports and the latter refers to a method of performing port numbering in units of 2×2 REs like 16-port CDM-4 of Rel. 13.

In addition, the CDM-8 related embodiments described above with reference to FIGS. 22 to 24 may be combined as described above and extended to and applied as CDM-16 related embodiments.

Hereinafter, CDM-12 and CDM-20 are proposed.

A DFT matrix is used when CDM-x which does not correspond to an exponent of 2 is applied, as described above. This is because there is no Walsh matrix composed of binary numbers (1 or −1). However, even when x=12 or 20, a binary orthogonal matrix composed of 1 and −1 can be configured using Paley construction when a Hadamard matrix is configured. This can reduce complexity because CDM weight vectors are generated using integers, compared to cases in which an orthogonal matrix is configured using DFT. Paley construction is a method of configuring a Hadamard matrix using finite fields and uses a quadratic residue of GF(q). Here, q is a prime and an odd number. In this case, a Hadamard matrix of (q+1) may be configured as represented by Equation 19.

$$H = I + \begin{bmatrix} 0 & 1^T \\ -1^T & Q \end{bmatrix} \qquad \text{[Equation 19]}$$

Here, I represents a (q+1)×(q+1) identity matrix, 1 represents a q-length vector composed of 1 and Q represents a q×q Jacobsthal matrix in which a row a and column b are composed of $\chi^{(a-b)}$, $\chi^{(a)}$ indicates whether a finite field element a is a perfect square. For example, $\chi^{(a)=1}$ if a=b^2 for any non-zero finite field element b, and $X^{(a)=-1}$ if not (e.g., if a cannot be represented by a square). Based on this, weight vectors of CDM-12 may be derived as represented by Equation 20.

$W_0$=[1 1 1 1 1 1 1 1 1 1 1 1], $W_1$=[1 −1 1 1 −1 1 1 1 −1 −1 −1 1 −1], $W_2$=[1 −1 −1 1 1 −1 1 1 1 −1 −1 −1 1], $W_3$=[1 1 −1 −1 1 −1 1 1 1 1 −1 −1 −1], $W_4$=[1 −1 1 −1 −1 1 1 −1 1 1 1 −1 −1], $W_5$=[1 −1 −1 1 1 −1 −1 1 1 −1 1 1 1 −1], $W_6$=[1 −1 −1 −1 1 1 −1 −1 1 1 −1 1 1 1], $W_7$=[1 1 −1 −1 −1 1 1 −1 −1 1 1 −1 1 1], $W_8$=[1 1 1 −1 −1 −1 1 1 −1 −1 1 1 −1 1], $W_9$=[1 1 1 1 −1 −1 −1 1 −1 −1 1 1 −1], $W_{10}$=[1 −1 1 1 1 −1 −1 −1 1 −1 −1 1 1], $W_{11}$=[1 1 −1 1 1 1 −1 −1 −1 1 −1 −1 1], [Equation 20]

CDM-12 proposed in the present description can be applied to a single 12-port CSI-RS resource/pattern configured by aggregating two 6-port CSI-RS resources/patterns to which CDM-6 described above is applied.

For example, a single 12-port CSI-RS resource/pattern may be configured by aggregating two 6-port CSI-RS resources/patterns as shown in FIG. 19 and CDM-16 may be applied thereto using Equation 20. Here, the two aggregated CSI-RS resources/patterns may be sequentially numbered as {0, 1, 2, 3, 4, 5} and {8, 9, 10, 11, 12, 13} and CDM-12 may be applied thereto.

In addition, the CDM-6 related embodiments described above with reference to FIGS. 18 to 20 may be combined as described above and extended to and applied as CDM-12 related embodiments.

Weight vectors of CDM-20 may be generated using Equation 21.

$$W_0 = [1\ 1\ 1\ 1\ 1\ 1\ 1\ 1\ 1\ 1\ 1\ 1\ 1\ 1\ 1\ 1\ 1\ 1\ 1\ 1],$$

$$W_1 = [1\ -1\ -1\ 1\ 1\ -1\ -1\ -1\ -1\ 1\ -1\ 1\ -1\ 1\ 1\ 1\ 1\ -1\ -1\ 1],$$

$$W_2 = [1\ -1\ 1\ 1\ 1\ -1\ -1\ -1\ -1\ 1\ -1\ 1\ -1\ 1\ 1\ 1\ 1\ -1\ -1\ 1\ -1],$$

$$W_3 = [1\ 1\ 1\ -1\ -1\ -1\ -1\ 1\ -1\ 1\ -1\ 1\ 1\ 1\ 1\ -1\ -1\ 1\ 1\ -1\ -1],$$

$$W_4 = [1\ 1\ -1\ -1\ -1\ -1\ 1\ -1\ 1\ -1\ 1\ 1\ 1\ 1\ -1\ -1\ 1\ -1\ -1\ 1],$$

$$W_5 = [1\ -1\ -1\ -1\ -1\ 1\ 1\ -1\ 1\ -1\ 1\ 1\ 1\ 1\ -1\ -1\ 1\ -1\ -1\ 1\ 1],$$

$$W_6 = [1\ -1\ -1\ -1\ 1\ -1\ 1\ 1\ -1\ 1\ 1\ 1\ 1\ -1\ -1\ 1\ -1\ -1\ 1\ 1\ 4],$$

$$W_7 = [1\ -1\ -1\ 1\ 1\ -1\ 1\ -1\ 1\ 1\ 1\ 1\ -1\ -1\ 1\ -1\ -1\ 1\ 1\ -1\ 4],$$

$$W_8 = [1\ -1\ 1\ 1\ -1\ 1\ -1\ 1\ 1\ 1\ 1\ -1\ -1\ 1\ -1\ -1\ 1\ 1\ -1\ -1\ 4],$$

$$W_9 = [1\ 1\ -1\ 1\ -1\ 1\ 1\ 1\ 1\ -1\ -1\ 1\ -1\ -1\ 1\ 1\ -1\ -1\ -1\ 4],$$

$$W_{10} = [1\ -1\ 1\ -1\ 1\ 1\ 1\ 1\ -1\ -1\ 1\ -1\ -1\ 1\ 1\ -1\ -1\ -1\ -1\ 1\ 1],$$

$$W_{11} = [1\ 1\ -1\ 1\ 1\ 1\ 1\ -1\ -1\ 1\ -1\ -1\ 1\ 1\ -1\ -1\ -1\ -1\ 1\ 1\ -1],$$

$$W_{12} = [1\ -1\ 1\ 1\ 1\ 1\ -1\ -1\ 1\ -1\ -1\ 1\ 1\ -1\ -1\ -1\ -1\ 1\ 1\ -1\ 1],$$

$$W_{13} = [1\ 1\ 1\ 1\ 1\ -1\ -1\ 1\ -1\ -1\ 1\ 1\ -1\ -1\ -1\ -1\ 1\ 1\ -1\ 1\ 4],$$

$$W_{14} = [1\ 1\ 1\ 1\ -1\ -1\ 1\ -1\ -1\ 1\ 1\ -1\ -1\ -1\ -1\ 1\ 1\ -1\ 1\ 1\ -1\ 1],$$

$$W_{15} = [1\ 1\ 1\ -1\ -1\ 1\ -1\ -1\ 1\ 1\ -1\ -1\ -1\ -1\ 1\ 1\ -1\ 1\ 1\ -1\ 1\ 1],$$

$$W_{16} = [1\ 1\ -1\ -1\ 1\ -1\ -1\ 1\ 1\ -1\ -1\ -1\ -1\ 1\ 1\ -1\ 1\ 1\ -1\ 1\ 1\ 1],$$

$$W_{17} = [1\ -1\ -1\ 1\ -1\ -1\ 1\ 1\ -1\ -1\ -1\ -1\ 1\ 1\ -1\ 1\ 1\ -1\ 1\ 1\ 1],$$

$$W_{18} = [1\ -1\ 1\ -1\ -1\ 1\ 1\ -1\ -1\ -1\ -1\ 1\ 1\ -1\ 1\ 1\ -1\ 1\ 1\ 1\ 4],$$

$$W_{19} = [1\ 1\ -1\ -1\ 1\ 1\ -1\ -1\ -1\ -1\ 1\ 1\ -1\ 1\ 1\ -1\ 1\ 1\ 1\ -1\ 4],$$

[Equation 21]

The weight vectors of Equation 21 may be applied to 20-port CSI-RS resources/patterns configured according to the embodiments proposed in the present description. Aggregated resources/patterns may be sequentially port-numbered and CDM-20 may be applied thereto.

Although the present description proposes a method of configuring CDM-12 and CDM-20 using Paley construction, the method may be extended to a method of using a DFT matrix used to configure CDM-6

Furthermore, an eNB may indicate information on a CDM length applied to a CSI-RS with respect to a UE through RRC signaling.

Figure 25:
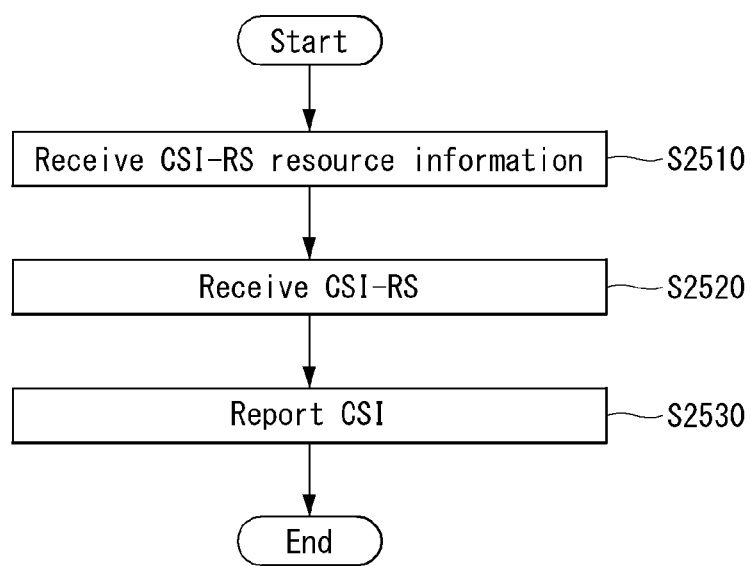
FIG. 25 is a flowchart illustrating a CSI reporting method of a UE according to an embodiment of the present invention.

FIG. 25 is a flowchart illustrating a CSI reporting method of a UE according to an embodiment of the present invention. The above-described embodiments and description may be equally/similarly applied to the flowchart and redundant description will be omitted.

First, a UE may receive, from an eNB, CSI-RS resource information about a CSI-RS resource to which a CSI-RS is mapped (S2510).

Here, the CSI-RS resource may be configured by aggregating a plurality of CSI-RS resources, and the aggregated CSI-RS resources may be respectively positioned in different subframes on the time axis or in different resource blocks on the frequency axis. Here, at least one of the aggregated CSI-RS resources may correspond to a composite CSI-RS resource configured by aggregating a plurality of legacy CSI-RS resources. The plurality of legacy CSI-RS resources which constitutes the composite CSI-RS resource may be limited to CSI-RS resources having the same number of ports. And/or the CSI-RS resource may be limited such that it is configured by aggregating CSI-RS resources of a predefined number of ports.

In addition, the different subframes in which the aggregated CSI-RS resources are positioned may have different CSI-RS subframe offsets. Further, when the aggregated CSI-RS resources are respectively positioned in different subframes having a spacing of a preset number of subframes therebetween, information on the spacing of the preset number of subframes may be transmitted to the UE through radio resource control (RRC) signaling. Furthermore, when the aggregated CSI-RS resources are respectively positioned in different subframes on the time axis, the aggregated CSI-RS resources may be mapped to the same subcarriers in the different subframes.

If the aggregated CSI-RS resources are respectively positioned in different resource blocks having a spacing of a preset number of resources blocks therebetween, information on the spacing of the preset number of resource blocks may be transmitted to the UE through RRC signaling. In addition, the different resource blocks in which the aggregated CSI-RS resources are positioned may have the same transmission periodicity for the aggregated CSI-RS resources, and the different resource blocks may have different resource block offsets for the aggregated CSI-RS resources. Here, the transmission periodicity and resource block offsets may be joint-encoded and transmitted to the UE.

Furthermore, when at least one of the aggregated CSI-RS resources corresponds to a 12-port CSI-RS resource or a 16-port CSI-RS resource, code division multiplexing (CDM) in which the number of orthogonal weight vectors is 2 or 4 may be applied to the CSI-RS mapped to the 12-port CSI-RS resource or the 16-port CSI-RS resource.

Subsequently, the UE may receive a CSI-RS transmitted through one or more antenna ports from the eNB on the basis of the received CSI-RS resource information (S2520).

Finally, the UE may generate CSI on the basis of the received CSI-RS and report the generated CSI to the eNB (S2530).

CDM in which the number of orthogonal weight vectors is 6, 8, 12, 8 or 20 may be applied to the CSI-RS depending on the number of ports of each of the CSI-RS resources aggregated into the CSI-RS resource to which the CSI-RS is mapped.

Hereinafter, an additional embodiment for the above-described CDM-8 is proposed.

As another embodiment, a method of applying CDM-8 to a CSI-RS resource/pattern/configuration of an X-port (e.g., X=18) or more generated by aggregating legacy ports (e.g., 2-, 4-, 8-, 12- and 16-port) may be taken into consideration. In this specification, what CDM-x is applied to the X-port CSI-RS resource/pattern/configuration may be interpreted that CDM-x is applied to a CSI-RS transmitted through the X-port CSI-RS resource/pattern and is transmitted.

Figure 26:
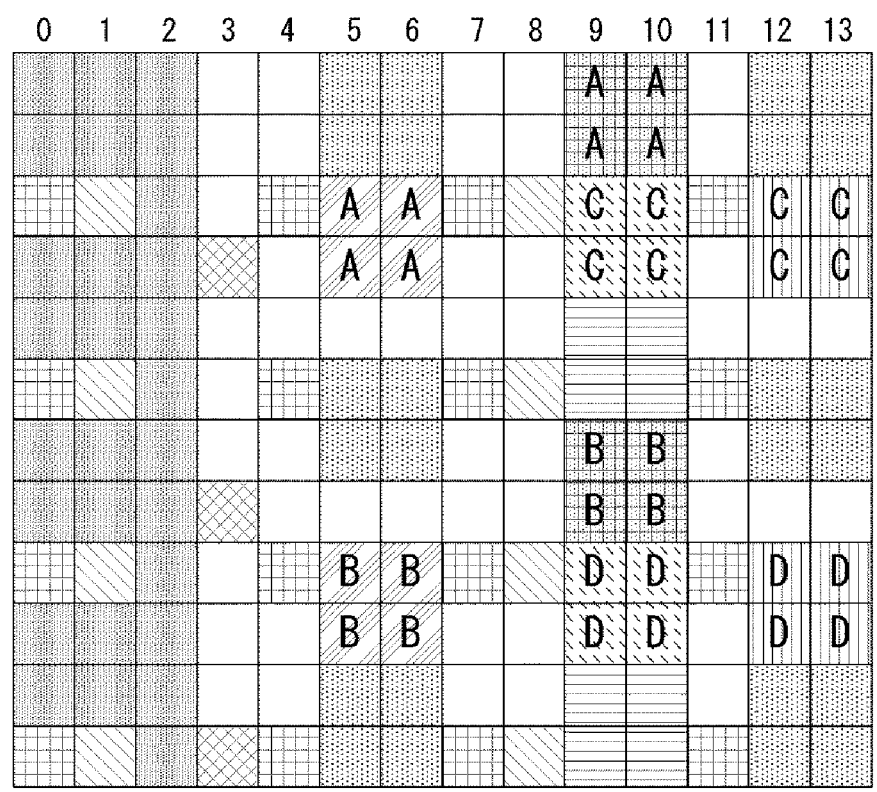
FIGS. 26 and 27 illustrate aggregated 32-port CSI-RS resources/patterns/configuration designs to which CDM-8 is applied according to an embodiment of the present invention.
Figure 27:
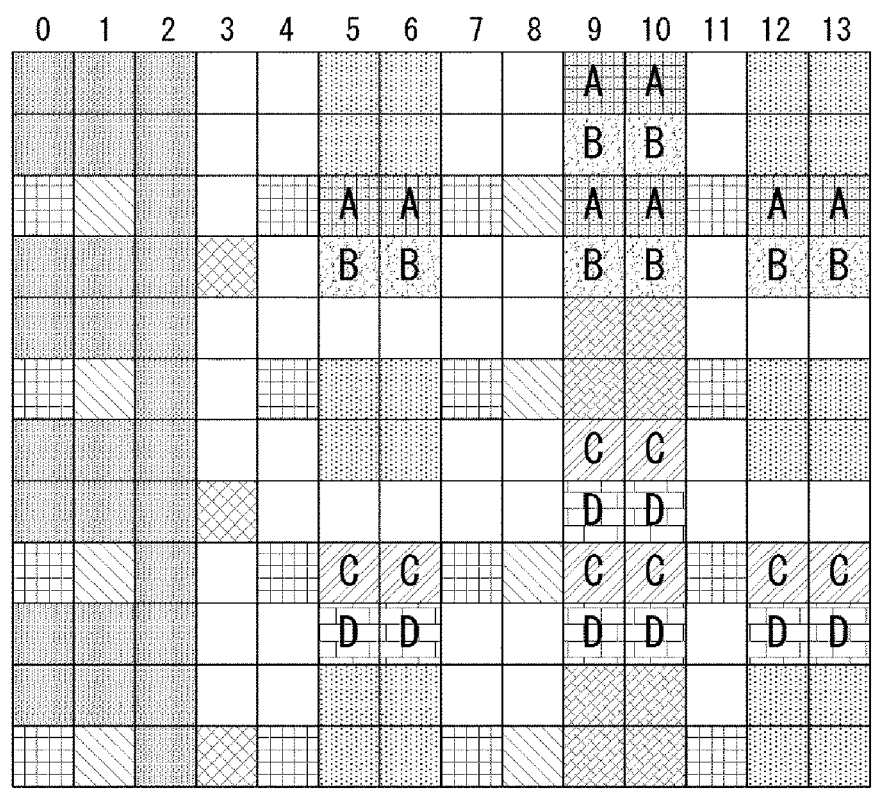

FIGS. 26 and 27 illustrate aggregated 32-port CSI-RS resources/patterns/configuration designs to which CDM-8 is applied according to an embodiment of the present invention. In FIGS. 26 and 27, each block indicates REs. OFDM symbol indices of a 0-13 range are sequentially assigned to each RE in the left→right direction, and subcarrier indices of a 0-11 range are sequentially assigned to each RE in the bottom→up direction. Furthermore, in FIGS. 26 and 27, a 32-port CSI-RS resource/pattern/configuration is configured by selectively aggregating four (legacy) 8-port CSI-RS resources/patterns/configurations.

In the 32-port CSI-RS resource/pattern/configuration shown in FIGS. 26 and 27, CDM-8 may be applied in a group unit indicated by the same alphabetical number (e.g., A, B, C, D). For example, the 32-port CSI-RS resource/pattern/configuration may be divided into a first group including 8 REs indicated as A, a second group including 8 REs indicated as B, a third group including 8 REs indicated as C, and a fourth group including 8 REs indicated as D. CDM-8 may be applied to each group unit.

That is, (the same one) CDM-8 may be applied to each of a CSI-RS transmitted through the first group, a CSI-RS transmitted through the second group, a CSI-RS transmitted through the third group, and a CSI-RS transmitted through the fourth group.

Assuming that maximum transmit power per CSI-RS port is "1", if the embodiment of FIG. 26 is applied, the maximum transmit power becomes "¾" (the maximum transmit power is power-boosted eight times because CDM-8 is applied to the REs of an OFDM symbol index No. 5, 6, and is power-boosted three times by borrowing transmit power from another port). Accordingly, if the CSI-RS resource/pattern/configuration of the embodiment of FIG. 26 is used, full power transmission per CSI-RS port is not achieved.

In order to solve this problem, the embodiment of FIG. 27 may be proposed. Assuming that maximum transmit power per CSI-RS port is "1", if the embodiment of FIG. 27 is applied, the maximum transmit power is power-boosted eight times because CDM-8 is applied to the REs of an OFDM symbol index No. 5, 6. The maximum transmit power is power-boosted four times by borrowing transmit power from anoniter port. Accordingly, the maximum transmit power may become "1."

The embodiment of FIG. 27 corresponds to aggregated four (legacy) 8-port CSI-RS resources/patterns/configurations, which may be restricted so that one CSI-RS resource/pattern/configuration is selected in OFDM Nos. 5 and 6, one CSI-RS resource/pattern/configuration is selected in an OFDM Nos. 12 and 13, and the remaining two CSI-RS resources/patterns/configurations are selected in OFDM Nos. 9 and 10. FIG. 27 shows an example in which [0, 1, 2, 4] of the five (legacy) 8-port CSI-RS resource configurations defined in relation to FIG. 8(c) may be selected to configure a 32-port CSI-RS resource/pattern/configuration. Accordingly, in a (legacy) 8-port CSI-RS resource configuration No. 3 not shown in this figure, a 32-port CSI-RS resource may be used for an aggregation. For example, [0, 1, 3, 4] or [0, 2, 3, 4] of the five (legacy) 8-port CSI-RS resource configurations defined in relation to FIG. 8(c) may be selected to configure a 32-port CSI-RS resource/pattern/configuration.

In the embodiment of FIG. 27, detailed coordinates of each group to which CDM-8 is applied may be represented as follows using (k', l') (in this case, k' is a subcarrier index within a resource block, l' indicates an OFDM symbol index in two slots).

First group indicted by "A": (9, 5), (9, 6), (11, 9), (11, 10), (9, 9), (9, 10), (9, 12), (9, 13)

Second group indicated by "B": (8, 5), (8, 6), (10, 9), (10, 10), (8, 9), (8, 10), (8, 12), (8, 13)

Third group indicated by "C": (3, 5), (3, 6), (5, 9), (5, 10), (3, 9), (3, 10), (3, 12), (3, 13)

Fourth group indicated by "D": (2, 5), (2, 6), (4, 9), (4, 10), (2, 9), (2, 10), (2, 12), (2, 13)

The No. 3 CSI-RS resource configuration not shown in this figure may be divided into four groups to which CDM-8 is independently applied as in other CSI-RS resource configurations. For example, prior to detailed coordinates of a group for an CDM-8 application with the No. 3 CSI-RS resource configuration, if the detailed coordinates are represented using (k', l') (in this case, k' is a subcarrier index within a resource block, l' indicates an OFDM symbol index in two slots), the REs of (7, 9), (7, 10) may be included in the first group corresponding to the alphabetical number "A." The REs of (6, 9), (6, 10) may be included in the second group corresponding to the alphabetical number "B." The REs of (1, 9), (1, 10) may be included in the third group corresponding to the alphabetical number "C." The REs of (0, 9), (0, 10) may be included in the fourth group corresponding to the alphabetical number "B."

That is, if the embodiment of FIG. 27 is arranged, in the case of a 32-port CSI-RS resource/pattern/configuration in eFD-MIMO, each (legacy) 8-port CSI-RS resource/pattern/configuration may be divided into a plurality of lower groups/patterns indicated as different alphabetical numbers. A CDM-8 pattern/group to which CDM-8 is applied as an aggregation of a plurality of lower groups/patterns (e.g., CDM-2 patterns) having the same alphabetical number between all (legacy) 8-port CSI-RS resources/patterns/configurations may be configured.

In this case, port numbering to be described according to the sequence of resourceConfig may be determined.

If a UE is configured with the 32-port CSI-RS resource/pattern/configuration to which CDM-8 is applied according to the embodiment of FIG. 27, an eNB may notify the UE of aggregated 8-port CSI-RS resources through RRC signaling. In this case, the eNB may indicate all four 8-port CSI-RS resources/patterns/configurations, aggregated as the 32-port CSI-RS resource, through RRC signaling with respect to the UE, but may notify the UE of only the two 8-port CSI-RS resources/patterns/configurations aggregated as the 32-port CSI-RS resource/pattern/configuration among the three (legacy) 8-port CSI-RS resources/patterns/configurations located in No. 9 and No. 10, thereby being capable of reducing signaling overhead.

If the 32-port CSI-RS resource/pattern/configuration according to the embodiment of FIG. 27 is applied, an embodiment of port numbering for applying CDM-8 to the corresponding resource/pattern/configuration is the same as Equation 22. Basically, each CDM-8 weight mapping method follows a Walsh matrix, and there may be a difference in the application due to permutation.

$$l=(k-1)8+p', p'=15,16, \ldots 22, k=1,2, \ldots K, \quad \text{[Equation 22]}$$

In Equation 22, l is the final CSI_RS port number according to port numbering results, k is an each aggregated CSI-RS resource/configuration number, K is the number of aggregated/included CSI-RS resources/patterns/configurations, and p' indicates an aggregated legacy CSI_RS port number.

If the range of k is set from 0 to K−1 not 1~K in Equation 22, the port numbering embodiment may be represented like Equation 23.

$$l=8k+p', p'=15,16, \ldots 22, k=0,1, \ldots K-1, \quad \text{[Equation 23]}$$

Equation 22 (or Equation 23) may mean that antenna ports are numbered in order of CSI-RS resources/configuration numbers defined as in Table 3.

CDM-8 may be applied to a CSI-RS, transmitted through each CSI-RS port numbered according to Equation 22 (or Equation 23), as in Table 7.

TABLE 7

| l | [wp'(0) wp'(1) wp'(2) wp'(3) wp'(4) wp'(5) wp'(6) wp'(7)] |
|---|---|
| 15, 17, 19, 21 | [1 1 1 1 1 1 1 1] |
| 16, 18, 20, 22 | [1 −1 1 −1 1 −1 1 −1] |
| {15, 17, 19, 21} + 8 | [1 1 −1 −1 1 1 −1 −1] |
| {16, 18, 20, 22} + 8 | [1 −1 −1 1 1 −1 −1 1] |
| {15, 17, 19, 21} + 16 | [1 1 1 1 −1 −1 −1 −1] |
| {16, 18, 20, 22} + 16 | [1 −1 1 −1 −1 1 −1 1] |
| {15, 17, 19, 21} + 24 | [1 1 −1 −1 −1 −1 1 1] |
| {16, 18, 20, 22} + 24 | [1 −1 −1 1 −1 1 1 −1] |

Table 7 shows eight weight vectors applied for each CSI_RS port number derived according to Equation 22 (or Equation 23). One row is configured with four elements, and each element is representative of each group to which a CDM-8 pattern is independently applied. That is, a 32-port CSI-RS resource/pattern/configuration includes a total of four groups to which a total of four independent CDM-8 patterns are applied. Furthermore, the eight rows mean ports to which 8 weight vectors, each one configuring CDM-8, are applied. Each column means a group to which the CDM-8 pattern is independently applied.

Accordingly, CDM-8 may be independently applied to each of {15,16,23,24,31,32,39,40}, that is, a first group, {17,18,25,26,33,34,41,42}, that is, a second group, {19,20, 27,28,35,36,43,44}, that is, a third group, and {21,22,29,30, 37,38,45,46}, that is, a fourth group. Furthermore, in each group, the weight vector of [1 1 1 1 1 1 1 1] is applied to the {15,17,19,21} ports, the weight vector of [1 −1 1 −1 1 −1 1 −1] is applied to the {16,18,20,22} ports, the weight vector of [1 1 −1 −1 1 1 −1 −1] is applied to the {23,25, 27,29} ports, the weight vector of [1 −1 −1 1 1 −1 −1 1] is applied to the {24,26,28,30} ports, the weight vector of [1 1 1 1 −1 −1 −1 −1] is applied to the {31,33,35,37} ports, the weight vector of [1 −1 1 −1 −1 1 −1 1] is applied to the {32,34,36,38} ports, the weight vector of [1 1 −1 −1 −1 −1 1 1] is applied to the {39,41,43,45} ports, and the weight vector of [1 −1 −1 1 −1 1 1 −1] is applied to the {40,42, 44,46} ports.

The above-described embodiment of FIGS. 26 and/or 27 may be applied to a 24-port CSI-RS resource/pattern/configuration identically/similarly. For example, if CDM-8 is applied to the 24-port CSI-RS resource/pattern/configuration, the three of the CSI-RS resource/pattern/configuration groups classified into the different alphabetical numbers A, B, C, and D (+E) in FIGS. 26 and/or 27 may be selected, and CDM-8 may be applied to each selected group independently.

Port Numbering Method

In a massive MIMO system using the illustrated 2D-AAS antenna structure, etc., a large number of RS ports may need to be designed so that a UE can obtain CSI and report it to an eNB. Representatively, a conventional system supports 1, 2, 4, and 8-port CSI-RS patterns. A Rel. 13 system supports 12-port and 16-port CSI-RS patterns by aggregating conventional 4-port and/or 8-port. In order to achieve higher spectral efficiency in the future, a new CSI-RS pattern and configuration method, such as a larger number of ports (e.g., 20-port, 24-port, 28-port, 32-port, 64-port) needs to be taken into consideration.

For the CSI-RS resource design of the new number of ports, to aggregate a CSI-RS resource of the number of ports (e.g., 2-, 4- and/or 8-port) supported in the legacy Rel.12 system may be taken into consideration. Furthermore, in this case, aggregated CSI-RS resources may be the above-described composite CSI-RS resource/pattern. The composite CSI-RS resource is a CSI-RS resource in which a plurality of CSI-RS resources defined in the Rel. 13 system is aggregated. For example, the composite CSI-RS resource may mean a 16-port CSI-RS resource configured with an aggregation of two legacy 8-port CSI-RS resources and a 12-port CSI-RS resource configured with an aggregation of three legacy 4-port CSI-RS resources.

In this case, all the aggregated K CSI-RS resources may be configured to have the same (legacy) port number (N) or to have different (legacy) port numbers, and may be aggregated to configure a new Q-port (Q=NK or $\Sigma_{k=0}^{K-1} N_k$) CSI-RS resource, and an example thereof is as follows.

Hereinafter, Nk means a CSI-RS port number set in a k-th CSI-RS resource. Furthermore, (N,K) means that all K CSI-RS resources are configured with the same N-port. (N1,N2, . . . , NK) indicates the number of ports in which each K CSI-RS resource has been configured.

20-port: (N,K)=(2,10)/(N,K)=(4,5)/(N0,N1,N2)=(8,8,4)
24-port: (N,K)=(2,12)/(N,K)=(8,3)/(N,K)=(4,6)
28-port: (N,K)=(2,14)/(N,K)=(4,7)/(N0,N1,N2,N3)=(8,8, 8,4)
32-port: (N,K)=(2,16)/(N,K)=(8,4)/(N,K)=(4,8)
64-port: (N,K)=(8,8)/(N,K)=(4,16)

The 12-port CSI-RS resource defined in Rel. 13 is configured with three 4-port CSI-RS resource, and the 16-port CSI-RS resource is configured with two 8-port CSI-RS resources. In both the cases, a CSI-RS may be configured by applying CDM-2 and/or CDM-4.

In the case of CDM-2, a port indexing/numbering scheme in which CSI-RS resource sharing with a Rel-12 UE is taken into consideration may be introduced. More specifically, for resource sharing with a Rel-12 4-port CSI-RS in the case of a 12-port CSI-RS and for resource sharing with a Rel-12 8-port CSI-RS in the case of a 16-port CSI-RS, a port numbering/indexing scheme, such as Equation 24, may be introduced.

$$n = \begin{cases} p' + \frac{N}{2}k, & p' = 15, 16, \ldots, 14 + \frac{N}{2} \\ p' + \frac{N}{2}(k+K-1), & p' = 15 + \frac{N}{2}, \ldots, 14 + N \end{cases} \quad \text{[Equation 24]}$$

In Equation 24, n is the port number/index of a 12- or 16-port CSI-RS of Rel-13 calculated as a port numbering/indexing result (i.e., the final CSI_RS port number/index according to a numbering/indexing result), k is each aggregated CSI-RS resource/configuration number (e.g., k=0, 1, 2, . . . , K−1), K is a total number of aggregated CSI-RS resources/configurations, N is the number of ports (e.g., N=4 or 8) per aggregated CSI-RS resources/configuration, and p' is the port number/index of an aggregated (legacy) N-port CSI-RS resource/configuration.

If indexing/numbering is performed using Equation 24, a legacy N-port may be configured as a subset of a newly defined Q-port. As a result, a CSI-RS resource/configuration configured in a Rel-13 UE can also be configured in a Rel-12 UE. Accordingly, there is an advantage in that CSI-RS overhead of the entire network can be reduced.

CDM-4 follows a numbering/indexing scheme of Equation 25.

$$n+kN+p', p'=15, \ldots 14+N, k=0,1, \ldots, K-1 \quad \text{[Equation 25]}$$

Description regarding each parameter of Equation 25 is the same as that described above in relation to Equation 24.

Equation 25 shows an embodiment in which configured K N-port CSI-RS ports are sequentially numbered/indexed. Equation 25 has been defined by not taking into consideration CSI-RS resource sharing with a Rel-12 UE because a Rel-12 CSI-RS port to which CDM-4 is applied is not present.

Accordingly, hereinafter, there is proposed a new port numbering/indexing method for CSI-RS resource sharing between the 8-, 12-, and 16-port CSI-RS defined in Rel-13 and a newly defined Q-port CSI-RS. Furthermore, there is proposed a method for solving the ambiguity of port numbering/indexing which may occur in a CSI-RS resource/configuration aggregation having a different number of ports although CDM-2 is applied.

The case of CDM-2 is first described. If all K CSI-RS resources are the same N-port CSI-RS resource, Equation 24 may be reused, and a detailed description thereof is described below with reference to FIGS. 28 and 29.

FIG. 28 illustrates the port numbering/indexing of 20-port configured with (N,K)=(4,5) according to an embodiment of the present invention.

In this figure, k indicates each aggregated CSI-RS resource/configuration number (e.g., k=0, 1, 2, . . . , K−1), K indicates a total number of aggregated CSI-RS resources/configurations, and N indicates the number of ports per aggregated CSI-RS resource/configuration.

This figure illustrates the mapping relation between the number of ports for each aggregated 4-port CSI-RS resource/configuration and the number of ports of a 20-port CSI-RS resource/configuration. For example, the four ports 115, 16, 17, 181 of a CSI-RS resource/configuration corresponding to k=1 may be sequentially mapped to the {17, 18, 27, 28} ports of a 20-port CSI-RS resource/configuration. This may be represented that the port numbers of {17, 18, 27, 28} are sequentially numbered/indexed in the four ports {15, 16, 17, 18} of a CSI-RS resource/configuration corresponding to k=1. Such a mapping/numbering relation is derived from Equation 24.

Referring to FIG. 28, an eNB may configure a 20-port CSI-RS resource/configuration by aggregating five 4-port CSI-RS resources/configurations, and may configure five 4-port CSI-RS resources/configurations in a UE configured with the 20-port CSI-RS resource/configuration. At the same time, the eNB may configure, in a Rel-13 UE, the three (e.g., k=0, 1, 2, that is, portion hashed in FIG. 28) of the five 4-port CSI-RS resources/configurations (indicates CSI-RS resources/configurations capable of resource sharing with the Rel-13 UE in the case of the CSI-RS resource/configuration hashed in each table of the figure). As a result, the UE configured with the 20-port CSI-RS resource/configuration may share the 12-port CSI-RS resource/configuration with the Rel-13 UE.

FIG. 29 illustrates the port numbering/indexing of 24-port configured with (N,K)=(8,3) according to an embodiment of the present invention.

In this figure, k indicates each aggregated CSI-RS resource/configuration number (e.g., k=0, 1, 2, . . . , K−1), K indicates a total number of aggregated CSI-RS resources/configurations, and N indicates the number of ports per aggregated CSI-RS resource/configuration. This figure also illustrates the mapping relation according to Equation 24 between the number of ports of each aggregated 8-port CSI-RS resource/configuration and the number of ports of a 24-port CSI-RS resource/configuration.

As in the embodiment of FIG. 28, in the present embodiment, an eNB may configure, in a Rel-13 UE, a 16-port CSI-RS resource/configuration using/reusing the two of three 8-port CSI-RS resources/configurations (e.g., CSI-RS resources/configurations in which k=0,1) configured in a specific UE.

If this is generalized, if a 12-, or 16-port CSI-RS resource/configuration supported in K Rel-13 and N-port CSI-RSs are aggregated to configure a Q-port (Q=NK) CSI-RS resource/configuration, a UE configured with the Q-port CSI-RS resource/configuration (or a UE that receives a CSI-RS resource/configuration using a Q-port) (hereinafter referred to as a "Q-port UE") may share some resources with a Rel-13 and/or Rel-12 UE configured with at least one CSI-RS resource/configuration of the same N-port unit using Equation 24.

For example, a UE configured with an (N,K)=(4,5)=20-port, (N,K)=(4,6)=24-port, (N,K)=(4,7)=28-port, or (N,K)=(4, 8)=32-port CSI-RS resource/configuration may share (or may be restricted to share) a 12-port CSI-RS resource/configuration with a Rel-13 UE and a 4-port CSI-RS resource/configuration with a Rel-12 UE. Furthermore, a UE configured with an (N,K)=(8,3)=24-port or an (N,K)=(8,4)=32-port CSI-RS resource/configuration may share (or may be restricted to share) a 16-port CSI-RS resource/configuration with a Rel-13 UE and a Rel-12 8-port CSI-RS resource/configuration.

Figure 30:
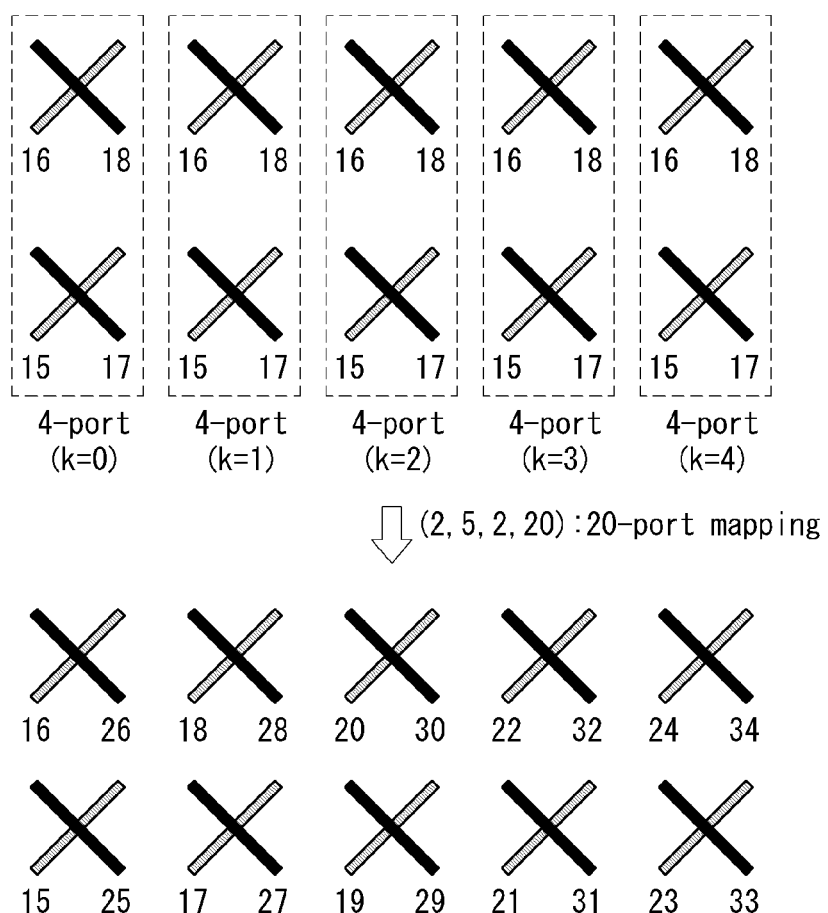
FIG. 30 illustrates the port numbering/mapping of 20-port configured with (2,5,2,20) (or (S1,S2)=(5,2)).

FIG. 30 illustrates the port numbering/mapping of 20-port configured with (2,5,2,20) (or (S1,S2)=(5,2)).

In (2,5,2,20), the first variable indicates the number of rows of a given 2D antenna layout, the second variable indicates the number of columns, the third variable indicates a cross polarization, and the fourth variable indicates a total number of antenna ports (or it may be an "element" depending on specific port-to-element virtualization and hereinafter commonly called a "port", for convenience sake).

Port numbering/indexing may be performed in order of column→row within the same polarization group (i.e., a group having a "/" polarization/slant or a group having a "\" polarization/slant) in a 2D antenna layout. If such a port numbering/indexing method is used, half of all antenna ports may be sequentially mapped to a first polarization/slant and the remaining half thereof may be sequentially mapped to a second polarization/slant.

For example, in the case of a cross polarization 20-port layout of 2 rows 5 columns, as shown in FIG. 30, port numbers "15 to 24" may be sequentially numbered/indexed in antenna ports having a "/" polarization/slant in the top- →down direction and/or left→right. Port numbers "25 to 34" may be sequentially numbered/indexed in antenna ports having a "\" polarization/slant in the top→down direction and/or left→right. In the cross polarization 20-port layout of a 2 rows 5 columns, it may be interpreted that CSI-RS ports having the port numbers "15 to 24" are sequentially mapped to the antenna ports having the "/" polarization/slant in the top→down direction and/or left→right and CSI-RS ports having the port number "25 to 34" are sequentially mapped to the antenna ports having the "\" polarization/slant in the top→down direction and/or left→right.

The 20-port CSI-RS resource/configuration mapped to the antenna layout of (2,5,2,20) as described above may be configured/defined in the form in which five 4-port CSI-RS resource/configuration mapped to the antenna layout (i.e., 2 row 1 column cross polarization 4-port antenna layout) of (2,1,2,4) have been aggregated. In this case, in each aggregated antenna layout, the ports may be numbered in the same manner as the above-described numbering/indexing method. For example, in the aggregated first (2,1,2,4) antenna layout, "15 and 16" port numbers may be sequentially numbered/indexed in ports having a "/" polarization/slant in the top→down direction, and "17 and 18" port numbers may be sequentially numbered/indexed in ports having a "\" polarization/slant in the top→down direction.

If such a numbering embodiment is applied, the port number of an antenna layout to which a 20-port CSI-RS resource/configuration is mapped and the port number of an antenna layout to which five 4-port CSI-RS resource/configurations aggregated as the 20-port CSI-RS resource/configuration are mapped may have a mapping relation, such as that shown in this figure. This is the same as the 20-port numbering/indexing example described in FIG. 28. That is, FIG. 30 corresponds to a drawing in which the mapping relation between a (legacy) N-port number and Q-port(Q=NK) number defined according to Equation 24 is physically diagramed according to the antenna layout.

Hereinafter, the above-described port mapping/numbering method is described as a reference, for convenience of description. That is, hereinafter, in the case of the antenna layout to which one CSI-RS resource/configuration (a Q-port CSI-RS resource/configuration or (legacy) N-port CSI-RS resources/configurations aggregated to configure the Q-port CSI-RS resource/configuration) is mapped, a method of sequentially mapping CSI-RS port numbers in a vertical direction and/or right direction within an antenna layout having the same polarization/slant ("/" or "\") is described as a reference.

Such a mapping method is the same as a codebook application method for a Rel-13 UE, which is defined in 7.2.4 of TS 36.213. That is, according to the following standard contents, port numbering/indexing needs to be first performed in an N2 direction (i.e., vertical/vertical direction). The reason for this is that in the 2D antenna array, a codebook is configured in the Kronecker form of DFT vector of two domains. In this case, N2 means the size of the second domain among antenna port sizes notified from an eNB to a UE. N2 is different from N2 indicating the number of antenna ports of a CSI-RS resource/configuration, wherein k=2, and corresponds to N described above in relation to FIG. 12. For the clarity of notation, the size (M in FIG. 12, N1 in the present embodiment) of the first domain is newly defined as S1, and the size (N in FIG. 12, N2 in the present embodiment) of the second domain is newly defined as S2. According to such a representation method, the antenna port layout of FIG. 30 corresponds to where S1=5, S2=2인. For convenience of description, the antenna port layout is marked like (S1, S2).

* Standard contents (TS 36.213 section 7.2.4)

With respect to 8 antenna ports {15, 16, 17, 18,19,20,21,22}, 12 antenna ports {15, 16, 17, 18,19,20,21,22,23,24,25,26}, 16 antenna ports {15, 16, 17, 18,19,20,21,22,23,24,25,26,27,28,29,30}, a UE may be configured with a higher layer parameter CSI-Reporting-Type. CSI-Reporting-Type may be configured as "CLASS A." Each PMI value may correspond to three codebook indices given in Table 7.2.4-10, 7.2.4-11, 7.2.4-12, 7.2.4-13, 7.2.4-14, 7.2.4-15, 7.2.4-16, or 7.2.4-17 defined in the standard. In the table, $\varphi_n$, $u_m$ and $v_{l,m}$ parameters are defined by Equation 26.

$$\varphi_n = e^{j\pi n/2} \qquad \text{[Equation 26]}$$

$$u_m = \begin{bmatrix} 1 & e^{j\frac{2\pi m}{O_2 N_2}} & \dots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T$$

In Equation 26, N1, N2, O1 and O2 values may be configured as codebook-Config-N1, codebook-Config-N2, codebook-Over-Sampling-RateConfig-O1, and codebook-Over-Sampling-RateConfig-O2, respectively, which are higher layer parameters. The supported configurations of (O1, O2) and (N1, N2) for a given number of CSI-RS ports may be given in Table 8. A port number P may be 2*N1*N2.

TABLE 8

| Number of CSI-RS antenna ports, P | (N₁, N₂) | (O₁, O₂) |
|---|---|---|
| 8 | (2, 2) | (4, 4), (8, 8) |
| 12 | (2, 3) | (8, 4), (8, 8) |
|  | (3, 2) | (8, 4), (4, 4) |
|  | (2, 4) | (8, 4), (8, 8) |
| 16 | (4, 2) | (8, 4), (4, 4) |
|  | (8, 1) | (4, —), (8, —) |

If a codebookConfigN2 value is set to "1", a UE may not expect that a CodebookConfigCodebookConfig set value will be set to 2 or 3. Furthermore, if codebookConfigN2 is set to "1", the UE needs to use only i_(1,2)=0.

i_1, that is, the first PMI value, corresponds to a codebook index pair {i_(1,1), i_(1,2)}. i_2, that is, the second PMI value, may be given in Table 7.2.4. j having v may be associated with an RI value, and j=v+9.

In some cases, codebook subsampling may be supported. A parameter Codebook-Config set value is set to 2, 3, or 4, and a codebook subsampled with respect to the PUCCH mode 2-1 may be defined in Table 7.2.2-1F for the PUCCH report type 1a.

A case where CSI-RS resources/configurations having different port numbers are aggregated is described below.

FIG. 31 illustrates the port numbering/indexing of 20-port configured with (N0,N1,N2)=(8,8,4) when CDM-2 according to an embodiment of the present invention is applied. FIG. 32 illustrates the port numbering/indexing of 28-port configured with (N0,N1,N2,N3)=(8,8,8,4) when CDM-2 according to an embodiment of the present invention is applied.

In the figures, k indicates each aggregated CSI-RS resource/configuration number (e.g., k=0, 1, 2, . . . , K−1), K indicates a total number of aggregated CSI-RS resources/ configurations, and Nk indicates the number of ports per each CSI-RS resource/configuration divided by k.

In the case of 20-port and 28-port, when a CSI-RS is shared with a Rel-13 UE, to be configured with 16-port has an advantage in terms of power per CSI-RS port compared to a case where 12-port is configured. Accordingly, an aggregation of different port numbers may be taken into consideration. In this case, Equation 24 cannot be reused, and the port numbering methods illustrated in FIGS. 31 and 32 may be applied.

In order to configure a 20-port CSI-RS resource/configuration in a UE, an eNB may configure two 8-port CSI-RS resources/configurations and one 4-port CSI-RS resource/configuration in the UE, as shown in FIG. 31. The eNB may configure a 16-port CSI-RS resource/configuration by configuring the two 8-port CSI-RS resources/configurations (k=0,1) of the three CSI-RS resources/configurations in a Rel-13 UE. As a result, the UE configured with the 20-port CSI-RS resource/configuration shares the 16-port CSI-RS resource/configuration with the Rel-13 UE.

Likewise, in order to configure a 28-port CSI-RS resource/configuration in a UE, an eNB may configure three 8-port CSI-RS resources/configurations and one 4-port CSI-RS resource/configuration in the UE, as shown in FIG. 32. The eNB may configure a 16-port CSI-RS resource/configuration by configuring the two 8-port CSI-RS resources/configurations (k=0,1) of the four CSI-RS resource/configurations in a Rel-13 UE. As a result, the UE configured with the 28-port CSI-RS resource/configuration shares the 16-port CSI-RS resource/configuration with the Rel-13 UE.

If such FIGS. 31 and 32 are generalized, it may be represented like Equation 27.

$$n = \begin{cases} p' + \sum_{l=0}^{k} \frac{N_{l-1}}{2}, & p' = 15, 16, \ldots, 14 + \frac{N_k}{2} \\ p' + \sum_{l=0}^{k} \frac{N_{l-1}}{2} + \sum_{l=0, l \neq k}^{K-1} \frac{N_l}{2}, & p' = 15 + \frac{N_k}{2}, \ldots, 14 + N_k \end{cases}$$ [Equation 27]

In Equation 27, k=0,1, . . . K−1 and N_(−1)=0. In addition, description regarding each parameter is the same as that described above. When a Q-port is configured using Equation 27, in order to facilitate the reuse/configuration/sharing of the above-described CSI-RS resource/configuration, an eNB may be restricted to configure a CSI-RS resource/configuration having the same number of ports when a CSI-RS resource/configuration of (N0,N1, . . . ,NK−1) is configured in a Q-port UE and to configure a CSI-RS resource/configuration having the remaining different port number. For example, a CSI-RS configuration of a form, such as (N0,N1,N2)=(8,4,8), (N0, N1,N2,N3)=(8,4,8,8), is not permitted, and a UE does not expect that such a CSI-RS resource/configuration will be performed. This is for preventing performance degradation which may occur because a uniform distance between 16 antenna ports to which a CSI-RS to be measured by a Rel-13 UE that reuses 16-port is mapped is not maintained.

Port numbering/indexing methods when CDM-2 is applied have been described above. Port numbering/indexing methods when CDM-4 is applied are proposed below.

A UE configured with CDM-4 defined in Rel-13 may sequentially perform port numbering on K N-port CSI-RS resources/configurations according to Equation 25. If this is extended and applied to a Q-port CSI-RS resource/configuration, although an eNB configures a CSI-RS resource/configuration to be reused in a Rel-13 UE, the Rel-13 UE cannot reuse an antenna port configured by the eNB because polarization between an antenna port to which the CSI-RS is mapped and an antenna port assumed by the Rel-13 UE is different based on a result of actual port numbering. Such a problem is described in detail below in relation to FIG. 33.

FIG. 33 illustrates a port numbering/indexing method of 24-port configured with (N,K)=(8,3) when CDM-4 is applied according to an embodiment of the present invention.

In this figure, k indicates each aggregated CSI-RS resource/configuration number (e.g., k=0, 1, 2, . . . , K−1), K indicates a total number of aggregated CSI-RS resources/configurations, and Nk indicates the number of ports per each CSI-RS resource/configuration divided by k.

Assuming that 24-port has an antenna layout of (S1,S2)=(3,4) (i.e., 4 rows 3 columns), if the port numbering method of FIG. 30 is applied, ports to which port numbers 15 to 26 have been assigned have the same first polarization/slant, and ports to which port numbers 27 to 38 have been assigned have the same second polarization/slant. In this case, the first polarization/slant may be different from the second polarization/slant.

However, although any two of the three 8-port CSI-RS resources/configurations are configured in a Rel-13 8-port UE, the Rel-13 UE cannot reuse the two CSI-RS resources/configurations. The reason for this is that each polarization/slant has a different number of ports or the locations of antenna ports to which CSI-RSs are mapped are different. For example, if an eNB configures, in the Rel-13 UE, k=0 and 1 as 16-port CSI-RS resources/configurations, 12 ports are mapped to a "/" polarization/slant and four ports are mapped to a "\" polarization/slant. Alternatively, if the eNB configures, in the Rel-13 UE, k=0 and 2 as 16-port CSI-RS resources/configurations, each polarization/slant has eight ports, but the locations of antenna ports to which CSI-RSs are mapped are different. Accordingly, the Rel-13 UE cannot reuse the CSI-RSs because the locations are not matched with an antenna port layout (and/or cross polarization form) defined in Rel-13.

Accordingly, there is proposed a new CSI-RS port indexing/numbering method for solving such a problem.

FIG. 34 illustrates a port numbering method of 20-port configured with (N,K)=(4,5) when CDM-4 is applied according to an embodiment of the present invention. In the present embodiment, it is assumed that the 20-port has an antenna layout of (S1,S2)=(5,2) (i.e., 2 rows 5 columns) and port numbers 15 to 34 are sequentially numbered/indexed in the 20-port of the corresponding antenna layout according to the method (i.e., a vertical direction (or bottom→up) and right direction by the same polarization/slant) described in FIG. 30 for a 20-port UE.

In order to support a Rel-13 12-port UE in a CDM-4 application situation, port numbering of a (legacy) 4-port unit may be additionally performed on the 20-port ({15, 16, 17, 18} numbering/mapping for each CSI-RS resource/configuration with respect to the 20-port). That is, numbering for a UE configured with a 20-port CSI-RS resource/configuration and numbering for a legacy UE which shares a 12-port CSI-RS resource/configuration of the 20-port CSI-RS resource/configuration may be performed on the same 20-port. As a result, a one-to-one mapping relation may be established between a port number for the 20-port UE and a port number for the 12-port UE because the same 20-port CSI-RS resource/configuration is a reference. However, in this case, the Rel-13 UE may reuse the CSI-RSs only when the port numbering is performed to be matched with the antenna port layout defined in Rel-13 as described above.

Accordingly, this specification proposes that a numbering/indexing method for CSI-RS ports shared with a Rel-13 UE and a numbering/indexing method for the remaining aggregated (or not-shared) CSI-RS resources/configurations are differently configured as shown in FIG. 34.

For example, referring to FIG. 34, if a CSI-RS resource/configuration corresponding to k=0, 1, 2 is mapped to a shared 12-port of the 20-port, 4-port numbers {15, 16, 17, 18} corresponding to k=0, 1, 2 may be sequentially numbered within the shared 12-port (in the bottom→up and left→right by the same polarization/slant as described in FIG. 30). In this case, {15, 16, 17, 18} corresponding to k=0→{15, 16, 17, 18} corresponding to k=1→{15, 16, 17, 18} corresponding to k=2 may be sequentially numbered in the shared 12-port. A CSI-RS corresponding to each CSI-RS configuration/resource may be mapped to the 12-port based on a result of such numbering and transmitted to a UE. The transmitted 12-port CSI-RS can be shared between a 20-port UE and a 12-port UE.

Furthermore, the remaining not-shared 8-port may be numbered so that CSI-RS resources of N/2(=4/2=2-port) are mapped the one-side polarization/slant of antenna ports at the same location and the remaining CSI-RS resources of N/2 are mapped to the other-side polarization/slant of the antenna ports at the same location. That is, 4-port numbers {15, 16, 17, 18} corresponding to the same CSI-RS resource/configuration (e.g., k=3 or 4) may be sequentially numbered in a cross polarization form (i.e., the same polarization/slant unit) with respect to the ports at the same location.

That is, the above-described contents are arranged as follows. Port numbers (e.g., {15, 16, 17, 18}) may be sequentially assigned to the shared ports (e.g., 12-port) in ascending powers of a CSI-RS configuration number (e.g., k=0, 1, 2) assigned to each CSI-RS configuration in a pre-configured rule/sequence/direction (e.g., ports having the same polarization/slant are sequentially numbered in the top direction and/or right direction). Port numbers (e.g., {15, 16, 17, 18}) may be sequentially assigned to not-shared ports (e.g., 8-port) by the same CSI-RS configuration (e.g., k=3,4) in an aggregated port (e.g., 4-port) unit in a pre-configured rule/sequence/direction (e.g., ports having the same polarization/slant are sequentially numbered in the top direction and/or right direction 으로).

If different port numbering methods are performed for each shared port and for each not-shared port as described above, the same CSI-RS configuration(k) may not be essentially mapped to ports at the same location among shared ports, but the same CSI-RS configuration(k) may be mapped to ports at the same location among not-shared ports.

The numbering method according to the embodiment of FIG. 34 is diagrammed in a table form like Class 1 of FIG. 35.

FIG. 35 is a diagram illustrating a port numbering method of 20-port configured with (N,K)=(4,5) when CDM-4 is applied according to an embodiment of the present invention.

In this figure, k indicates each aggregated CSI-RS resource/configuration number (e.g., k=0, 1, 2, . . . , K−1), K indicates a total number of aggregated CSI-RS resources/configurations, Nk indicates the number of ports per each CSI-RS resource/configuration divided by k, S1 indicates a column of a 20-port antenna layout, and S2 indicates a row of the 20-port antenna layout. Furthermore, in this figure, antenna ports to which 15 to 24 port numbers of the 24-port have been assigned have a first polarization/slant (indicated by a white room), and antenna ports to which 25 to 34 port numbers of the 24-port have been assigned have a second polarization/slant (indicated by a gray room).

Referring to FIG. 35, Case 1 illustrates a 20-port numbering embodiment when the size of S1 is equal to or greater than that of S2, and Case 2 illustrates a 20-port numbering embodiment when the size of S1 is smaller than that of S2. For example, Case 1 may correspond to (S1,S2)=(5,2), and Case 2 may correspond to (S1,S2)=(2,5).

In the case of Case 2, the same port numbering method/principle as that of Case 1 described in FIG. 34 may be identically applied. That is, as shown in FIG. 35, an antenna port layout may have a different port number configuration for each case, but a basic principle of the assignment/configuration of port numbering is the same as that described in FIG. 34.

Port numbering which may be applied for each case is determined by the size of S2. A UE may be implicitly aware of which port numbering will be applied based on a value of S1, S2 and/or N signaled through RRC or an eNB may directly notify a UE which port numbering rule will be applied through RRC signaling. For example, a Rel-14 UE (or UE of a new wireless communication system) configured with (S1,S2)=(5,2), (N,K)=(4,5) will apply Case 1, and a Rel-14 UE (or UE of a new wireless communication system) configured with (S1,S2)=(2,5), (N,K)=(4,5) will apply Case 2.

Furthermore, an antenna port layout of CSI-RS resources shared with a Rel-13 UE may also be determined for each case. For example, if an eNB configures Case 1 in a Rel-14 UE, it may configure (S1,S2)=(3,2) in a Rel-13 UE. If an eNB configures Case 2 in a Rel-14 UE, it may configure (S1,S2)=(2,3) in a Rel-13 UE. Contents regarding such an embodiment are described later in relation to FIG. 41.

FIGS. 36 and 37 illustrate the port numbering of 24-port configured with (N,K)=(8,3) or (N,K)=(4,6) when CDM-4 is applied according to an embodiment of the present invention.

In the figures, k indicates each aggregated CSI-RS resource/configuration number (e.g., k=0, 1, 2, . . . , K−1), K indicates a total number of aggregated CSI-RS resources/configurations, Nk indicates the number of ports per each CSI-RS resource/configuration divided by k, S1 indicates a column of a 24-port antenna layout, and S2 indicates a row of the 24-port antenna layout. Furthermore, in this figure, antenna ports to which the 15 to 26 port numbers of the 24-port have been assigned have a first polarization/slant (indicated by a white room), and antenna ports to which the 27 to 38 port numbers of the 24-port have been assigned have a second polarization/slant (indicated by a gray room).

Case 1 of FIG. 36 shows the numbering/indexing of 24-port configured with (N,K)=(8,3) and having an antenna layout S2=1, 2 or 4. In the situation in which CDM-4 is applied, port numbering may be performed on the corresponding 24-port for the purpose of the sharing of a 16-port CSI-RS resource/configuration with a Rel-13 UE. That is, the port mapping method of a Rel-13 16-port and shared CSI-RS resources/configurations (e.g., k=0,1) (or the numbering method of a shared 16-port) and the port mapping method of the remaining aggregated CSI-RS resource configurations (e.g., k=2) (or the numbering method of a not-shared 8-port) may be differently configured. A detailed description thereof is the same as that described above in relation to FIGS. 34 and 35.

Case 2 of FIG. 36 shows the numbering/indexing of 24-port configured with (N,K)=(4,6) and having an antenna layout S2=3. In the situation in which CDM-4 is applied, port numbering may be performed on the corresponding 24-port for the purpose of the sharing of a 12-port CSI-RS resource/configuration with a Rel-13 UE. That is, the port mapping method of a Rel-13 12-port and shared CSI-RS resources/configurations (e.g., k=0, 1, 2) (or the numbering method of a shared 12-port) and the port mapping method of the remaining aggregated CSI-RS resource configurations (e.g., k=3,4,5) (or the numbering method of a not-shared 12-port) may be differently configured. A detailed description thereof is the same as that described above in relation to FIGS. 34 and 35.

Case 3 of FIG. 37 shows the numbering/indexing of 24-port configured with (N,K)=(8,3) and having an antenna layout S2=6. In the situation in which CDM-4 is applied, port numbering may be performed on the corresponding 24-port for the purpose of the sharing of a 16-port CSI-RS resource/configuration with a Rel-13 UE. That is, the port mapping method of a Rel-13 16-port and shared CSI-RS resources/configurations (e.g., k=0,1) (or the numbering method of a shared 16-port) and the port mapping method of the remaining aggregated CSI-RS resource configurations (e.g., k=2) (or the numbering method of a not-shared 8-port) may be differently configured. A detailed description thereof is the same as that described above in relation to FIGS. 34 and 35.

Case 4 of FIG. 37 shows the numbering/indexing of 24-port configured with (N,K)=(4,6) and having an antenna layout S2=6. In the situation in which CDM-4 is applied, port numbering may be performed on the corresponding 24-port for the purpose of the sharing of a 12-port CSI-RS resource/configuration with a Rel-13 UE. That is, the port mapping method of a Rel-13 12-port and shared CSI-RS resources/configurations (e.g., k=0, 1, 2) (or the numbering method of a shared 12-port) and the port mapping method of the remaining aggregated CSI-RS resource configurations (e.g., k=3,4,5) (or the numbering method of a not-shared 12-port) may be differently configured. A detailed description thereof is the same as that described above in relation to FIGS. 34 and 35.

Case 5 of FIG. 37 shows the numbering/indexing of 24-port configured with (N,K)=(8,3) and having an antenna layout S2=3. In the situation in which CDM-4 is applied, port numbering may be performed on the corresponding 24-port for the purpose of the sharing of a 16-port CSI-RS resource/configuration with a Rel-13 UE. That is, the port mapping method of a Rel-13 16-port and shared CSI-RS resources/configurations (e.g., k=0,1) (or the numbering method of a shared 16-port) and the port mapping method of the remaining aggregated CSI-RS resource configurations (e.g., k=2) (or the numbering method of a not-shared 8-port) may be differently configured. A detailed description thereof is the same as that described above in relation to FIGS. 34 and 35.

As described above, the port numbering principle is characterized in that ports sharing resources are sequentially numbered (e.g., in the top→down direction and/or left→right in the same polarization/slant unit) (so that the shared CSI-RS resources are mapped to a 16-port), and the remaining ports not sharing resources are numbered so that N/2 CSI-RS resources are mapped to one-side polarization/slant of antenna ports at the same location and the remaining N/2 CSI-RS resources are mapped to the other-side polarization/slant of the antenna port at the same location (so that they have the same k as the mapped N/2 CSI-RS resources).

Port numbering which may be applied for each case is determined by the size of S2. A UE may be implicitly aware of which port numbering will be applied based on a value of S1, S2 and/or N signaled through RRC or an eNB may directly notify a UE which port numbering rule will be applied through RRC signaling. For example, a Rel-14 UE (or UE of a new wireless communication system) configured with (S1,S2)=(6,2), (N,K)=(8,3) will apply Case 1, and a Rel-14 UE (or UE of a new wireless communication system) configured with (S1,S2)=(2,6), (N,K)=(8,3) will apply Case 3.

Furthermore, an antenna port layout of CSI-RS resources shared with a Rel-13 UE may be determined for each case. For example, if an eNB configures Case 1 in a Rel-14 UE, it may configure (S1,S2)=(4,2) in a Rel-13 UE. If an eNB configures Case 3 in a Rel-14 UE, it may configure (S1,S2)=(2,4) in a Rel-13 UE. Contents regarding such an embodiment are described below in relation to FIG. 41.

Figure 38:
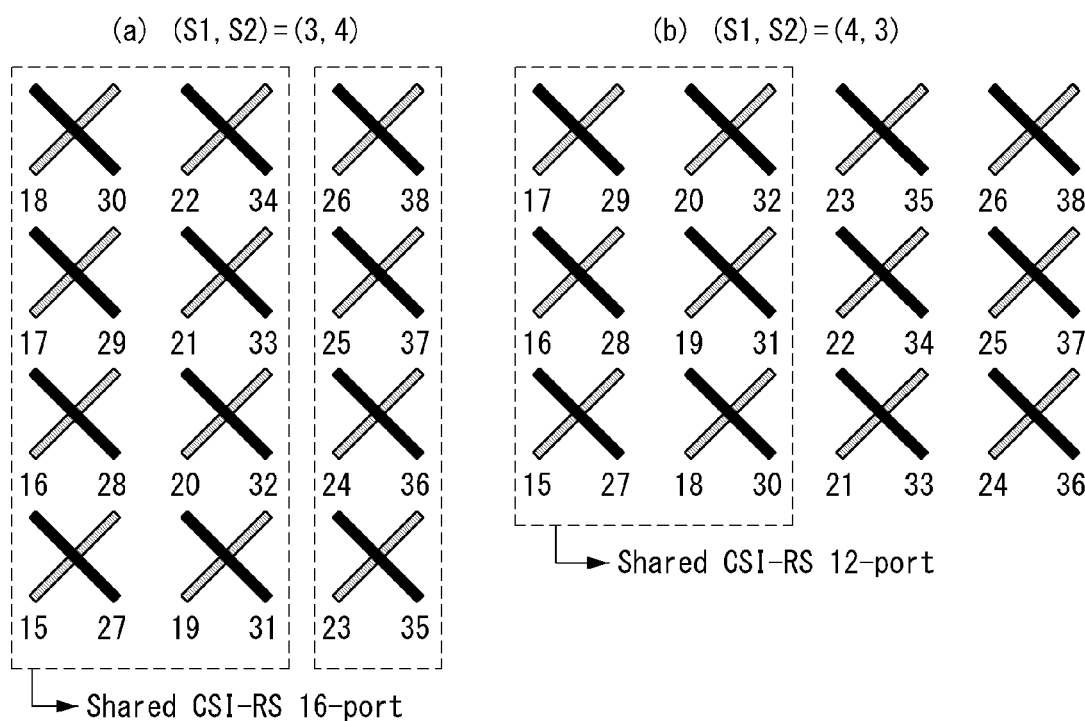
FIG. 38(a) illustrates the numbering of 24-port having an antenna layout of (S1,S2)=(3,4) according to an embodiment of the present invention.
FIG. 38(b) illustrates the numbering of 24-port having an antenna layout of (S1,S2)=(4,3) according to an embodiment of the present invention.

FIG. 38(*a*) illustrates the numbering of 24-port having an antenna layout of (S1,S2)=(3,4) according to an embodiment of the present invention, and FIG. 38(*b*) illustrates the numbering of 24-port having an antenna layout of (S1,S2)=(4,3) according to an embodiment of the present invention.

Referring to FIGS. 38(*a*) and 38(*b*), if the same port numbering method proposed in this specification is applied to different antenna layouts, the size of a port that may be shared with a Rel-13 UE may be different. Accordingly, this specification proposes that the port numbers of aggregated CSI-RS resources/configuration are determined/configured based on an antenna port layout shape (i.e., an N value is determined based on an antenna port layout).

For example, in the case of 24-port having an antenna layout of (S1,S2)=(3,4) as in FIG. 38(*a*), an aggregated port unit N may be configured as "8-port". In the case of 24-port having an antenna layout of (S1,S2)=(4,3) as in FIG. 38(*b*), an aggregated port unit N may be configured as "4-port."

FIG. 39 illustrates the numbering of 28-port configured with (N,K)=(4,7) when CDM-4 is applied according to an embodiment of the present invention. Specifically, Case 1 of FIG. 39 illustrates 28-port numbering regarding an antenna port layout that satisfies a condition in which S1 is equal to or greater than S2 (e.g., (S1,Ω)=(7,2)). Case 2 illustrates 28-port numbering regarding an antenna port layout that satisfies a condition in which S1 is smaller than S2 (e.g., (S1,S2)=(2,7)).

In this figure, k indicates each aggregated CSI-RS resource/configuration number (e.g., k=0, 1, 2, ..., K−1), K indicates a total number of aggregated CSI-RS resources/configurations, Nk indicates the number of ports per each CSI-RS resource/configuration divided by k, S1 indicates a column of a 28-port antenna layout, and S2 indicates a column of the 28-port antenna layout. Furthermore, in this figure, antenna ports to which the 15 to 28 port numbers of the 28-port have been assigned have a first polarization/slant (indicated by a white room), and antenna ports to which the 29 to 42 port numbers of the 28-port have been assigned have a second polarization/slant (indicated by a gray room).

In FIG. 39, for the purpose of the sharing of CSI-RS resource/configurations mapped to the 12-port of 28-port with a Rel-13 UE in the situation in which CDM-4 is applied, port numbering may be performed on the 28-port. That is, the port mapping method of a Rel-13 12-port and shared CSI-RS resources/configurations (e.g., k=0, 1, 2) (or the numbering method of a shared 12-port) and the port mapping method of the remaining aggregated CSI-RS resource configurations (e.g., k=3,4,5,6) (or the numbering method of a not-shared 12-port) may be differently configured. A detailed description thereof is the same as that described above in relation to FIGS. 34 and 35.

As described above, the port numbering principle is characterized in that ports sharing resources are sequentially numbered (e.g., in the top→down direction and/or left→right in the same polarization/slant unit) (so that the shared CSI-RS resources are mapped to a 12-port), and the remaining ports not sharing resources are numbered so that N/2 CSI-RS resources are mapped to one-side polarization/slant of antenna ports at the same location and the remaining N/2 CSI-RS resources are mapped to the other-side polarization/slant of the antenna port at the same location (so that they have the same k as the mapped N/2 CSI-RS resources).

Furthermore, as in the examples of Case 1 and Case 2, antenna port layouts may have different port number configurations, but a basic configuration principle is the same. This is the same as that described above in relation to FIGS. 34 and 35.

Port numbering which may be applied for each case is determined by the size of S2. A UE may be implicitly aware of which port numbering will be applied based on a value of S1, S2 and/or N signaled through RRC or an eNB may directly notify a UE which port numbering rule will be applied through RRC signaling. For example, a Rel-14 UE (or UE of a new wireless communication system) configured with (S1,S2)=(7,2), (N,K)=(4,7) will apply Case 1, and a Rel-14 UE (or UE of a new wireless communication system) configured with (S1,S2)=(2,7), (N,K)=(4,7) will apply Case 2.

Furthermore, the antenna port layout of CSI-RS resources shared with a Rel-13 UE may be determined for each case. For example, if an eNB configures Case 1 in a Rel-14 UE, it may configure (S1,S2)=(3,2) in a Rel-13 UE. If an eNB configures Case 2 in a Rel-14 UE, it may configure (S1,S2)=(2,3) in a Rel-13 UE. Contents regarding such an embodiment are described later in relation to FIG. 41.

FIG. 40 illustrates the port numbering of 32-port configured with (N,K)=(8,4) when CDM-4 is applied according to an embodiment of the present invention. Specifically, Case 1 of FIG. 40 illustrates 32-port numbering regarding an antenna port layout that satisfies a condition in which S1 is equal to or greater than S2 (e.g., (S1,S2)=(8,2)). Case 2 of FIG. 40 illustrates 32-port numbering regarding an antenna port layout that satisfies a condition in which S2 is 8. Case 3 of FIG. 40 illustrates 32-port numbering in which Equation 25 is reused without any change when CDM-4 is applied in a Rel-13 system.

In this figure, k indicates each aggregated CSI-RS resource/configuration number (e.g., k=0, 1, 2, . . . , K−1), K indicates a total number of aggregated CSI-RS resources/configurations, Nk indicates the number of ports per each CSI-RS resource/configuration divided by k, S1 indicates a column of a 32-port antenna layout, and S2 indicates a row of the 32-port antenna layout. Furthermore, in this figure, antenna ports to which the 15 to 30 port numbers of the 32-port have been assigned have a first polarization/slant (indicated by a white room), and antenna ports to which the 31 to 46 port numbers of the 32-port have been assigned have a second polarization/slant (indicated by a gray room).

In FIG. 40, for the purpose of the sharing of CSI-RS resource/configurations mapped to the 16-port of 32-port with a Rel-13 UE in the situation in which CDM-4 is applied, port numbering may be performed on the 32-port. That is, the port mapping method of a Rel-13 16-port and shared CSI-RS resources/configurations (e.g., k=0,1) (or the numbering method of a shared 16-port) and the port mapping method of the remaining aggregated CSI-RS resource configurations (e.g., k=2,3) (or the numbering method of a not-shared 16-port) may be differently configured. A detailed description thereof is the same as that described above in relation to above FIGS. 34 and 35.

As described above, the port numbering principle is characterized in that ports sharing resources are sequentially numbered (e.g., in the top→down direction and/or left→right in the same polarization/slant unit) (so that the shared CSI-RS resources are mapped to a 16-port), and the remaining ports not sharing resources are numbered so that N/2 CSI-RS resources are mapped to one-side polarization/slant of antenna ports at the same location and the remaining N/2 CSI-RS resources are mapped to the other-side polarization/slant of the antenna port at the same location (so that they have the same k as the mapped N/2 CSI-RS resources).

Furthermore, as in the examples of Case 1 and Case 2, an antenna port layout has a different port number configuration, but a basic configuration principle is the same. As described above in relation to FIGS. 34 and 35, Case 1 may support 32-port numbering having a layout of (S1,S2)=(8,1) and (S1,S2)=(4,2), and Case 2 may support 32-port numbering having a layout of (S1,S2)=(2,4).

Port numbering which may be applied for each case is determined by the size of S2. A UE may be implicitly aware of which port numbering will be applied based on a value of S1, S2 and/or N signaled through RRC or an eNB may directly notify a UE which port numbering rule will be applied through RRC signaling. For example, a Rel-14 UE (or UE of a new wireless communication system) configured with (S1,S2)=(8,2), (N,K)=(8,4) will apply Case 1, and a Rel-14 UE (or UE of a new wireless communication system) configured with (S1,S2)=(2,9), (N,K)=(8,4) will apply Case 2.

Furthermore, the antenna port layout of CSI-RS resources shared with a Rel-13 UE may also be determined for each case. For example, if an eNB configures Case 1 in a Rel-14 UE, it may configure (S1,S2)=(4,2) in a Rel-13 UE. If an eNB configures Case 2 in a Rel-14 UE, it may (S1,S2)=(2,4) in a Rel-13 UE. Contents regarding such an embodiment are described later in relation to FIG. 41.

Case 3 corresponds to an embodiment regarding a numbering/indexing method of reusing Equation 25 defined for CDM-4 in Rel-13. A eNB may notify a Rel-13 UE of a CSI-RS resource/configuration to be reused by taking into consideration an antenna port layout. In the case of Case 3, an eNB may indicate two 8-port CSI-RS resources/configurations (i.e., 16-port CSI-RS resources/configurations) corresponding to k=0,1 with respect to a Rel-13 UE. The Rel-13 UE may reuse the indicated CSI-RS resources/configurations.

The reason why Equation 25 can be reused as described above is that a 32-port number can be expressed as an exponent of 2 (i.e., 32=2^5). In contrast, if ports not expressed as an exponent of 2, such as 20-, 24-, 28-port, are numbered/indexed by reusing Equation 25 without any change, a CSI-RS cannot be reused/shared because it is not matched with a CSI-RS layout supportable by a Rel-13 UE as described above.

Accordingly, if a Rel-13 UE and a Q-port (Q≥20) UE are configured with CDM-4, an eNB may determine whether to share/reuse CSI-RS resources by taking into consideration the capability, traffic and/or channel environment of UEs within a cell, and may notify a UE of a port numbering/indexing rule through RRC signaling.

FIG. 41 is a table in which Q-port numbering rules having an aggregation of the same number of ports taken into consideration have been arranged when CDM-4 is applied according to an embodiment of the present invention. More specifically, this figure corresponds to a table in which numbering rules for each port described above in FIGS. 35 to 40 have been arranged for each antenna layout.

Referring to FIG. 41, the port numbering of Case 1 of FIG. 35 may be applied to 20-port having antenna layout of (S1,S2)=(5,2). 12-port corresponding to an antenna layout of (S1,S2)=(3,2) may be reused by a Rel-13 UE. Furthermore, the port numbering of Case 2 of FIG. 35 may be applied to 20-port having an antenna layout of (S1,S2)=(2,5). 12-port corresponding to an antenna layout of (S1,S2)=(2,3) may be reused by a Rel-13 UE.

As described above, as described in FIG. 41, specific port numbering may be applied to 24-, 28-, 32-ports. CSI-RS ports reused/shared by a Rel-13 UE and the layout of the corresponding ports may be determined based on each antenna layout.

If a port numbering rule corresponding to Case 1 (Cases 1 and 2 in the case of 24-port) of Q-port most widely used in the table of FIG. 41 is expressed into an equation, it may be represented like Equation 28.

[Equation 28]

$$n = \begin{cases} Nk + u\left(\dfrac{p' + \dfrac{N}{2}(2k-J) -}{2\left(8 - \dfrac{8}{N}\right)}\right) * \left(\dfrac{N(K-J)}{2}\right) + p', & p' = 15, 16, \ldots, +14+N, \; k = 0, \ldots, J-1 \\ \dfrac{NJ}{2} + \dfrac{N}{2}(k-J) + p', & p' = 15, 16, \ldots, +14+\dfrac{N}{2}, \; k = J, \ldots, K-1 \\ \dfrac{NJ}{2} + \dfrac{N}{2}(k-J+k-1) + p', & p' = 15 + \dfrac{N}{2}, \ldots, +14+N, \; k = J, \ldots, K-1 \end{cases}$$

where $u(x)=1$ if $x>0$, otherwise $u(x)=0$.

In Equation 28, a description regarding each parameter is the same as that described above. That is, in Equation 28, n indicates the final CSI-RS Q-port number/index calculated as a result of port numbering/indexing, k indicates each aggregated CSI-RS resource/configuration number (e.g., k=0, 1, 2, . . . , K−1), K indicates a total number of aggregated CSI-RS resources/configurations, N indicates the number of ports per aggregated CSI-RS resource/configuration, and p' indicates the port number/index of an aggregated (legacy) N-port CSI-RS resource/configuration. Furthermore, in Equation 28, J is the number of shared CSI-RS resource/configurations. That is, if a 12-port CSI-RS resource/configuration (i.e., three 4-port CSI-RS resource/configuration) is shared, J=3. If a 16-port CSI-RS resource/configuration (two 8-port CSI-RS resources/configurations) is shared, J=2.

The above-described embodiments are put together. In Rel-13, in the case of CDM-4, CSI-RS ports are sequentially numbered according to aggregated CSI-RS resources. Accordingly, such a port numbering method cannot be adopted in Rel-14 in which CSI-RS resource sharing is supported. Furthermore, the port numbering rule may be branched based on a supported Rel-14 antenna port layout. To solve this, one simple solution is to make the port numbering rule which can be adopted as many antenna configurations as it can. To determine whether to permit CSI-RS resource sharing depends on an eNB implementation. In this sense, this specification proposes a port numbering rule, such as Equation 28.

FIG. 42 illustrates the results of the numbering of 20-port and 24-port by applying Equation 28 according to an embodiment of the present invention.

A table illustrating the 20-port numbering of FIG. 42 corresponds to Case 1 of FIG. 35, and a table illustrating the 24-port numbering of FIG. 42 corresponds to Case 1 of FIG. 36.

Table 9 illustrates port combinations to which the port numbering rule of Equation 28 may be applied.

TABLE 9

| | Applicable port combination (N1, N2) |
|---|---|
| 20-port | (5, 2) |
| 24-port | (3, 4), (6, 2), (12, 1) |
| 28-port | (7, 2) |
| 32-port | (4, 4), (8, 2), (16, 1) |

In Table 9, N1 corresponds to S1 and N2 corresponds to S2.

Referring to Table 9, as a result, ports to which the port numbering rule according to Equation 28 may be applied may include 20-port having an antenna port layout of (N1,N2) (or (S1,S2))=(5,2)), 24-port having an antenna port layout of (N1,N2) (or (S1,S2))=(3,4), (6,2), or (12,1)), 28-port having an antenna port layout of (N1,N2) (or (S1, S2))=(7,2)), and 32-port having an antenna port layout of (N1,N2) (or (S1,S2))=(4,4), (8,2), or (16,1)).

A port numbering method when CSI-RS resource/configurations of different port numbers are aggregated in the situation in which CDM-4 is applied is described below.

As show in FIG. 41, a CSI-RS port number capable of CSI-RS resource sharing may be determined by an N value. Accordingly, in the case of 20-, 28-port, a Rel-13 UE may reuse only a 12-port CSI-RS. Resource reuse efficiency (e.g., 12-port/20-port or 12-port/28-port) when a 12-port CSI-RS is reused as described above is lower than that when a 16-port CSI-RS is reused (e.g., 16-port/20-port or 16-port/28-port). In order to overcome such a problem, there may be proposed a port numbering method for enabling a Rel-13 UE to reuse 16-port with respect to 20-, 28-port.

FIG. 43 illustrates the port numbering of 20-port configured with (N0,N1,N2)=(8,8,4) when CDM-4 is applied according to an embodiment of the present invention. Specifically, Case 1 of FIG. 43 illustrates 20-port numbering regarding an antenna port layout that satisfies a condition in which S1 is equal to or greater than S2 (e.g., (S1,S2)=(5,2)). Case 2 of FIG. 43 illustrates 20-port numbering regarding an antenna port layout that satisfies a condition in which S1 is smaller than S2 (e.g., (S1,S2)=(2,5)).

In this figure, k indicates each aggregated CSI-RS resource/configuration number (e.g., k=0, 1, 2, . . . , K−1), K indicates a total number of aggregated CSI-RS resources/configurations, Nk indicates the number of ports per each CSI-RS resource/configuration divided by k, S1 indicates a column of a 20-port antenna layout, and S2 indicates a row of the 20-port antenna layout. Furthermore, in this figure, antenna ports to which the 15 to 24 port numbers of 20-port have been assigned have a first polarization/slant (indicated by a white room), and antenna ports to which the 25 to 34 port numbers of the 20-port have been assigned have a second polarization/slant (indicated by a gray room).

FIG. 44 illustrates the port numbering of 28-port configured with (N0,N1,N2,N3)=(8,8,8,4) when CDM-4 of the present invention is applied. Specifically, Case 1 of FIG. 44 illustrates 28-port numbering regarding an antenna port layout that satisfies a condition in which S1 is equal to or greater than S2 (e.g., (S1,S2)=(7,2)). Case 2 of FIG. 44 illustrates 28-port numbering regarding an antenna port layout that satisfies a condition in which S1 is smaller than S2 (e.g., (S1,S2)=(2,7)).

In this figure, k indicates each aggregated CSI-RS resource/configuration number (e.g., k=0, 1, 2, . . . , K−1), K indicates a total number of aggregated CSI-RS resources/configurations, Nk indicates the number of ports per each CSI-RS resource/configuration divided by k, S1 indicates a column of a 28-port antenna layout, and S2 indicates a column of the 28-port antenna layout. Furthermore, in this figure, antenna ports to which the 15 to 28 port numbers of 20-port have been assigned have a first polarization/slant (indicated by a white room), and antenna ports to which the 29 to 42 port numbers of the 20-port have been assigned have a second polarization/slant (indicated by a gray room).

Referring to FIG. 43, in order to configure a 20-port CSI-RS in a UE, an eNB may configure two 8-port CSI-RS resources/configurations and one 4-port CSI-RS resource/configuration (i.e., configure the 20-port CSI-RS in one UE by aggregating CSI-RS resources/configurations having at least one different port number). The eNB may support a Rel-13 UE by configuring the two 8-port CSI-RS resources/configurations (k=0,1) of the CSI-RS resources/configurations configured in the UE so that the Rel-13 UE can be configured with a 16-port CSI-RS and share a 16-port CSI-RS resource/configuration with a 20-port UE.

Referring to FIG. 44, in order to configure a 28-port CSI-RS in a UE, an eNB may configure three 8-port CSI-RS resources/configurations and one 4-port CSI-RS resource/configuration (i.e., configure the 28-port CSI-RS in the UE by aggregating CSI-RS resources/configurations having at least one different port number. In this case, as in the embodiment of FIG. 31, the eNB may support a Rel-13 UE by configuring the two 8-port CSI-RS resources/configurations (k=0,1) of the CSI-RS resources/configurations configured in the UE so that the Rel-13 UE can be configured with a 16-port CSI-RS and share the 16-port CSI-RS resource/configuration with a 28-port UE.

In an aggregation embodiment between CSI-RS resources/configurations having different port numbers in the situation of CDM-4, as in the aggregation embodiment between CSI-RS resources/configurations having the same number of ports in the situation of CDM-4, as in the examples of Case 1 and Case 2, an antenna port layout has different port numbering, but a configuration principle thereof is the same and is the same as that described above in relation to FIGS. 34 and 35.

Port numbering which may be applied for each case is determined by the size of S2. A UE may be implicitly aware of which port numbering will be applied based on a value of S1, S2 and/or N signaled through RRC or an eNB may directly notify a UE which port numbering rule will be applied through RRC signaling.

If Equation 28 is changed based on the port numbering rule of Case 1 of FIGS. 43 and 44, that is, an aggregation embodiment of a CSI-RS resource/configuration having different port numbers, Equation 29 may be derived.

$$n = \begin{cases} 8k + k \cdot \left(\sum_{l=2}^{K-1} \frac{N_l}{2}\right) + p', & p' = 15, 16, \ldots, 22, \\ & k = 0, 1 \\ 8 + u(k-2)\sum_{l=2}^{k-1} \frac{N_l}{2} + p', & p' = 15, 16, \ldots, +14 + \frac{N_k}{2}, \\ & k = 2, \ldots, K-1 \\ 8 + u(k-2)\sum_{l=2}^{k-1} \frac{N_l}{2} + \\ \sum_{l=0, l \neq k}^{K-1} \frac{N_l}{2} + p' & p' = 15 + \frac{N_k}{2}, \ldots, +14 + N_k, \\ & k = 2, \ldots, K-1 \end{cases}$$

[Equation 29]

where u(x)=1 if x>0, otherwise u(x)=0.

A description regarding each parameter of Equation 29 is the same as that described above in relation to Equation 28.

If a Q-port CSI-RS resource/configuration in which CSI-RS resources/configurations of different port numbers have been aggregated is used in the situation in which CDM-4 is applied, CDM-4 of a different form may be applied/configured for each CSI-RS resource/configuration aggregated with Q-port. In Rel-13, in the case of a 16-port CSI-RS resource/configuration aggregated in an 8-port CSI-RS resource/configuration unit, CDM-4 is applied to a 2×2 RE. In the case of a 12-port CSI-RS resource/configuration aggregated in a 4-port CSI-RS resource/configuration unit, CDM-4 is applied in a legacy 4-port CSI-RS form in which six carriers have been spaced apart. If such a CDM-4 application method of Rel-13 is applied to a Q-port CSI-RS resource/configuration in which CSI-RS resource/configurations of different port numbers have been aggregated, performance degradation attributable to a performance difference between ports is expected because different CDM-4 forms will be applied to the 8-port CSI-RS resource/configuration and 4-port CSI-RS resource/configuration of a Q-port CSI-RS resource/configuration.

In a channel environment in which a channel change is not severe in a frequency axis, to share a 16-port CSI-RS resource having a high reuse rate may be more advantageous when many Rel-13 UEs that require CSI-RS resource sharing are located in a cell edge. Accordingly, an eNB may notify a UE, configured with CDM-4, of i) whether aggregated CSI-RS resources/configurations have different port numbers or ii) whether aggregated CSI-RS resources/configurations have the same number of ports through RRC. In addition, the eNB may notify the UE of a port numbering rule which may be applied to each case through RRC.

Meanwhile, in the case of a Q-port CSI-RS, the application of CDM-8 may be taken into consideration as a method for improving transmit power per port. In this case, Equation 25 may be simply used as a port numbering method or Equation 24 may be used for forward compatibility.

Figure 45:
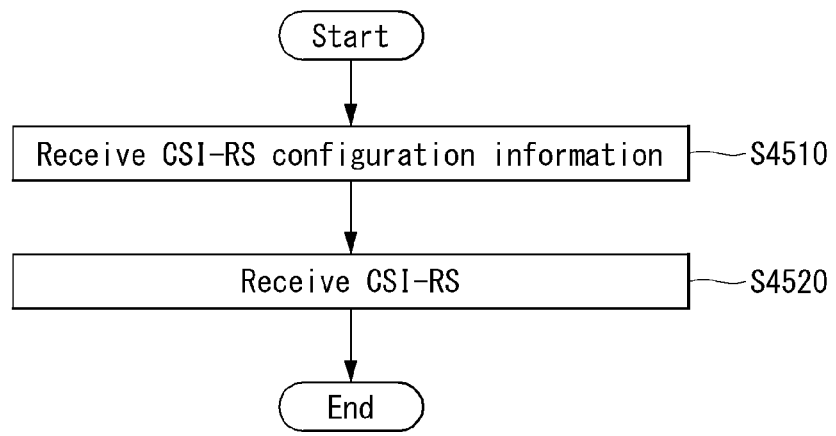
FIG. 45 is a flowchart illustrating a CSI-RS reception method of a UE according to an embodiment of the present invention.

FIG. 45 is a flowchart illustrating a CSI-RS reception method of a UE according to an embodiment of the present invention. The description regarding the above-described embodiments may be applied to this flowchart identically/similarly, and a redundant description thereof is omitted First, a UE may receive CSI-RS configuration/resource information on a CSI-RS configuration/resource to which a CSI-RS is mapping from an eNB (S4510). In this case, the CSI-RS configuration/resource may correspond to a Q-port CSI-RS configuration/resource in which a plurality of legacy CSI-RS configurations/resources has been aggregated. All of the plurality of aggregated legacy CSI-RS configurations may have the same number of ports (e.g., 4-port or 8-port) or at least some of them may correspond to CSI-RS configurations/resources having a different port number.

Furthermore, the plurality of legacy CSI-RS configurations/resources may be mapped to a plurality of antenna ports in which legacy CSI-RS port numbers corresponding to the plurality of legacy CSI-RS configurations/resources have been numbered.

Next, the UE may receive a CSI-RS through a plurality of antenna ports from an eNB based on the CSI-RS configuration information (S4520).

If a CDM type of the CSI-RS configuration/resource has been configured as CDM-4, some of the plurality of legacy CSI-RS configurations/resources may be shared with a legacy UE (e.g., a UE of a system following Rel-14). In this case, a port numbering method of first antenna ports to which the legacy CSI-RS configurations/resources shared with the legacy UE are mapped may be configured differently from a port numbering method of second antenna ports to which legacy CSI-RS configurations/resources not shared with the legacy UE are mapped.

More specifically, the port numbering method of the first antenna ports may correspond to a method of sequentially assigning legacy CSI-RS port numbers, corresponding to a shared legacy CSI-RS configuration/resource, to the first antenna ports in ascending powers of configuration numbers for each shared legacy CSI-RS configuration/resource. In this case, the sequential assigning may mean that the legacy CSI-RS port numbers are sequentially assigned to the first antenna ports in a port group unit having the same polarization among the first antenna ports and in a pre-configured direction (e.g., vertical and/or right direction) within the layout of the first antenna ports.

The port numbering method of the second antenna ports may correspond to a method of mapping the second antenna ports to an antenna port group grouped in the same port number unit in a one-to-one manner for each not-shared legacy CSI-RS configuration/resource, but sequentially assigning the second antenna ports in unit of second antenna port units having the same polarization within an antenna port group in which legacy CSI-RS port numbers corresponding to the respective not-shared legacy CSI-RS configurations/resources are mapped in a one-to-one manner. In this case, the sequentially assigning may mean that the legacy CSI-RS port numbers are assigned to second antenna ports having a first polarization within the one-to-one mapped antenna port group in ascending powers in a pre-configured direction within a layout of the antenna port group and that the remaining legacy CSI-RS port numbers not assigned to second antenna ports having a second polarization different from the first polarization are assigned in ascending powers in a pre-configured direction (e.g., vertical and/or right direction) within the layout of the antenna port group.

In addition, the port numbering methods of the first and second antenna ports are the same as those described above in relation to FIGS. 34 to 42.

A one-to-one mapping relation may be established between the final number of CSI-RS ports sequentially assigned to a plurality of antenna ports in a port group unit having the same polarization for a UE configured with a CSI-RS configuration/resource (e.g., Q-port UE) and legacy CSI-RS port numbers assigned to a plurality of antenna ports according to the port numbering methods applied to the first and second antenna ports for a legacy UE configured with shared legacy CSI-RS configurations/resources.

Such a mapping relation between the final number of CSI-RS ports and the legacy CSI-RS port numbers may be represented like Equation 28. Equation 28 may be limitedly applied if the layout of a plurality of antenna ports to which a CSI-RS configuration/resource is mapped is a 20-port, 28-port and/or 32-port antenna layout in which the size of a column S1 is equal to or greater than that of a row S2 and/or if the layout of the plurality of antenna ports is a 24-port antenna layout in which the size of a row S2 of the layout is 1, 2, 4 or 3.

Furthermore, although not shown in the flowchart, the UE may receive information on the layout of a plurality of antenna ports to which CSI-RS configurations/resources are mapped, information on the layout of first antenna ports to which shared CSI-RS configurations/resources are mapped and/or information on a port numbering method from the eNB through RRC signaling.

General Apparatus to which the Present Invention May be Applied

Figure 46:
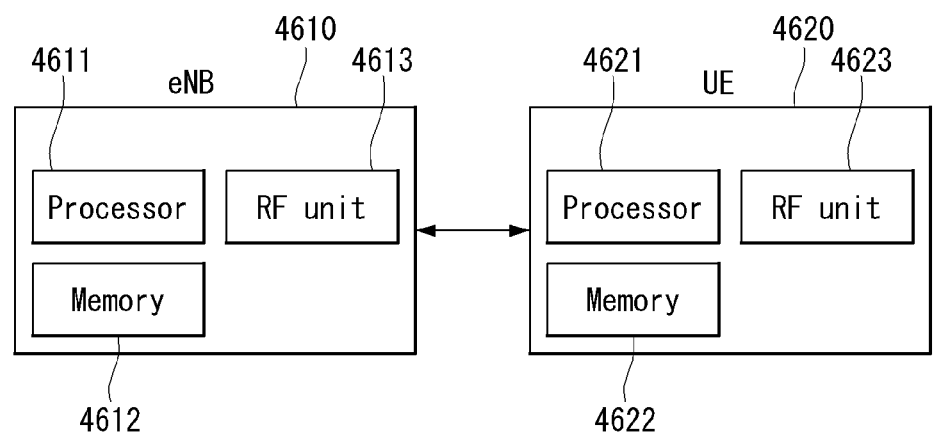
FIG. 46 illustrates a block configuration of a wireless communication apparatus according to an embodiment of the present invention.

FIG. 46 illustrates a block configuration of a wireless communication apparatus according to an embodiment of the present invention.

Referring to FIG. 46, the wireless communication system includes an eNB 4610 and multiple UEs 4620 disposed in the area of the eNB 4610.

The eNB 4610 includes a processor 4611, memory 4612 and a radio frequency (RF) unit 4613. The processor 4611 implements the functions, processes and/or methods proposed in FIGS. 1 to 45. The layers of a radio interface protocol may be implemented by the processor 4611. The memory 4612 is connected to the processor 4611 and stores a variety of types of information for driving the processor 4611. The RF unit 4613 is connected to the processor 4611 and transmits and/or receives a radio signal.

The UE 4620 includes a processor 4621, memory 4622 and an RF unit 4623. The processor 4621 implements the functions, processes and/or methods proposed in FIGS. 1 to 45. The layers of a radio interface protocol may be implemented by the processor 4621. The memory 4622 is connected to the processor 4621 and stores a variety of types of information for driving the processor 4621. The RF unit 4623 is connected to the processor 4621 and transmits and/or receives a radio signal.

The memory 4612, 4622 may be positioned inside or outside the processor 4611, 4621 and may be connected to the processor 4611, 4621 by various well-known means. Furthermore, the eNB 4610 and/or the UE 4620 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

MODE FOR INVENTION

Various forms for implementing the invention have been described in the best form for implementing the invention.

INDUSTRIAL APPLICABILITY

The present invention has been illustrated as being applied to the 3GPP LTE/LTE-A system, but may be applied to various wireless communication systems in addition to the 3GPP LTE/LTE-A system.

The invention claimed is:

1. A method of receiving a channel state information-reference signal (CSI-RS) by a user equipment (UE) in a wireless communication system, the method comprising:

receiving, from a base station, CSI-RS configuration information regarding a CSI-RS configuration to which the CSI-RS is mapped, wherein the CSI-RS configuration to an aggregation of a plurality of legacy CSI-RS configurations and the plurality of legacy CSI-RS configurations is mapped to a plurality of antenna ports numbered with corresponding legacy CSI-RS port numbers, and receiving, from the base station, the CSI-RS through the plurality of antenna ports based on the CSI-RS configuration information, wherein the CSI-RS configuration is a code division multiplexing (CDM) type with CDM of length 4, wherein one or more first CSI-RS configurations of the plurality of legacy CSI-RS configurations are shared with a legacy UE and one or more second CSI-RS configurations of the plurality of legacy CSI-RS configurations are not shared with the legacy UE, wherein a port numbering method of first antenna ports to which the one or more first CSI-RS configurations are mapped is configured differently from a port numbering method of second antenna ports to which the one or more second CSI-RS configurations are mapped, wherein the aggregation of the plurality of legacy CSI-RS configurations is based on CSI-RS configurations of an identical port number, wherein the second antenna ports are mapped to an antenna port group and each of the second antenna ports have the identical port number, and wherein half the number of legacy CSI-RS port numbers related to the one or more second CSI-RS configurations are assigned to second antenna ports having a first polarization, and remaining legacy CSI-RS port numbers are assigned to second antenna ports having a second polarization different from the first polarization, wherein a mapping relation between a total number of CSI-RS ports and the legacy CSI-RS port numbers is represented by Equation 1:

[Equation 1]
$$n = \begin{cases} Nk + u\left(\dfrac{p' + \dfrac{N}{2}(2k-J) -}{2\left(8 - \dfrac{8}{N}\right)}\right) * \left(\dfrac{N(K-J)}{2}\right) + p', & p' = 15, 16, \ldots, +14+N, \\ & k = 0, \ldots, J-1 \\ \dfrac{NJ}{2} + \dfrac{N}{2}(k-J) + p', & p' = 15, 16, \ldots, +14+\dfrac{N}{2}, \\ & k = J, \ldots, K-1 \\ \dfrac{NJ}{2} + \dfrac{N}{2}(k-J+k-1) + p', & p' = 15 + \dfrac{N}{2}, \ldots, +14+N, \\ & k = J, \ldots, K-1 \end{cases}$$

where u(x)=1 if x>0, otherwise u(x)=0.

wherein, in Equation 1, n indicates the total number of CSI-RS ports, k indicates an assigned configuration number per the plurality of legacy CSI-RS configurations, K indicates a total number of the plurality of legacy CSI-RS configurations, N indicates a number of ports per the plurality of legacy CSI-RS configurations, p' indicates a number of legacy CSI-RS ports mapped to the total number of CSI-RS ports in a one-to-one manner, and J indicates a number of legacy CSI-RS configurations shared with the legacy UE.

2. The method of claim 1, wherein the identical port number corresponds to 4-port or 8-port.

3. The method of claim 1, wherein the port numbering method of the first antenna ports is a method of sequentially assigning legacy CSI-RS port numbers, corresponding to the shared legacy CSI-RS configuration, to the first antenna ports in ascending order of configuration numbers assigned for each shared legacy CSI-RS configuration.

4. The method of claim 3, wherein sequentially assigning comprises:
sequentially assigned the legacy CSI-RS port numbers to the first antenna ports in a port group unit having an identical polarization among the first antenna ports and in a pre-configured direction within a layout of the first antenna ports.

5. The method of claim 4, wherein the pre-configured direction corresponds to a vertical direction.

6. The method of claim 1, wherein half of the legacy CSI-RS port numbers are assigned to second antenna ports having the first polarization in ascending order in a pre-configured direction within a layout of the antenna port group and the remaining legacy CSI-RS port numbers are assigned to second antenna ports having the second polarization different from the first polarization in ascending order in a pre-configured direction within the layout of the antenna port group.

7. The method of claim 6, wherein the pre-configured direction corresponds to a vertical direction.

8. The method of claim 1, wherein a one-to-one mapping relation is established between the total number of CSI-RS ports sequentially assigned to the plurality of antenna ports in a port group unit having an identical polarization for a UE configured with the CSI-RS configuration and the legacy CSI-RS port numbers assigned to the plurality of antenna ports according to the port numbering method for a legacy UE configured with the shared legacy CSI-RS configuration.

9. The method of claim 1, wherein Equation 1 is applied when the layout of the plurality of antenna ports to which the CSI-RS configuration is mapped is a 20-port, 28-port and/or 32-port antenna layout in which a size of a column is equal to or greater than a size of a row and/or a 24-port antenna layout in which a size of a row of the layout is 1, 2, 4 or 3.

10. The method of claim 1, further comprising:
receiving information on a layout of the plurality of antenna ports to which the CSI-RS configuration is mapped, information on a layout of the first antenna ports to which the shared CSI-RS configuration is mapped and/or information on the port numbering method through radio resource control (RRC) signaling.

11. A user equipment (UE) receiving a channel state information-reference signal (CSI-RS) in a wireless communication system, the user equipment comprising:
a transmitter and a receiver for transmitting and receiving radio signals; and
a processor operatively coupled to the transmitter and receiver, wherein the processor is configured to:
receive, from a base station, CSI-RS configuration information regarding a CSI-RS configuration to which the CSI-RS is mapped, and
receive, from the base station, the CSI-RS through a plurality of antenna ports based on the CSI-RS configuration information,
wherein the CSI-RS configuration relates to an aggregation of a plurality of legacy CSI-RS configurations and the plurality of legacy CSI-RS configurations is mapped to a plurality of antenna ports numbered with corresponding legacy CSI-RS port numbers,
wherein the CSI-RS configuration is a code division multiplexing (CDM) type with CDM of length 4,
wherein one or more first CSI-RS configurations of the plurality of legacy CSI-RS configurations are shared with a legacy UE and one or more second CSI-RS configurations of the plurality of legacy CSI-RS configurations are not shared with the legacy UE, and
wherein a port numbering method of first antenna ports to which the one or more first CSI-RS configurations are mapped is configured differently from a port numbering method of second antenna ports to which the one or more second CSI-RS configurations are mapped,
wherein the aggregation of the plurality of legacy CSI-RS configurations is based on CSI-RS configurations of an identical port number,
wherein the second antenna ports are mapped to an antenna port group and each of the second antenna ports have the identical port number, and
wherein half the numbers of legacy CSI-RS port numbers related to the one or more second CSI-RS configurations are assigned to second antenna ports having a first polarization, and remaining legacy CSI-RS port numbers are assigned to second antenna ports having a second polarization different from the first polarization,
wherein a mapping relation between a total number of CSI-RS ports and the legacy CSI-RS port numbers is represented by Equation 1:

$$n = \begin{cases} Nk + n\left(p' + \dfrac{N}{2}(2k - J) - 2\left(8 - \dfrac{8}{N}\right)\right) * \left(\dfrac{N(K-J)}{2}\right) + p', & \begin{array}{l} p' = 15, 16, \ldots, +14 + \\ N, k = 0, \ldots, J-1 \end{array} \\ \dfrac{NJ}{2} + \dfrac{N}{2}(k - J) + p', & \begin{array}{l} p' = 15, 16, \ldots, +14 + \\ \dfrac{N}{2}, k = J, \ldots, K-1 \end{array} \\ \dfrac{NJ}{2} + \dfrac{N}{2}(k - J + K - 1) + p', & \begin{array}{l} p' = 15 + \dfrac{N}{2}, \ldots, +14 + \\ N, k = J, \ldots, K-1 \end{array} \end{cases}$$ [Equation 1]

where u(x)=1 if x>0, otherwise u(x)=0.
wherein, in Equation 1, n indicates the total number of CSI-RS ports, k indicates an assigned configuration number per the plurality of legacy CSI-RS configurations, K indicates a total number of the plurality of legacy CSI-RS configurations, N indicates a number of ports per the plurality of legacy CSI-RS configuration, p' indicates a number of legacy CSI-RS ports mapped to the total number of CSI-RS ports in a one-to-one manner, and J indicates a number of legacy CSI-RS configurations shared with the legacy UE.

* * * * *